US009948583B2

(12) United States Patent
Smullen et al.

(10) Patent No.: US 9,948,583 B2
(45) Date of Patent: Apr. 17, 2018

(54) CHANNEL BASED COMMUNICATION AND TRANSACTION SYSTEM

(71) Applicant: Pypestream Inc., New York, NY (US)

(72) Inventors: Richard Smullen, New York, NY (US); Jeremy Sterns, San Francisco, CA (US); Jeremy Glassenberg, San Francisco, CA (US); Joerg Habermeier, San Francisco, CA (US); Jatin Patel, Titon Falls, NJ (US); Hans van de Bruggen, New York, NY (US)

(73) Assignee: Pypestream Inc., New York, NY (US)

( * ) Notice: Subject to any disclaimer, the term of this patent is extended or adjusted under 35 U.S.C. 154(b) by 0 days.

(21) Appl. No.: 15/707,833

(22) Filed: Sep. 18, 2017

(65) Prior Publication Data
US 2018/0006978 A1 Jan. 4, 2018

Related U.S. Application Data

(63) Continuation of application No. 15/559,286, filed as application No. PCT/US2016/024373 on Mar. 25, 2016.

(Continued)

(51) Int. Cl.
*G06F 15/16* (2006.01)
*H04L 12/58* (2006.01)
(Continued)

(52) U.S. Cl.
CPC .......... *H04L 51/046* (2013.01); *H04L 12/185* (2013.01); *H04L 63/18* (2013.01);
(Continued)

(58) Field of Classification Search
CPC ... H04L 51/046; H04L 12/185; H04L 67/322; H04L 67/306; H04L 69/14
(Continued)

(56) References Cited

U.S. PATENT DOCUMENTS 6,044,142 A 3/2000 Hammarstrom et al.
8,122,084 B2 * 2/2012 Beringer ................ G06Q 10/10
709/204

(Continued)

FOREIGN PATENT DOCUMENTS

CA 2 884 775 A1 3/2013

*Primary Examiner* — Tauqir Hussain
(74) *Attorney, Agent, or Firm* — Morgan, Lewis & Bockius LLP

(57) ABSTRACT

System and methods are provided for receiving identification information from remote user devices associated with users. The identification information serves to obtain corresponding stored user profiles. Primary communication channels are generated for each user based upon their profiles. Each such primary channel is limited to communication with, and facilitates electronic communication between, a single corresponding enterprise data source, and users. For each respective primary channel in a subset of the primary channels of a first user, a corresponding plurality of sub-channels is generated based upon their profile. Each such plurality of sub-channels forms a corresponding hierarchical tree with the corresponding primary channel as root node and the sub-channels as child nodes. A sub-channel in a hierarchy of sub-channels enables secure bidirectional communication between (i) the remote user device associated with the first user and (ii) the enterprise data source associated with the primary channel of the hierarchy.

22 Claims, 38 Drawing Sheets

Related U.S. Application Data

(60) Provisional application No. 62/137,843, filed on Mar. 25, 2015, provisional application No. 62/264,850, filed on Dec. 8, 2015, provisional application No. 62/265,988, filed on Dec. 11, 2015.

(51) Int. Cl.
 *H04L 12/18* (2006.01)
 *H04L 29/06* (2006.01)
 *H04L 29/08* (2006.01)

(52) U.S. Cl.
 CPC .......... *H04L 67/306* (2013.01); *H04L 67/322* (2013.01); *H04L 69/14* (2013.01)

(58) Field of Classification Search
 USPC ........................................................ 709/217
 See application file for complete search history.

(56) References Cited

U.S. PATENT DOCUMENTS

| | | | |
|---|---|---|---|
| 8,677,451 B1 | 3/2014 | Bhimaraju et al. | |
| 9,240,970 B2 * | 1/2016 | Holzman | H04L 51/066 |
| 9,450,901 B1 | 9/2016 | Smullen et al. | |
| 9,641,470 B2 | 5/2017 | Smullen et al. | |
| 2003/0023691 A1 * | 1/2003 | Knauerhase | H04L 51/04 709/206 |
| 2003/0028451 A1 | 2/2003 | Ananian | |
| 2003/0055907 A1 | 3/2003 | Stiers | |
| 2005/0080862 A1 * | 4/2005 | Kent, Jr. | G06Q 10/107 709/206 |
| 2005/0102401 A1 | 5/2005 | Patrick et al. | |
| 2006/0036671 A1 | 2/2006 | Rhim et al. | |
| 2006/0036679 A1 | 2/2006 | Goodman et al. | |
| 2007/0192414 A1 * | 8/2007 | Chen | H04L 29/04 709/205 |
| 2007/0206086 A1 | 9/2007 | Baron et al. | |
| 2008/0104244 A1 | 5/2008 | Chen et al. | |
| 2010/0064015 A1 | 3/2010 | Sacks et al. | |
| 2012/0089698 A1 * | 4/2012 | Tseng | G06Q 10/101 709/217 |
| 2013/0191481 A1 * | 7/2013 | Prevost | H04L 12/1859 709/206 |
| 2014/0280936 A1 | 9/2014 | Nandagopal et al. | |
| 2015/0310446 A1 * | 10/2015 | Tuchman | G06Q 30/016 705/304 |

* cited by examiner

CONDITIONAL INVOCATION OF HUMAN SUPPORT

A first sub-channel in the corresponding plurality of sub-channels associated with a respective primary communication channel in the plurality of primary communication channels hosts a first conversation between the corresponding enterprise data source and the first user. The first conversation has a first human intervention status. When the first human intervention status is deemed automated, messages in the first conversation from the remote user device associated with the first user are processed by a first automated human interface module. When the first human intervention status is deemed non-automated, messages in the first conversation from the remote user device associated with the first user are placed in a queue for processing by a human associated with the corresponding enterprise data source of the first sub-channel. —522 —524

When the first human intervention status is deemed to be automated, the method further comprises applying messages on the first sub-channel from the remote user device associated with the first user to a trained classifier associated with the first sub-channel thereby obtaining a classifier result. When the classifier result falls into a predetermined category, the first human intervention status is changed from automated to non-automated until a predetermined event occurs. —526

The predetermined event is a break in communications in the first conversation, the elapsing of a predetermined amount of time, or a manual switch of the first human intervention status from non-automated to automated by a human operator associated with the corresponding enterprise data source. —528

The classifier produces a binomial classification and the predetermined category is one of the two outputs of the classifier. —530

The classifier is a decision tree, a random forest, a Bayesian network, a support vector machine, a neural network or logistic regression. —532

The classifier is trained across a plurality of sub-channels using feedback data provided by the plurality of users regarding a plurality of their interactions with the server system using the sub-channels. —534

The plurality of interactions include electronic payment processing, customer sign-up, and customer service by the plurality of users using the sub-channels provided by the server system.

512 (cont)

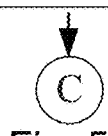

Fig. 5C

FILE CABINET ASSOCIATED WITH CHANNELS THAT IS AUTOMATICALLY POPULATED WITH CHANNEL ATTACHMENTS

A first sub-channel in the corresponding plurality of sub-channels associated with a respective primary communication channel processes at least part of the communication from the corresponding enterprise data source that is bound for the remote user device associated with the first user by first receiving an original message from the corresponding enterprise data source, where the original message is associated with an attachment (e.g., a document or a video), making an electronic copy of the attachment, and then storing the electronic copy of the attachment in an electronic file cabinet associated with the user. The stored electronic copy is indexed to the first sub-channel. The original message and the associated attachment is then communicated within the first sub-channel to the remote user device associated with the first user.

The electronic file cabinet is stored in a remote device (e.g., remote server, virtual machine) independent of the corresponding enterprise data source. The remote device is addressable by the server system across a network.

An entity associated with the enterprise data source has a first access privilege to the electronic copy of the attachment in the electronic file cabinet associated with the first user. The first user has a second access privilege to the electronic copy of the attachment in the electronic file cabinet associated with the user. The first access privilege is different than the second access privilege.

The first access privilege comprises an edit privilege, a read privilege, and a deletion privilege to the electronic copy of the attachment in the electronic file cabinet associated with the user. The second access privilege consists of a read privilege to the electronic copy of the attachment in the electronic file cabinet associated with the first user.

The first access privilege and the second access privilege are each independently one or more of edit privileges, read privileges, and deletion privileges to the electronic copy of the attachment in the electronic file cabinet associated with the first user.

Fig. 5F

**FILE CABINET ASSOCIATED WITH CHANNELS
THAT IS AUTOMATICALLY POPULATED WITH
CHANNEL ATTACHMENTS (cont.)**

A first sub-channel in the corresponding plurality of sub-channels associated with a respective primary communication channel processes at least part of the communication from the corresponding enterprise data source that is bound for the remote user device associated with the first user by receiving an original message from the corresponding enterprise data source. The original message is associated with a first link to an attachment. The attachment is stored in a database associated with the corresponding enterprise data source and the first link provides access to the stored attachment. An electronic copy of the attachment is made using the first link. The electronic copy of the attachment is stored in an electronic file cabinet associated with the first user. The stored electronic copy of the attachment is indexed to the first sub-channel and the storing produces a second link to the stored attachment in the electronic file cabinet associated with the first user. The original message and the second link are communicated within the first sub-channel to the remote user device associated with the first user.

The electronic file cabinet is stored in a remote file storage device (e.g., remote server, virtual machine) independent of the corresponding enterprise data source. The remote file storage device is addressable by the server system across a network.

An entity associated with the enterprise data source has a first access privilege to the electronic copy of the attachment in the electronic file cabinet associated with the first user. The first user has a second access privilege to the electronic copy of the attachment in the electronic file cabinet associated with the user. The first access privilege is different than the second access privilege.

The first access privilege comprises an edit privilege, a read privilege, and a deletion privilege to the electronic copy of the attachment in the electronic file cabinet associated with the user. The second access privilege consists of a read privilege to the electronic copy of the attachment in the electronic file cabinet associated with the first user.

The first access privilege and the second access privilege are each independently one or more of edit privileges, read privileges, and deletion privileges to the attachment copy in the electronic file cabinet associated with the first user.

Fig. 5H

MARKETING APPLICATION PROGRAMMING INTERFACE

A first sub-channel in the corresponding plurality of sub-channels associated with a respective primary communication channel processes at least part of the communication from the corresponding enterprise data source that is bound for the remote user device associated with the first user by receiving an original message from the corresponding enterprise data source in accordance with a message campaign sponsored by the enterprise data source responsive to receiving the original message. Then, automatically and without human intervention, an application programming interface function is invoked for the message campaign. This passes information in the original message to the application programming interface function and generates an applet that is communicated within the first sub-channel to the remote user device associated with the first user. Then monitoring is set up to monitor, through communications received from the remotely installed applet within the first sub-channel, responses to the messaging campaign.

Invoking the application programming interface function makes use of a value of a demographic characteristic (e.g., age, a location, a level of participation a customer rewards program, a length of time enrolled in a customer rewards program, a number of purchases the user has made with the enterprise data source, a total of amount of purchases the first user has made with the enterprise data source during a predetermined time frame, the last time the first user has made with the enterprise data source, a type of item the first user has purchased from the enterprise data source, or a sex of the first user)in the user profile corresponding to the first user to determine which information in the message to pass to the application programming interface function.

512 (cont)
592
594

SECURITY, NON-REPUDIATION

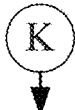

A conversation in a first sub-channel in the plurality of sub-channels associated with a respective primary communication channel is associated with the unique identifier corresponding to the first user. The unique identifier is used as a basis for non-repudiation of the conversation.

The conversation is used to conduct a purchase or other form of transaction by the first user from the corresponding enterprise data source associated with the first sub-channel.

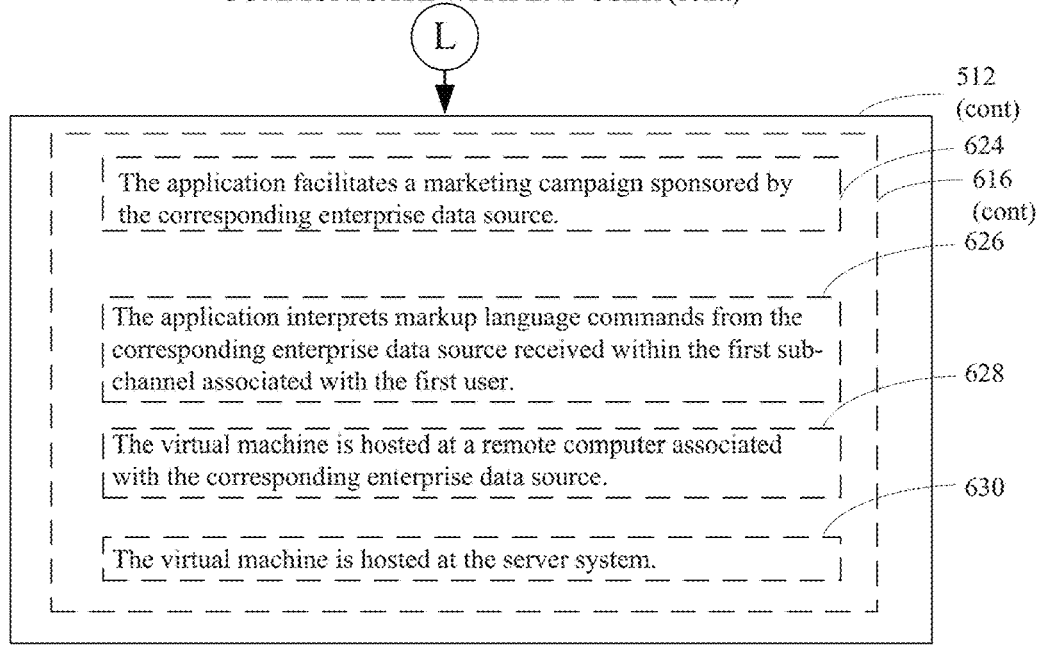
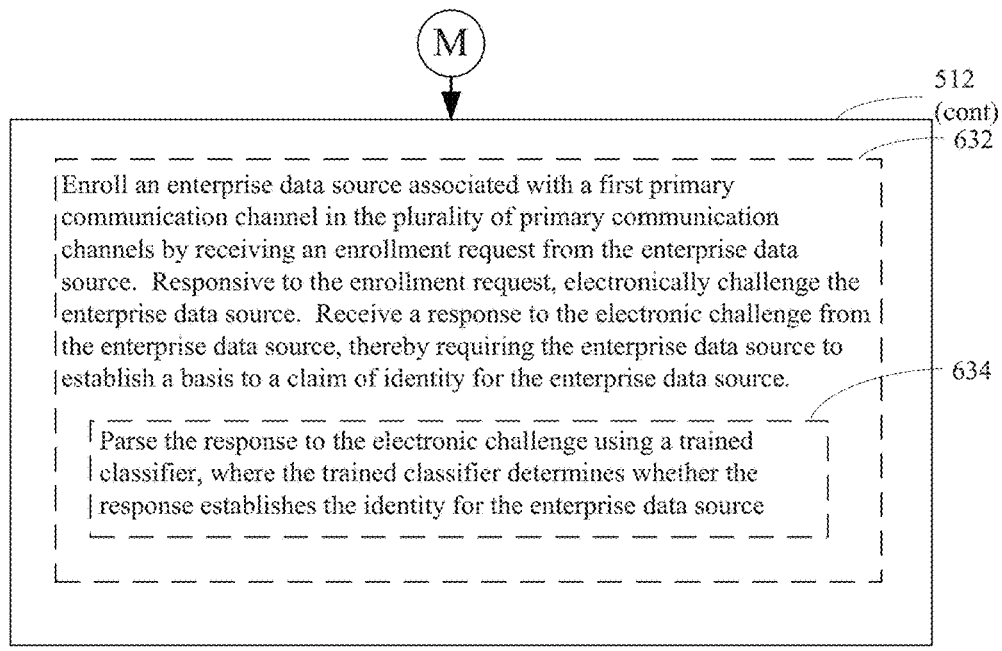
Fig. 5M

NATURAL LANGUAGE PROCESSING OF CUSTOMER QUERIES WHILE VIEWING CATALOGS (cont.)

Receive a query from a remote user device associated with a first user within a first sub-channel in the corresponding plurality of sub-channels associated with a respective primary communication channel in the plurality of primary communication channels. Process the query using an automated human interface module employing a trained classifier, thereby generating a reply to the query. Communicate the reply to the remote device associated with the first user within the first sub-channel. Determine whether the reply is deemed to be satisfactory. When the reply is deemed to not be satisfactory, switch communication on the first sub-channel from the remote user device associated with the first user to a human associate with the corresponding enterprise data source of the first sub-channel.

The determination as to whether the reply is deemed to be satisfactory is based, at least in part, on further communication received from the first user within the first sub-channel.

The automated human interface module employing the trained classifier is not associated with the enterprise data source.

GEOGRAPHICALLY DEPENDENT MESSAGING

Receive a location of the remote user device associated with the first user within a first sub-channel in the corresponding plurality of sub-channels associated with a respective primary communication channel in the plurality of primary communication channels. Determine whether the location is within a geographical zone in a plurality of geographical zones. When the location is within a geographical zone in the geographical plurality of zones, communicate information from the enterprise data source to the remote user device associated with the first user within the first sub-channel based, at least in part, on the location. When the location is not within a geographical zone in the geographical plurality of zones, communicate no information from the enterprise data source to the remote user device associated with the first user within the first sub-channel.

Fig. 5P

```
                                    ⌐208
                                  ◢
{
    "$schema": "http://json-schema.org/draft-04/schema#",
    "type": "object",
    "properties": {
       ⌒ "business_id": {
374         "type": "string",
            "description": "Unique identifier representing a specific consumer."
        },
       ⌒ "name": {
376         "type": "string",
            "description": "Business' name"
        },
       ⌒ "super_admin_id": {
378         "type": "string",
            "description": "Super_admin that administers the company."
        },
       ⌒ "pype_admins": {
380         "type": "array",
            "description": "A list of pype_admins within the business"
        },
       ⌒ "stream_admins": {
392         "type": "array",
            "description": "A list of stream_admins within the business"
        }
    },
    "required": [
        "name"
    ]
}
```

Fig. 8

```
{
  "$schema": "http://json-schema.org/draft-04/schema#",
  "type": "object",
  "properties": {
    "message_id": {
      "type": "string",
      "description": "Unique identifier representing a specific chatroom."
    },
    "text": {
      "type": "string",
      "description": "Content of the message"
    },
    "embeds": {
      "type": "array",
      "description": "Content of the message, if using controls"
    },
    "author_id": {
      "type": "string",
      "description": "The identifier of the author of the post"
    },
    "author_name": {
      "type": "string",
      "description": "The name of the author of the post"
    },
    "chatroom_id": {
      "type": "string",
      "description": "associated chatroom of the message."
    },
    "consumer_id": {
      "type": "string",
      "description": "Identifier of the consumer in the message"
    },
    "stream_admin_id": {
      "type": "string",
      "description": "Identifier of the consumer in the message"
    }
  }
}
```

1202 — message_id
1204 — text
1206 — embeds
1208 — author_id
1210 — author_name
1212 — chatroom_id
1214 — consumer_id
1216 — stream_admin_id

Fig. 12

CHANNEL BASED COMMUNICATION AND TRANSACTION SYSTEM

CROSS REFERENCE TO RELATED APPLICATIONS

This application is a Continuation of U.S. patent application Ser. No. 15/559,286 filed Sep. 18, 2017 which is a 371 U.S. National Phase Application of PCT International Application No. PCT/US2016/024373 filed Mar. 25, 2016, which claims priority to U.S. Provisional Patent Application No. 62/137,843 filed Mar. 25, 2015 entitled "Channel Based Communication and Transaction System," and U.S. Provisional Patent Application No. 62/265,988 filed Dec. 11, 2015 entitled "Bidirectional Communication and Message Processing," and U.S. Provisional Patent Application No. 62/264,850 filed Dec. 8, 2015 entitled "Message Aggregation and Processing," all of which are incorporated herein by reference in their entireties.

FIELD

The present disclosure relates generally to secure mobile communications platforms that list enterprise data sources as primary communication channels in searchable catalogs. Users connect to primary communication channels through such catalogs and, in so doing, engage in secure bidirectional communication with enterprise data sources thereby enabling the enterprise data sources to respond directly or broadcast messages to users.

BACKGROUND

Enterprise data sources use different types of communication systems to connect with end users, such as consumers. For example, some enterprise data sources rely on electronic mail (email), telephone, etc., to communicate with consumers, who in turn can respond to the enterprise data sources. However, email communication systems are more than two decades old, not secure, typically laced with spam, a primary deliverer of viruses, cluttered, error prone, and a cause for disconnects between enterprise data sources and consumers. Anyone who has tried to obtain customer support using a telephone system will appreciate that calls centers do not improve the situation. A consumer must listen to numerous recorded messages, navigate through countless menus, and start all over if there is a single incorrect number entered. Moreover, the consume, once lucky enough to reach a live operator is often transferred, often more than once, each time providing countless security credentials in order to provide some modicum of security to the call. Thus, typical communication systems do not facilitate direct and secure performance of transactions with consumers.

Hence, there is a long felt but unresolved need for computer implemented systems and methods that replace conventional email communication systems and call in systems and facilitates secure bidirectional communication and transactions with consumers in real time.

SUMMARY

The present disclosure addresses the above-identified shortcomings. Systems and methods are provided for receiving identification information from remote user devices associated with users. The identification information serves to obtain corresponding stored user profiles for the users. Primary communication channels are generated for each user based upon such profiles. In typical embodiments, such primary communication channels are already preexisting and the act of "generating" a primary communication channel, from the user perspective, means joining the primary communication channel, and, from the enterprise data source perspective, means adding the user to the pre-existing primary communication channel. Each such primary channel is limited to communication with, and facilitates electronic communication between, a single corresponding enterprise data source (e.g., businesses) and users.

For each respective primary channel in a subset of the primary channels associated with a first user, a corresponding plurality of sub-channels is generated based upon their profile. Here again, in typical embodiments such sub-channels are pre-existing and the act of "generating" a sub-channel channel, from the user perspective, means joining the sub-channel, and, from the enterprise data source perspective, means adding a conversation between the enterprises data source and the user to the pre-existing sub-channel. Each such plurality of sub-channels forms a corresponding hierarchical tree with the corresponding primary channel as root node and the sub-channels as child nodes. In other words, each primary channel of each enterprise data source is associated with a plurality of sub-channels organized into a hierarchy. A sub-channel in a hierarchy of sub-channels enables secure bidirectional communication between (i) the remote user device associated with the first user and (ii) the enterprise data source associated with the primary channel of the hierarchy. More specifically, a sub-channel in a hierarchy of sub-channels enables a plurality of conversations, and each such conversation has secure bidirectional conversation between (i) a single remote user device associated with the first user and (ii) the enterprise data source associated with the primary channel of the hierarchy. Thus, an enterprise data source may invoke a number of sub-channels, each such sub-channel hosting a plurality of conversations, but each such conversation limited to the enterprise data source (e.g., an automated human interface module associated with the sub-channel or a live operator associated with the enterprise data source). With such a platform, users connect to primary communication channels and, in so doing, interact with enterprise data sources in secure bidirectional communication enabling enterprise data sources to respond directly or broadcast messages to their entire audience of users.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIGS. 5A, 5B, 5C, 5D, 5E, 5F, 5G, 5H, 5I, 5J, 5K, 5L, 5M, 5N, 5O, and 5P collectively provide a flow chart of processes and features of a system for enabling users to connect to primary communication channels through on-line catalogs and, in so doing, engage in secure bidirectional communication with enterprise data sources, in accordance with various embodiments of the present disclosure. In these figures, elements in dashed boxes are optional.

FIG. 8 illustrates an enterprise data source description for an enterprise data source in accordance with some embodiments.

FIG. 12 illustrates the format of a post request to a sub-channel in accordance with one aspect of the present disclosure.

DESCRIPTION OF EMBODIMENTS

The present disclosure relates generally to the field of secure mobile communications in which enterprise data sources are listed as primary communication channels in searchable catalogs. Users connect to primary communication channels through such catalogs and, in so doing, engage in secure bidirectional communication with enterprise data sources thereby enabling the enterprise data sources to respond directly to users.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
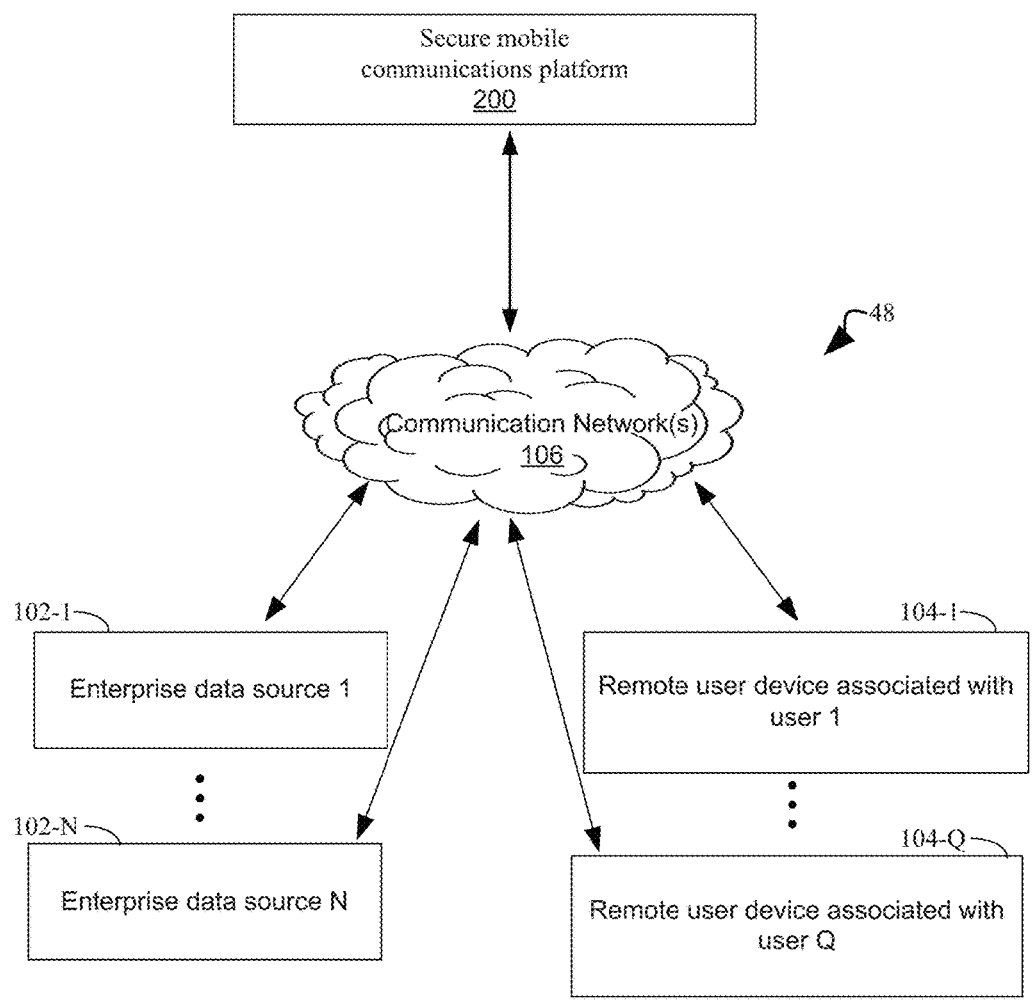
FIG. 1 illustrates a system topology that includes a secure mobile communications platform, a plurality of remote user devices associated with users of the secure mobile communications platform, and a plurality of enterprise data sources that communicate with the plurality of users through primary communication channels and sub-channels using the secure mobile communications platform in accordance with an aspect of the present disclosure.
Figure 2:
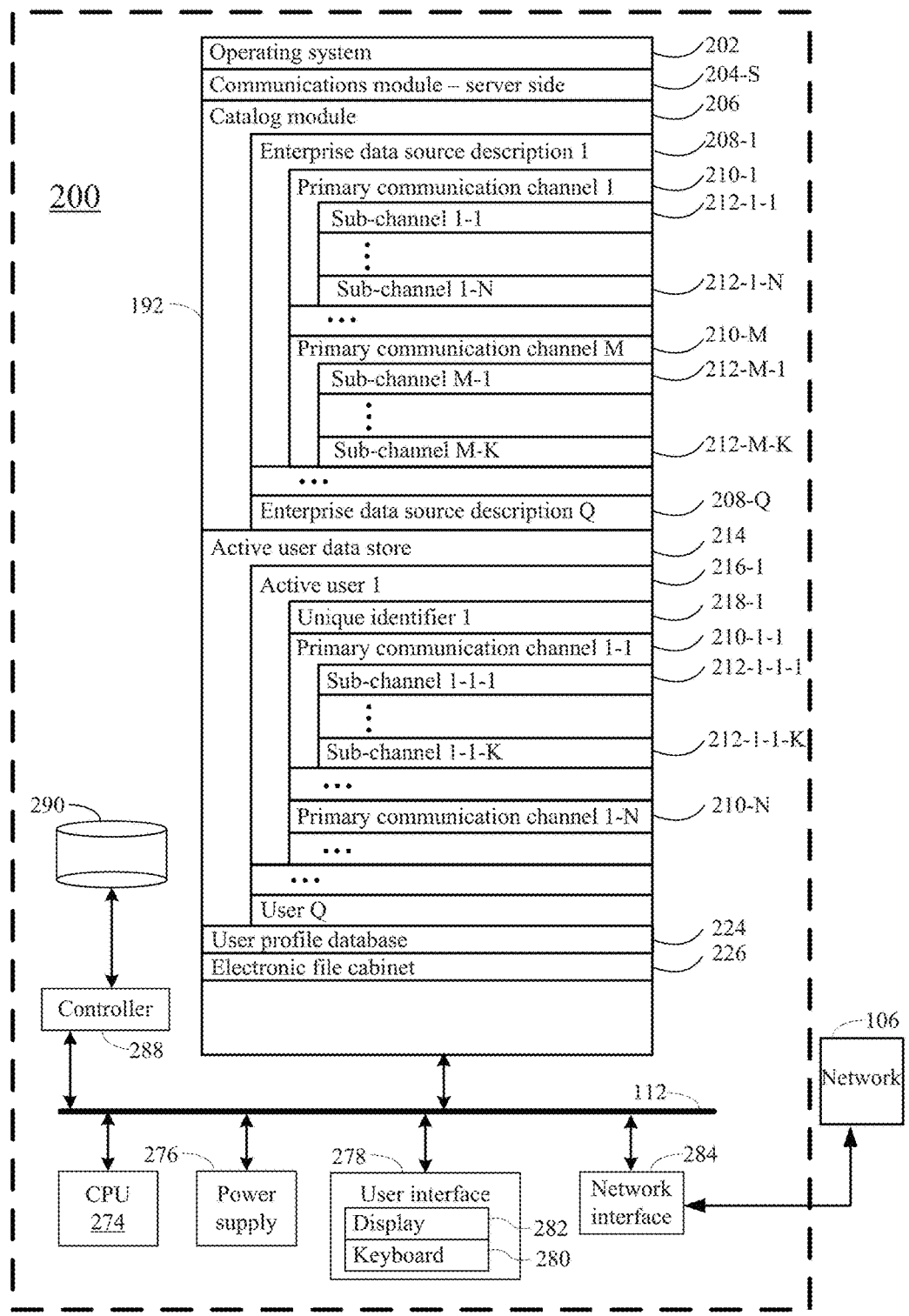
FIG. 2 illustrates a secure mobile communications platform in accordance with an embodiment of the present disclosure.
Figure 3:
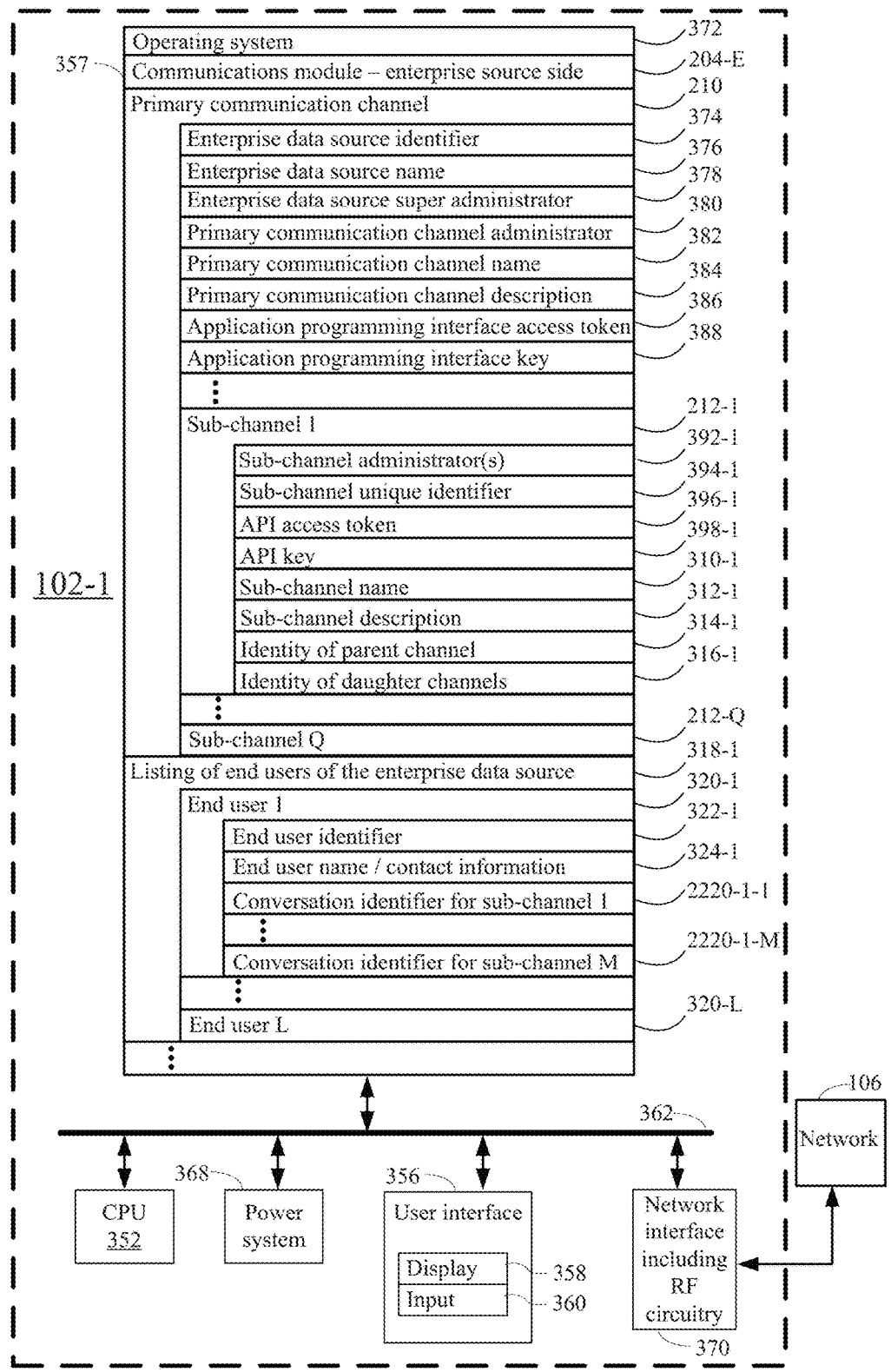
FIG. 3 illustrates an enterprise data source, in accordance with an embodiment of the present disclosure.
Figure 4:
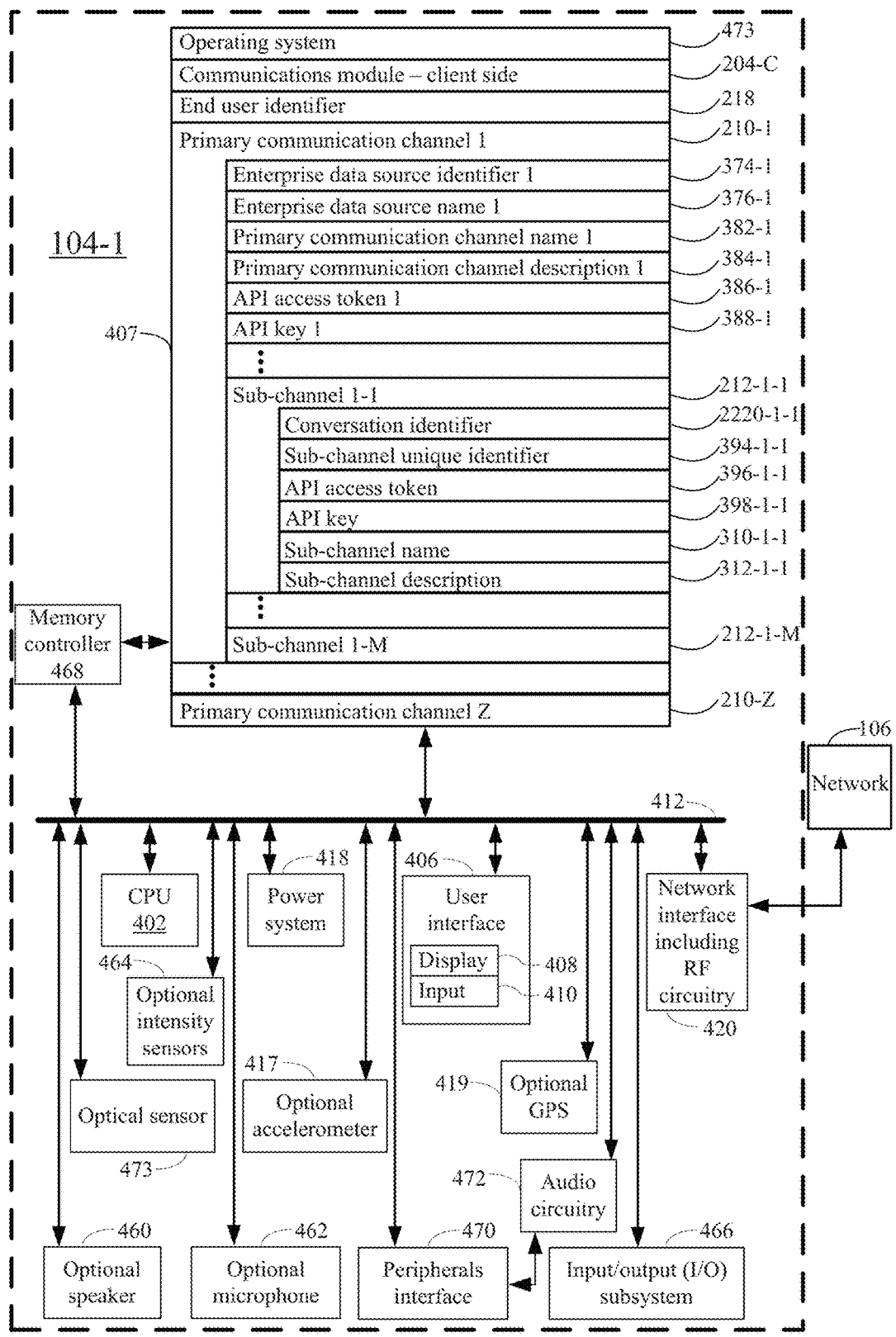
FIG. 4 illustrates a remote user device, in accordance with an embodiment of the present disclosure.

A detailed description of a system 48 which enables bidirectional communication between users and enterprise data sources in accordance with the present disclosure is described in conjunction with FIGS. 1 through 4. As such, FIGS. 1 through 4 collectively illustrate the topology of the system in accordance with the present disclosure. In the topology, there is a secure mobile communications platform 200 (FIGS. 1 and 2), enterprise data sources 102 that provide customer services and products to users through the secure mobile communications platform 200 (FIGS. 1 and 3), and remote user devices 104 associated with users that consume such customer services and products (FIGS. 1 and 4).

Of course, other topologies of system 48 are possible, for instance, secure mobile communications platform 200 can in fact constitute several computers that are linked together in a network or be a virtual machine in a cloud computing context. As such, the exemplary topology shown in FIG. 1 merely serves to describe the features of an embodiment of the present disclosure in a manner that will be readily understood to one of skill in the art.

Referring to FIG. 2, in typical embodiments, a secure mobile communications platform 200 comprises one or more computers. For purposes of illustration in FIG. 2, the secure mobile communications platform 200 is represented as a single computer that includes all of the functionality of the secure mobile communications platform 200. However, the disclosure is not so limited. The functionality of the secure mobile communications platform 200 may be spread across any number of networked computers and/or reside on each of several networked computers and/or by hosted on one or more virtual machines at a remote location accessible across the communications network 106. One of skill in the art will appreciate that a wide array of different computer topologies are possible for the secure mobile communications platform 200 and all such topologies are within the scope of the present disclosure.

Turning to FIG. 2 with the foregoing in mind, a secure mobile communications platform 200 comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 112 for interconnecting the aforementioned components, and a power supply 276 for powering the aforementioned components. Data in memory 192 can be seamlessly shared with non-volatile memory 290 using known computing techniques such as caching. Memory 192 and/or memory 290 can include mass storage that is remotely located with respect to the central processing unit(s) 274. In other words, some data stored in memory 192 and/or memory 290 may in fact be hosted on computers that are external to the secure mobile communications platform 200 but that can be electronically accessed by the secure mobile communications platform over an Internet, intranet, or other form of network or electronic cable (illustrated as element 106 in FIG. 2) using network interface 284.

The memory 192 of the secure mobile communications platform 200 stores:

an operating system 202 (e.g., iOS, DARWIN, RTXC, LINUX, UNIX, OS X, WINDOWS, or an embedded operating system such as VxWorks) that includes procedures for handling various basic system services;

a communications module 204-S for supporting bidirectional secure communication between the secure mobile communications platform 200, enterprise data sources 102 and remote user devices 104;

a catalog module 206 that provide enterprises data source descriptions 208 of the enterprises data sources 102 that are available to users of the remote user devices 104, including for each respective enterprise data source the associated primary communication channel 210 and sub-channels 212;

an active user data store 214 that tracks the current active users 216 of the secure mobile communications platform, including for each such user a unique identifier 218, and their active primary communication channels 220 and sub-channels 222, and in some embodiments, the conversation identifiers of the conversations of the active users;

a user profile database 224 that stores a user profile for each user; and an optional electronic file cabinet 226 which stores attachments sent in sub-channels to users.

In some embodiments, communications module 204-S is a web application. Advantageously, in such embodiments, since it is a web application it is accessible on any browser (phone, tablet, laptop/desktop) such as remote user device 104 of FIGS. 1 and 4. In some embodiments communications module 204 runs on native device frameworks, and is available for download onto remote user device 104 running operating systems (e.g., iOS, DARWIN, RTXC, LINUX, UNIX, OS X, WINDOWS, or an embedded operating system such as VxWorks).

In some embodiments, sub-channels 212 support "channel based bidirectional communication," which is a two-way, duplex, communication, for example, a business to consumer (B2C) communication. The channel based bidirectional communication comprises communication of content associated with multiple topics or subjects via multiple primary communication channels 210 and/or sub-channels 212. Furthermore, the channel based bidirectional communication comprises performance of one or more transactions via the sub-channels. In some embodiments, sub-channels 212 ae configured for mobile chat that replaces electronic mail (email) for business to consumer communication. This mobile chat takes the form of conversations, each having a conversation identifier, and each limited to the enterprise data source and a single end user. In some embodiment, the primary channels 210 and sub-channels are implemented in a cloud computing environment. As used herein, "cloud computing environment" refers to a processing environment comprising configurable computing physical and logical resources, for example, networks, servers, storage, applications, services, etc., and data distributed over a network, for example, the Internet. The cloud computing environment provides on-demand network access to a shared pool of the configurable computing physical and logical resources.

In some implementations, one or more of the above identified data elements or modules of the secure mobile communications platform 200 is stored in one or more of the previously described memory devices, and correspond to a set of instructions for performing a function described above. The above-identified data, modules or programs (e.g., sets of instructions) need not be implemented as separate software programs, procedures or modules, and thus various subsets of these modules may be combined or otherwise re-arranged in various implementations. In some implementations, the memory 192 and/or 290 optionally stores a subset of the modules and data structures identified above. Furthermore, in some embodiments the memory 192 and/or 206 stores additional modules and data structures not described above.

Referring to FIG. 3, in some embodiments an enterprise data source 102 includes a server computer having one or more processing units (CPU's) 352, a network or other communications interface 370, a memory 357 (e.g., random access memory), a user interface 356, the user interface 356 including a display 358 and input 360 (e.g., keyboard, keypad, touch screen), one or more communication busses 362 for interconnecting the aforementioned components, and a power system 368 for powering the aforementioned components. It should be appreciated that the enterprise data source 102 depicted in FIG. 3 is only one example of an enterprise data source, and that the enterprise data source 102 optionally has more or fewer components than shown in FIG. 3, optionally combines two or more components, or optionally has a different configuration or arrangement of the components. Moreover, it will be appreciated that an enterprise data source 102 may use any number of computers to support the disclosed systems and methods. The various components shown in FIG. 3 are implemented in hardware, software, firmware, or a combination thereof, including one or more signal processing and/or application specific integrated circuits.

As illustrated in FIG. 3, memory 357 of the enterprise data source 102 preferably comprises:

an operating system 372 (e.g., iOS, DARWIN, RTXC, LINUX, UNIX, OS X, WINDOWS, or an embedded operating system such as VxWorks) that includes procedures for handling various basic system services;

a communications module 204-E for supporting bidirectional secure communication between the secure mobile communications platform 200, enterprise data sources 102 and end users associated with remote user devices 104;

a primary communication channel 210 associated with the enterprise data source that includes a unique enterprise data source identifier 374, a name 376, one or more super administrators 378, one or more primary communication channel administrators 380, a primary communication channel name 382, a primary communication channel description 384, an application programming interface access token 386, an application programing interface key 388, as well as one or more sub-channels 212, each sub-channel including enumeration of sub-channel administrators(s) 392, a sub-channel unique identifier 394, an API access token 396, an API key 398, a sub-channel name 310, a sub-channel description 312, an identity of a parent channel 314 to the sub-channel 212 and an identification of one or more daughter channels 316 to the sub-channel 212; and a listing of a plurality of end users of the enterprises data source 318, including for each such respective end user 320, a user identifier 322, an end user name 324, and an identification of each conversation 2220 (e.g., see FIG. 22 for example additional disclosure on conversations) the end user is participating in, where each such conversation is in a different sub-channel 212 of the primary communication channels 210 associated with the enterprise data source 102.

Thus, FIG. 3 details a primary communication source 102 which includes a primary communication channel 210 and a plurality of sub-channel 212. End users associated with remote user devices 104 participate in conversations in sub-channels 212. Each such conversation is between a single end user and the enterprise data source 102. However, each sub-channel 212 may host a plurality of such conversations. To ensure the privacy of these conversations, each conversation 2220 has an identifier and only one end user has access rights to the conversation whereas the enterprise data source 102 has access rights to all the conversations. In some embodiments, a sub-channel 212 hosts ten or more conversations 2220, one hundred or more conversations 2220, or one thousand or more conversations 2220.

FIG. 4 provides a description of a remote user device 104 associated with an end user in accordance with the present disclosure. Remote user device 104 has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker 460, an optional microphone 462, one or more optional intensity sensors 464 for detecting intensity of contacts on the device 104 (e.g., a touch-sensitive surface such as a touch-sensitive display 408 of the device 102), optional input/output (I/O) subsystem 466, one or more optional optical sensors 474, one or more communication busses 412 for interconnecting the aforementioned components, and a power system 418 for powering the aforementioned components.

In some embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons.

Device 104 optionally includes, in addition to accelerometer(s) 417, a magnetometer (not shown) and a GPS 419 (or GLONASS or other global navigation system) receiver for obtaining information concerning the location and orientation (e.g., portrait or landscape) of device 104.

It should be appreciated that device 104 is only one example of a multifunction device that may be used by end users when engaging with the secure mobile communications platform 200, and that device 104 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of device 100, such as CPU(s) 407 is, optionally, controlled by memory controller 468.

Peripherals interface 470 can be used to couple input and output peripherals of the device to CPU(s) 402 and memory 407. The one or more processors 402 run or execute various software programs and/or sets of instructions stored in memory 407 to perform various functions for device 102 and to process data.

In some embodiments, peripherals interface 470, CPU(s) 402, and memory controller 468 are, optionally, implemented on a single chip. In some other embodiments, they are, optionally, implemented on separate chips.

RF (radio frequency) circuitry 108 of network interface 420 receives and sends RF signals, also called electromagnetic signals. RF circuitry 108 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks 106. In some embodiments, circuitry 108 does not include RF circuitry and, in fact, is connected to network 106 through one or more hard wires (e.g., an optical cable, a coaxial cable, or the like).

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a user and device 104. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the device 104 optionally also includes one or more optical sensors 473. Optical sensor(s) 473 optionally include charge-coupled device (CCD) or complementary metal-oxide semiconductor (CMOS) phototransistors. Optical sensor(s) 473 receive light from the environment, projected through one or more lens, and converts the light to data representing an image. In conjunction with imaging module 431 (also called a camera module), optical sensor(s) 473 optionally capture still images and/or video. In some embodiments, an optical sensor is located on the back of device 104, opposite display system 408 on the front of the device, so that the touch screen is enabled for use as a viewfinder for still and/or video image acquisition. In some embodiments, another optical sensor 473 is located on the front of the device 104 so that the user's image is obtained (e.g., to verify the identity of the user, etc.).

As illustrated in FIG. 4, memory 407 of the remote user device preferably comprises:

an operating system 473 (e.g., iOS, DARWIN, RTXC, LINUX, UNIX, OS X, WINDOWS, or an embedded operating system such as VxWorks) that includes procedures for handling various basic system services;

a communications module 204-C for supporting bidirectional secure communication between the secure mobile communications platform 200, enterprise data sources 102 and remote user devices 104;

an end user identifier 218 that uniquely identifies a user; and one or more primary communication channels 210 that the end user is participating in, and for each such primary channel 210, a unique enterprise data source identifier 374, enterprise data source name 376, a primary communication channel name 382, a primary communication channel description 384, an application programming interface access token 386, an application programing interface key 388, as well as one or more sub-channels 212 that the end user is participating in, each such sub-channel including an identifier of the conversation 2220 that the end user is participating in, a sub-channel unique identifier 394, an API access token 396, an API key 398, a sub-channel name 310, and/or a sub-channel description 312.

As such, FIGS. 1 through 4 exemplarily illustrate a business to consumer architecture of a channel based bidirectional communication and transaction system (secure mobile communications platform "SMCP" 48) for facilitating channel based communication and transactions with consumers in real time. In some embodiments, the SMCP 48 is accessible by consumers, using their remote user devices 104, via an ionic framework comprising a web browser application that implements, for example, the hypertext markup language 5 (HTML5) content presentation technology, or a mobile application installed on consumer devices, for example, tablet computing devices such as the iPhone® of Apple Inc., Android devices, WINDOWS® devices of Microsoft Corporation, BLACKBERRY® devices of BlackBerry Limited, etc. Referring to FIG. 3, the SMCP 48 provides a communications module 204-E that provides a graphical communication interface comprising a public business application programming interface for enterprise data sources to communicate with users (e.g., consumers), and referring to FIG. 4, a communication module 204-C for users (e.g., consumers) to communicate with the enterprise data sources 102. The enterprise data sources 102 (e.g., business entities) publish messages, for example, text messages, audio messages, video messages, images, etc., to consumers via the communications module 204-E. The users (e.g., consumers) can subscribe to offers provided by the enterprise data sources 102 (e.g., business entities) and transmit messages associated with multiple topics to the enterprise data sources 102 via the communications module 204-C.

Figure 5A:
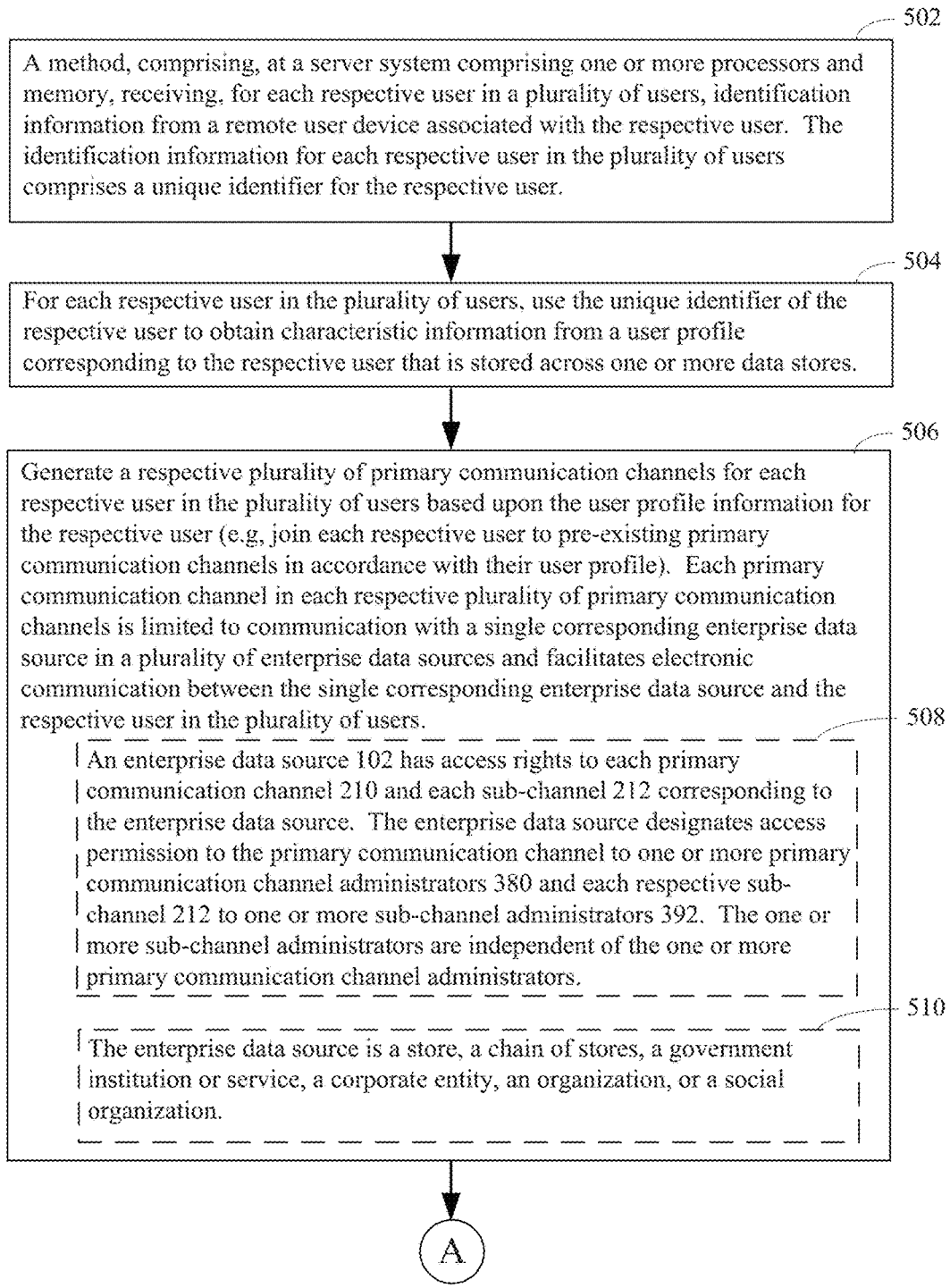

Now that details of a SMCP 48 that provides enterprise data sources as primary communication channels in searchable catalogs has been described, a flow chart of processes and features of the system, in accordance with an embodiment of the present disclosure, are disclosed with reference to FIGS. 5A through 5P.

Block 502. One aspect of the present disclosure provides a method performed at a secure mobile communications platform 200 (e.g. server system) comprising one or more processors and memory in which there is received, for each respective user in a plurality of users, identification information from a remote user device 104 associated with the respective user. The identification information for each respective user in the plurality of users comprises a unique identifier 218 for the respective user. In some embodiments the unique identifier 218 is a unique identification number assigned to the user after the user has enrolled with the secure mobile communications platform. In some such embodiments, the user does not have access to the unique identifier 218. For instance, in some embodiments, the user chooses a login and enrolls in the secure mobile communications platform 200 whereupon the user is assigned the unique identifier 218 which is stored on the user device 104 associated with the user and/or in the profile associated with the user. In some instances, the unique identifier 218 is stored in an encrypted format. Then, when the user logs into the secure mobile communications platform 200, the unique identifier 218 is automatically sent to the secure mobile communications platform 200 (or retrieved from the user's profile) as part of the login in process of block 502. In some alternative embodiments, the unique identifier is a login chosen by the user and assigned to the user once the uniqueness of the login has been verified (e.g., no other user has already chosen the login and the login is deemed to be robust enough to serve as a login).

Figure 6:
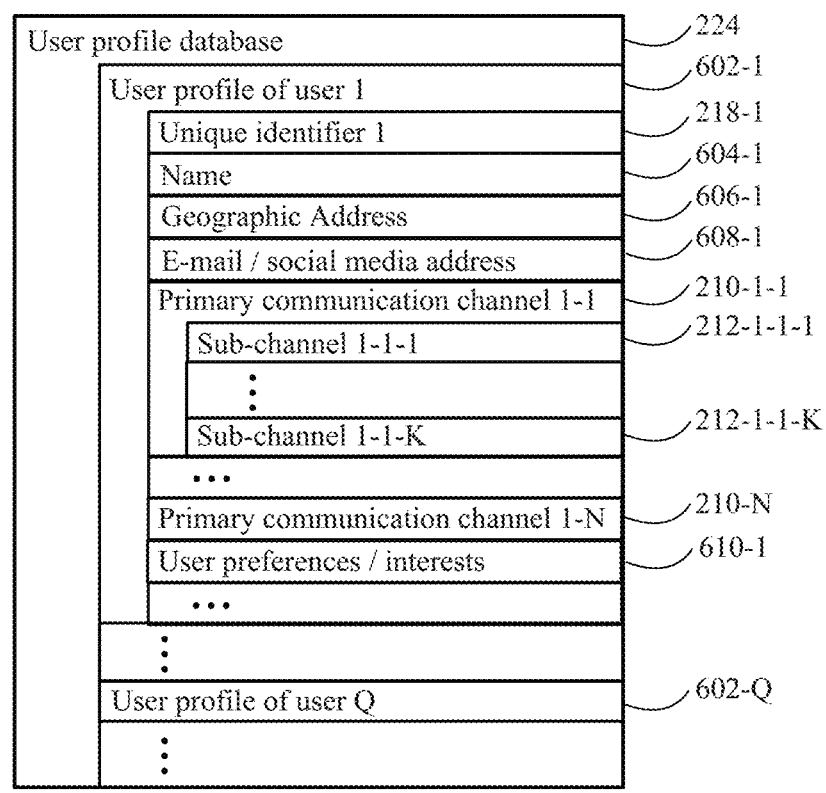
FIG. 6 illustrates an example user profile database in accordance with some embodiments of the present disclosure.
Figure 9:
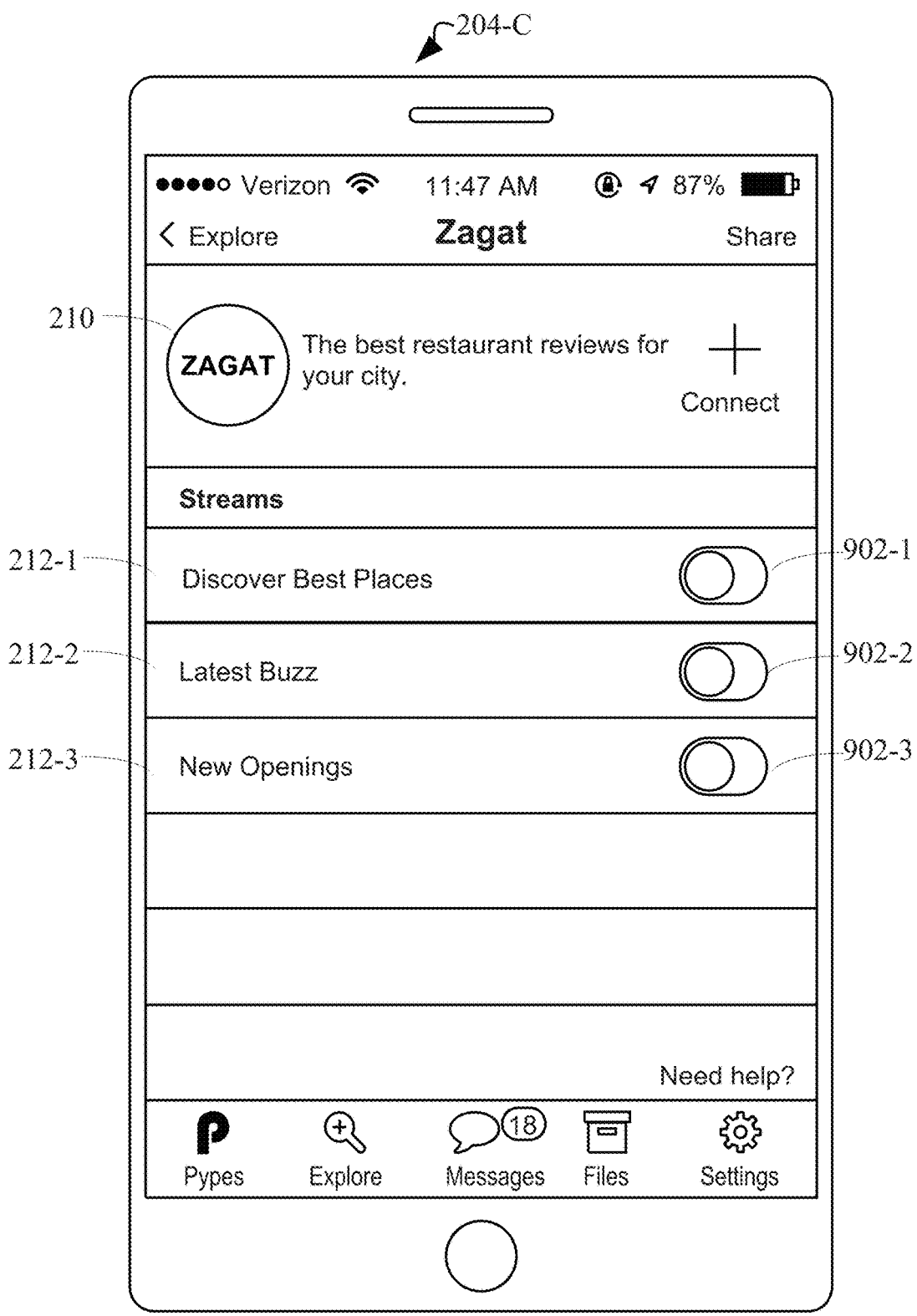
FIG. 9 illustrates a user interface that enables a user to select which sub-channels of a primary channel are invoked in accordance with an embodiment of the present disclosure.
Figure 18:
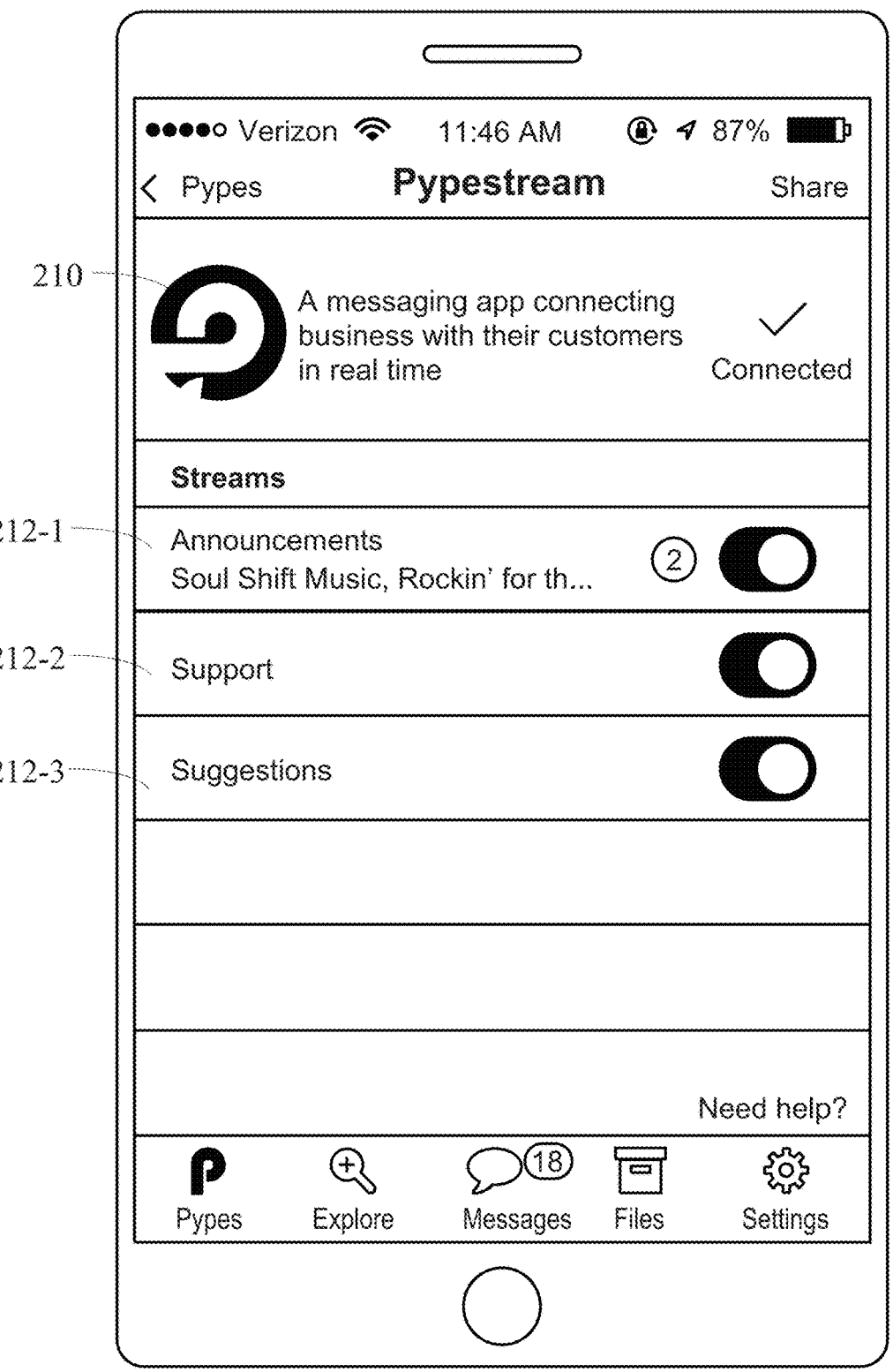
FIGS. 18 and 19 each illustrate a user interface that enables a user to select which sub-channels of a primary channel are invoked in accordance with an embodiment of the present disclosure.
Figure 19:
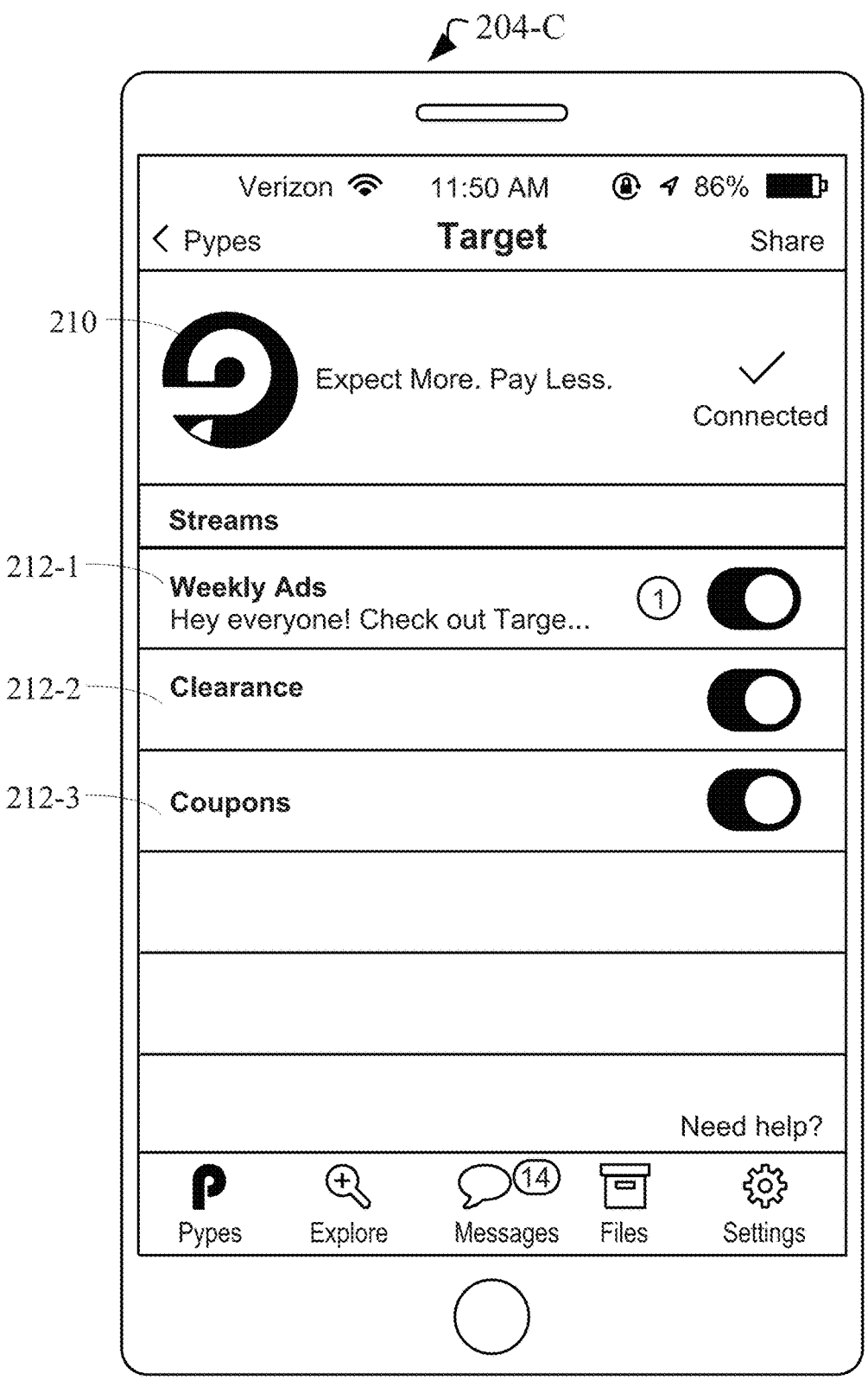
Figure 20:
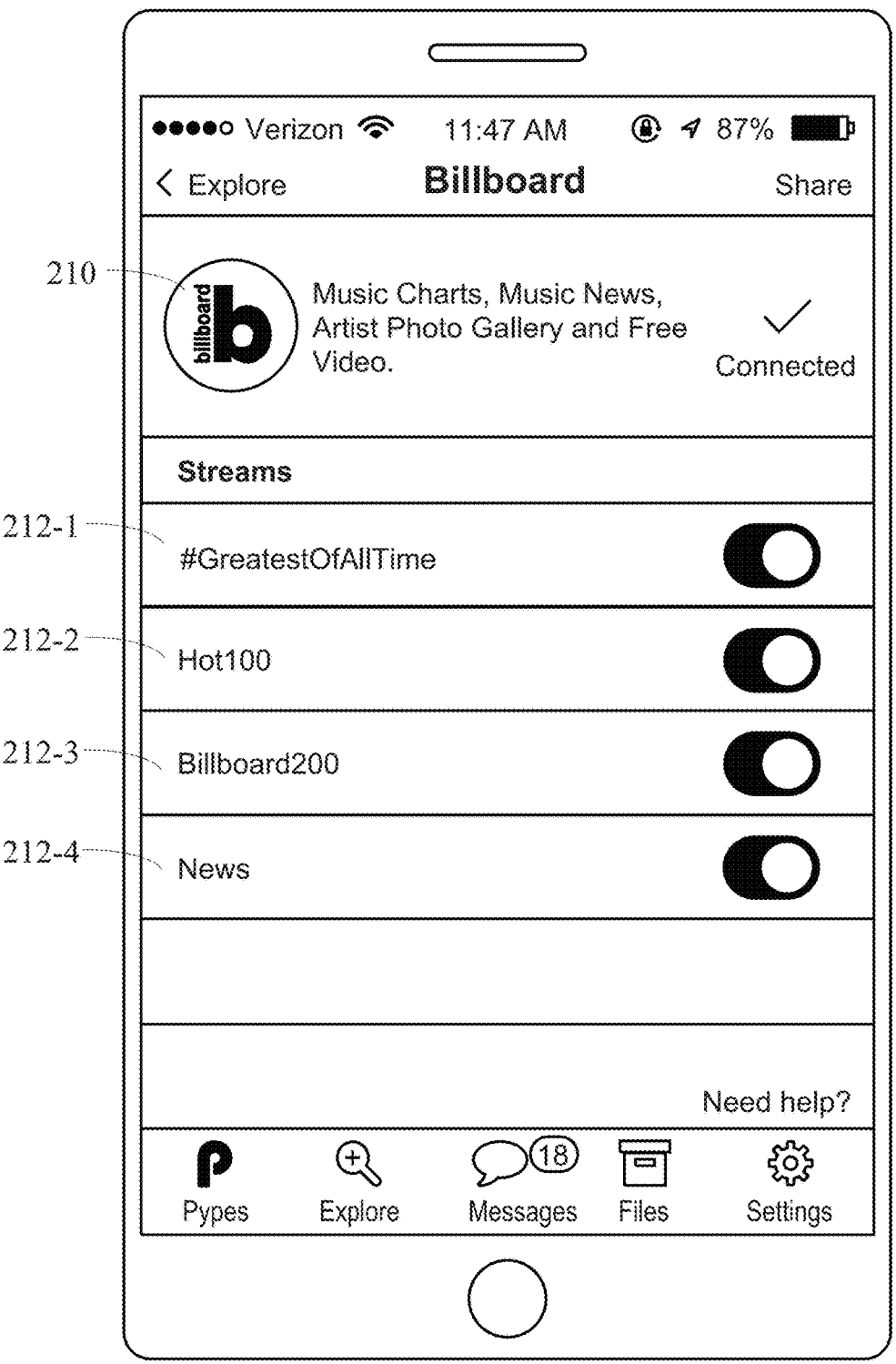
FIG. 20 illustrates a communication module which provides several different application programming interface functions in accordance with an embodiment of the present disclosure.

Turning to block 504, for each respective user in the plurality of users, the unique identifier of the respective user is used to obtain characteristic information from a user profile corresponding to the respective user that is stored across one or more data stores. The secure mobile communications platform 200 retrieves characteristic information of each of the users (e.g., consumers, also referred to herein as "end users") using the unique identifier from one or more databases (e.g., user profile database 224), for example, by performing a database lookup based on the unique identifier. In some embodiments, the characteristic information comprises, for example, demographic information, consumer preferences on different subjects or topics, location information, etc., of each of the users. For instance, referring to FIG. 2, in some embodiments, user profiles are stored in user profile database 224 of secure mobile communications platform 200. However, in alternative embodiments the user profile is stored on the remote user device 104 (e.g. in encrypted format). FIG. 6 provides more details of a user profile database in accordance with some embodiments of the present disclosure. In the user profile database 224, a user profile 602 is stored for each user. In some embodiments, a user profile 602 for a respective user includes the unique identifier 218 of the user (e.g., a contact number of the user), the name 604 of the user, the geographic address (e.g., street address) 606 of the user, as well as one or more E-mail and/or social media addresses of the user. Further, the profile details the primary communication channels 210 to which the user has subscribed. For those primary communication channels 210 in which the user is able to select which sub-channels 212 are invoked, a description of the sub-channels the user has invoked are also included in the profile of the user 602. Such a situation is illustrated in FIG. 9 where the primary channel 210 associated with the enterprise data source "ZAGAT" is illustrated and the user is able to turn off and on the sub-channels "Discover Best Places" 212-1, "Latest Buzz" 212-2, "and "New Openings" 212-3. In some instances, the user does not get to select which sub-channels 212 of a primary communication channel are invoked and in such instances information regarding sub-channels 22 for such primary communication channels 210 is not stored in the user profile. FIGS. 18, 19, and 20 provide additional examples of this feature. In some embodiments, the user profile of a user additionally stores the identifier of each conversation in each sub-channel that the user is presently participating in.

Turning to block 506 of FIG. 5A, as part of the user login process, a respective plurality of primary communication channels 210 is generated for each respective user in the plurality of users based upon the information stored in the user profile 602 for the respective user.

Figure 7:
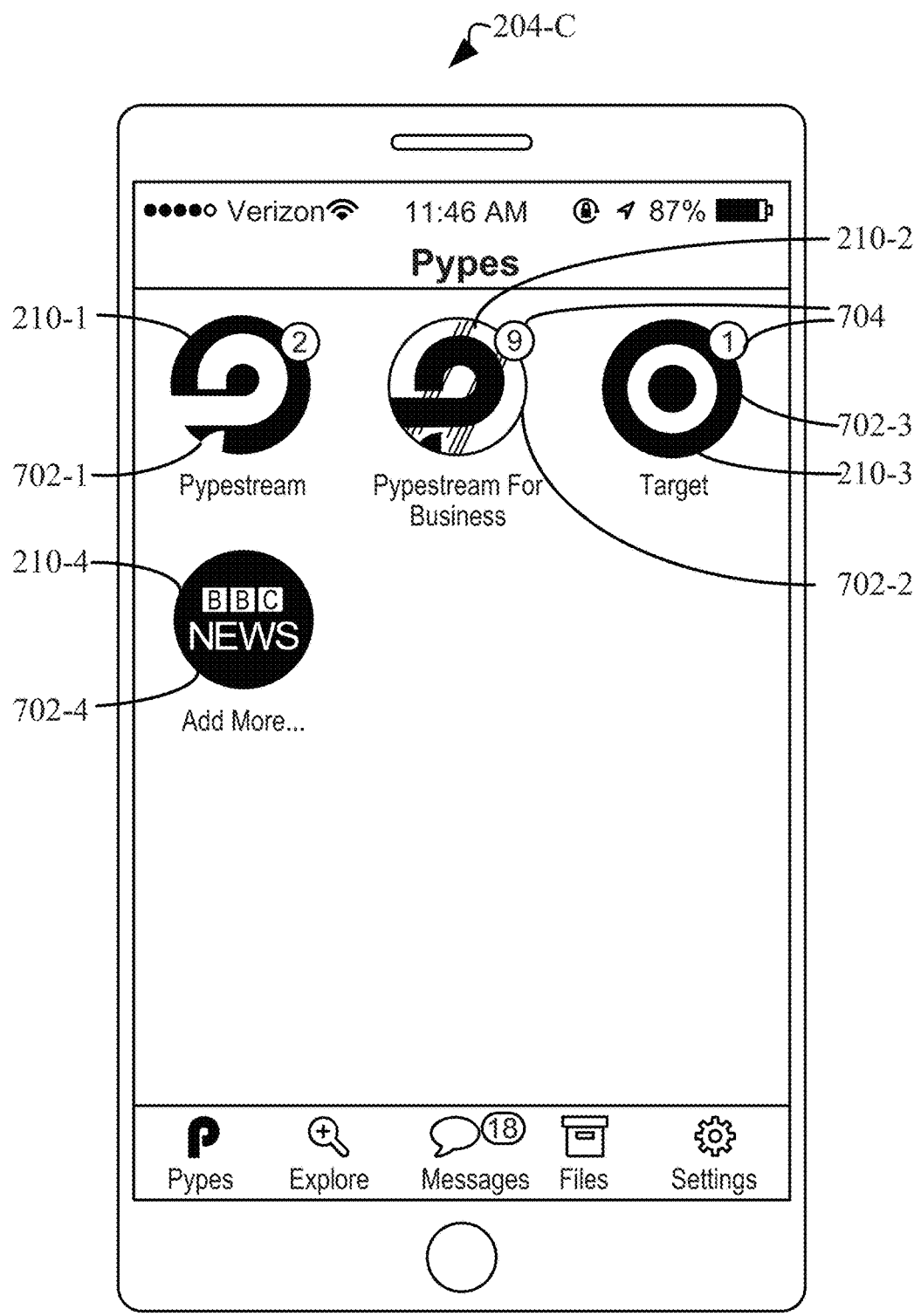
FIG. 7 provides an illustration of a graphical user interface running on a remote user device in accordance with some embodiments of the present disclosure.

In typical embodiments, these primary communication channels 210 already existed, with other users connected to them, and the generating involves joining the user to such primary communication channels 210. Each primary communication channel 210 in each respective plurality of primary communication channels (1) enables one-to-one communication between a corresponding enterprise data source 102 in a plurality of enterprise data sources and a respective user in the plurality of users and (2) facilitates electronic communication between the single corresponding enterprise data source 102 and the single respective user. For instance, user A associated with remote user device 104-1 logs into the secure mobile communications platform 200. As part of the login process, the user profile of the user 602 is obtained. From the user profile 602, a list of primary communication channels 210 that the user is associated with is obtained. Each of these primary communication channels 210 is generated (e.g., activated). In some embodiments, no action takes place when generating the plurality of communication channels 210 other than to display a representation of these channels on the display of the corresponding remote user device. For instance, referring to FIGS. 7 and 17, generating the plurality of primary communication channels for a first user involves displaying an icon for each of the primary channels. In particular, FIGS. 7 and 17 each provide an illustration of a graphical user interface 702 provided by communication module 204-C on a remote user device 104 after completion of block 506 in accordance with some embodiments of the present disclosure. An icon 702 is provided for each primary communication channel 210. Such primary communication channels 210 are interchangeably referred to herein as "Pypes." Further, it is quite likely that a number of other users are already engaged with these primary communication channels 210 when the first user log in.

Sub-channels 212 are interchangeably referred to herein as "Streams."

If there has been communication (e.g., messages from the corresponding enterprise data source) posted to a sub-channel associated with a given primary channel for a given user (e.g., posted to the conversation associated with the user in the sub-channel) since the last time that user has logged in, a count icon 704 is displayed that numerically indicates the number of such messages that have been posted to the sub-channels of that primary channel since the last time the user has checked the sub-channels. For instance, referring to FIG. 7, two messages have been posted on conversations in the sub-channels for the primary channel "Pypestream" since that last time the user has opened the icon for that primary channel on the remote user device 104. Further referring to FIG. 7, a message has been posted in a conversation on one of the sub-channels for the primary channel "Target" since that last time the user has opened the icon for "Target" on the remote user device 104.

In typical embodiments, although each primary communication channel 210 enables one-to-one communication between the corresponding enterprise data source and a respective user and (2) facilitates electronic communication between the single corresponding enterprise data source and the respective user, messages are not typically communicated between the enterprise data source 102 and the remote user devices 104 on the primary communication channel 210. Rather, sub-channels 212 associated with the primary channel 210 are used for this purpose as discussed in further detail below.

Figure 13:
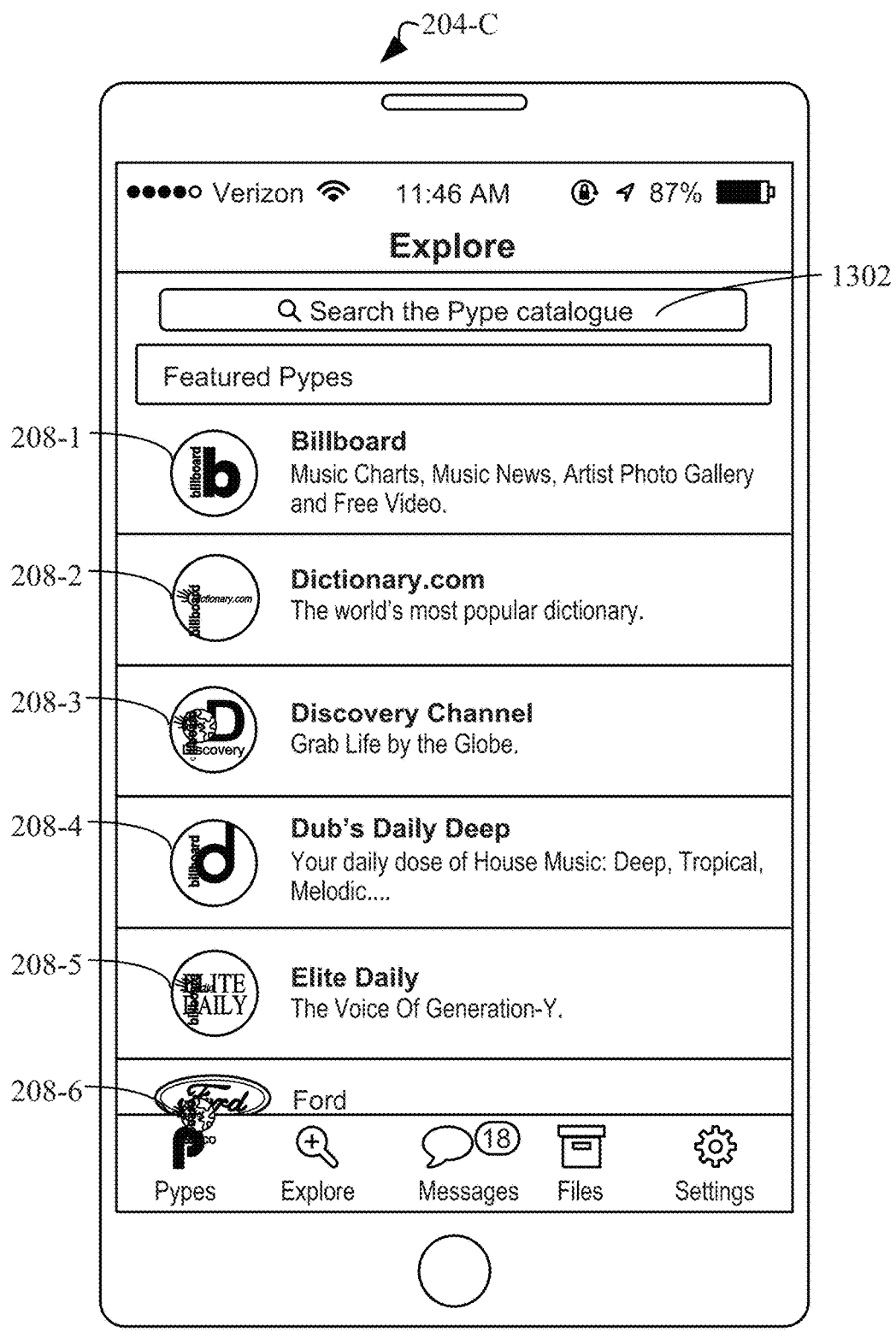
FIGS. 13, 14, and 15 illustrate how a user, at a remote user device, may peruse a description of available enterprise data sources obtained from a catalog and request to establish a primary channel with a selected enterprise data source in accordance with an aspect of the present disclosure.
Figure 14:
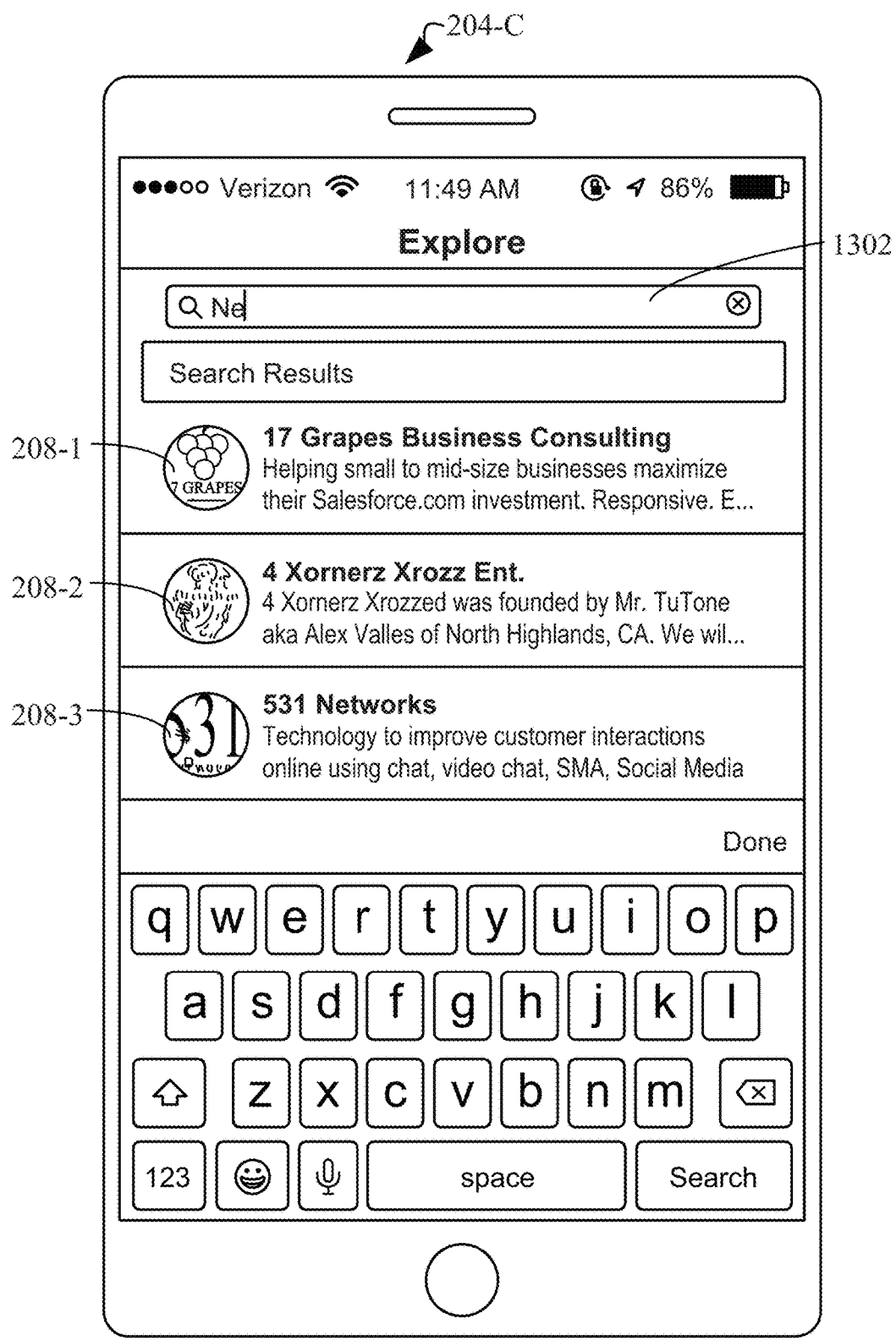
Figure 15:
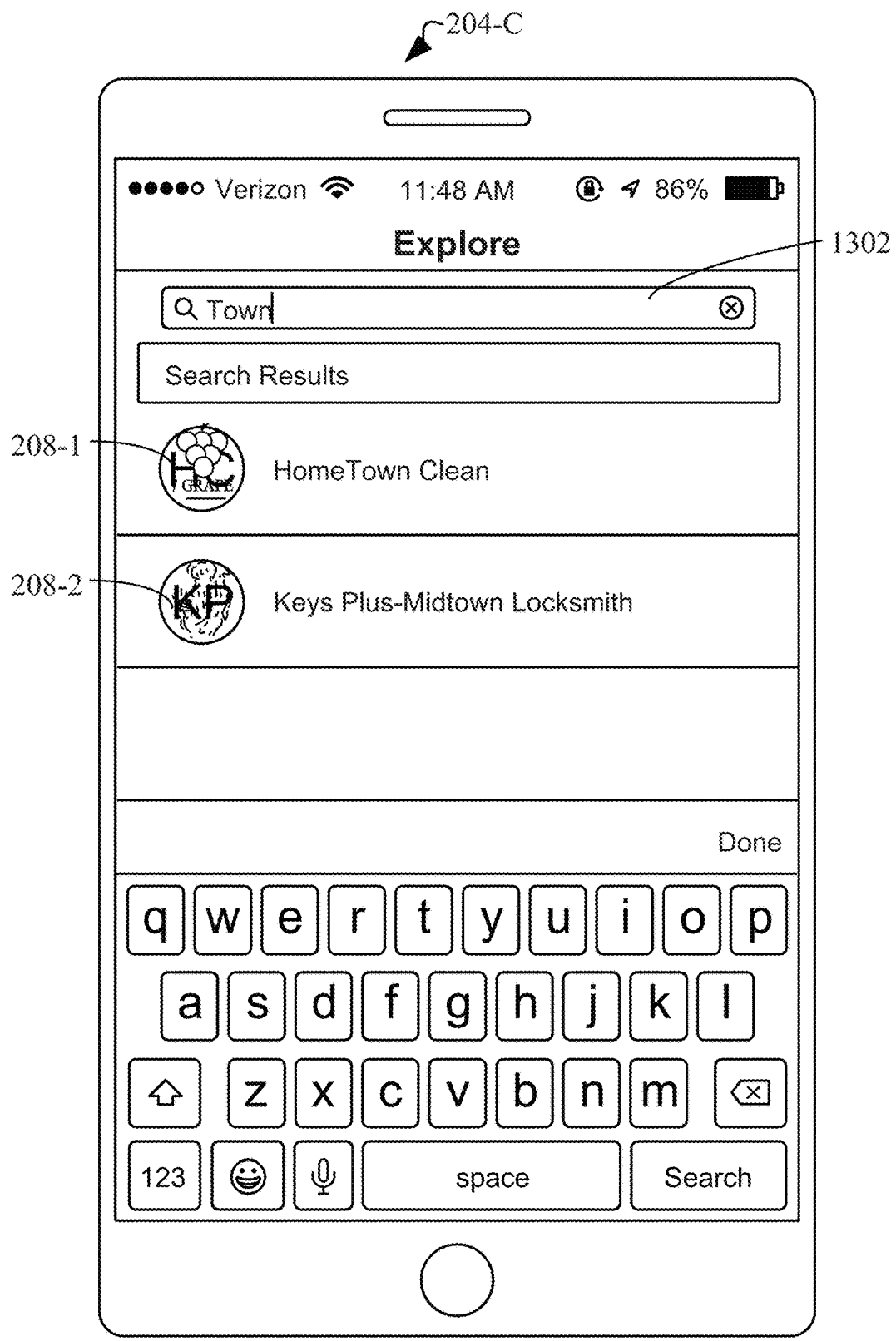

To build the profile of primary channels associated with a user, the user can request to establish a primary channel 210 with any enterprise data source 102 (e.g. business entity) by using the secure mobile security platform 200. In an embodiment, referring to FIGS. 13, 14 and 15 for illustration, at a remote user device 104, the client side version of communications module 204-C lists a description 208 of available enterprise data sources 102 obtained from catalog module 206 of the secure mobile security platform 200. Further, a user may enter an alphanumeric query for enterprise data sources 102 of interest using prompt 1302. Referring to FIGS. 14 and 15, as the user enters the alphanumeric query, enterprise data sources 102 from the digital catalog 206 that match the partial query are displayed. In this way, users can search through the digital catalog 206 and request to establish (e.g., join) a primary channel 210 with a selected enterprise data source 102. In some embodiments, the secure mobile communications platform 200 generates revenue by charging each enterprise data source 102 (e.g., business entity) a fee, for example, a monthly fee for listing them in the digital catalog 206.

Referring to block 508, in some embodiments, an enterprise data source 102 has access rights to each primary communication channel 210 and each sub-channel 212 corresponding to the enterprise data source. The enterprise data source designates access permission to the primary communication channel to one or more primary communication channel administrators 380 and each respective sub-channel 212 to one or more sub-channel administrators 392. The one or more sub-channel administrators are independent of the one or more primary communication channel administrators.

FIG. 8 illustrates a non-limiting example of a portion of an enterprise data source description 208 that is stored in the catalog module 206 of secure mobile communications platform 200 for each enterprise data source 102 in some embodiments. As illustrated in FIG. 8, the enterprise data source description 208 includes an enterprise data source identifier 374 (e.g., "business identifier") that uniquely identifies the enterprise. In some embodiments the identifier 374 is a unique number or expression associated with the corresponding enterprise data source 102. As illustrated in FIG. 8, the enterprise data source description 208 includes an enterprise data source name 376 for the enterprise data source 102. The enterprise data source name 376 is the name that is displayed to users of remote user devices 104. The enterprise data source description 208 further includes a super administrator identifier 378 for the enterprise data source 102. The super administrator is able to participate in the primary channel 210 and each of the sub-channels 212 associated with the enterprise data source 102. The enterprise data source description 208 further includes an identification of the primary communication channel administrators 380 for the enterprise data source 102. Each such primary communication channel administrator is able to participate in the primary channel 210 associated with the enterprise data source 102. The enterprise data source description 208 further includes an identification of the sub-channel administrators 392 for the primary channel 210 for the enterprise data source 102. Each such sub-channel administrator is able to participate in the one or more designated sub-channels associated with the enterprise data source 102. In some embodiments, as illustrated in FIG. 8, the identity of the super administrator 378, primary communication channel administrators 380, and sub-channel administrators 392 are independent of each other. For instance, the super administrator(s) 378 may be the same or different person(s) than the primary communication channel administrators 380 which, in turn, may the same or different persons than the sub-channel administrators 392.

Referring to block 510 of FIG. 5A, in some embodiments an enterprise data source 102 is a store, a chain of stores, a government institution or service, a corporate entity, an organization, or a social organization.

As discussed above, each primary channel 210 includes one or more sub-channels. During the login process, the sub-channels 212 of the primary channels associated with a user are generated. In other words, referring to block 512 of FIG. 5B, there is generated, for each respective primary communication channel 210 in at least a subset of the plurality of primary communication channels of a first user in the plurality of users, a corresponding plurality of sub-channels 212 based upon the user profile information for the first user automatically without human intervention. In typical embodiments, these sub-channels 212 already existed, with other users connected to them, and the generating involves adding a conversation to the sub-channel between the user and the enterprise data source that other users may not participate in.

Each of the plurality of sub-channels forms a corresponding hierarchical tree in which the corresponding primary communication channel is a root node and the plurality of sub-channels are child nodes. FIG. 9 illustrates such a hierarchical tree. The primary channel 210 "Zagat" is the root node and the sub-channels "Discover Best Places" 212-1, "Latest Buzz" 212-2, and "New Openings" 212-3 are child nodes. At least one sub-channel in each of the corresponding hierarchy of sub-channels enables secure bidirectional conversation between (i) a remote user device 104 associated with the first user and (ii) the enterprise data source 102 associated with the primary communication channel 210 of the corresponding hierarchical tree, thereby facilitating secure exchange of a plurality of messages between the corresponding enterprise data source 102 and the remote user device 104 associated with the first user within the at least one sub-channel 212. Each such conversation includes only a single user associated with a remote user device 104 although a sub-channel may host any number of conversations, each such conversation between the corresponding enterprise data source and a respective user.

Figure 10:
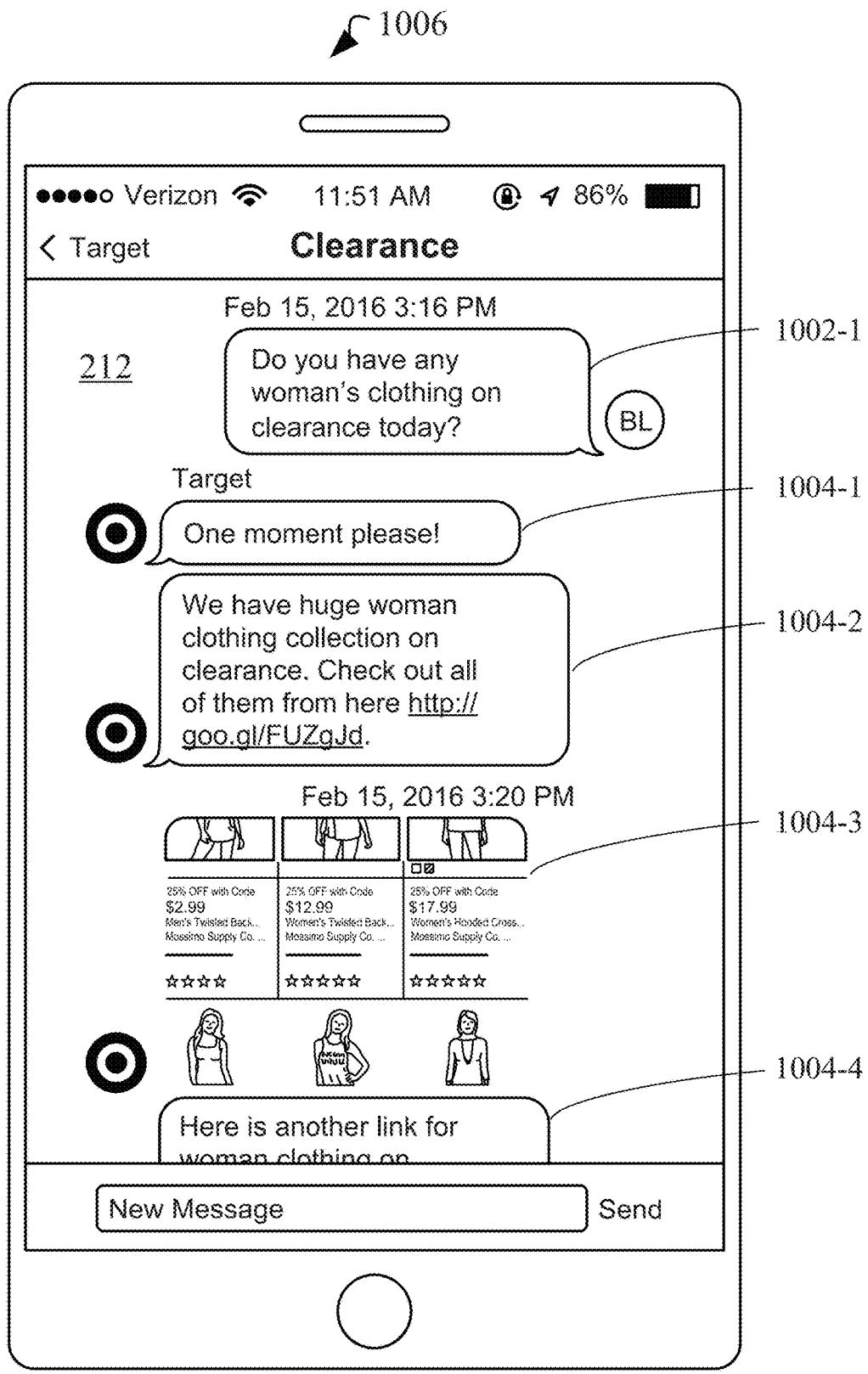
FIG. 10 illustrates the secure bidirectional communication that occurs on one such sub-channel in accordance with an embodiment of the present disclosure.

FIG. 10 illustrates the secure bidirectional communication that occurs on one such sub-channel 212 in the form of a conversation. Message 1002 originates from the user associated with a particular remote user device 104. This message is communicated in the sub-channel 212 to the corresponding enterprise data source 102. The enterprise data source 102 responds to message 1002 with messages 1004, which are routed only to the particular remote user device 104 that originated message 1002. That is, messages in the sub-channel illustrated in FIG. 10 are limited to the particular associated remote user device 104 and the particular enterprise data source associated with the sub-channel.

As illustrated in FIG. 10, the communications module 204-C operating on remote user device 104 renders a graphical communications interface 1006, for example, in an electronic mail (email) layout on the remote user device 104 for enabling bidirectional communication of messages and content between the user and the enterprise data source 102 in real time through a sub-channel 212. The content comprises, for example, one or more of messages (e.g., messages 1002-1, 1004-1, 1004-2, and 1004-4 of FIG. 10) image content (e.g., image 1004-3 of FIG. 10), audio content, video content, audiovisual content, multimedia content, animations, digital content, email content, voicemail content, document content, files, etc., and any combination thereof. As illustrated in FIG. 10, the graphical communications interface 1006 combines a peer to peer chat application with an email layout on the consumer device to create the graphical communication interface. In some embodiments, the secure mobile communication platform 200 encodes each of the messages and the content using strong encryption technologies, for example, public-key cryptography with a private key such as a personal identification number (PIN) and a two-factor authentication, and facilitates a secure transmission and a secure reception of the messages and the content through the sub-channel 210 via the rendered graphical communication interface 1006. As used herein, "public-key cryptography" refers to a class of cryptographic algorithms that requires a private key and a public key. Also, as used herein, "two-factor authentication" refers to an unambiguous identification of a user using a combination of two different components which a user knows or possesses. In an embodiment, the secure mobile communications platform 200 securely stores the encoded messages and the encoded content in one or more databases and/or in the consumer devices. The secure mobile communications platform 200 uses different types of encoding methods for secure storage and secure transmission of the messages and the content. In an embodiment, the secure mobile communications platform 200 offers different levels of security based on a user's security needs. For example, the secure mobile communications platform 200 provides a RSA® RSA® hardware certificate, a RSA SECURID® of the EMC corporation, or a one-time key or token to consumers who require a high level of security. In an embodiment, the secure mobile communications platform 200 receives and sends requests for establishing primary communication channels 210 between enterprise data sources 102 and users via the communications module 204-C of FIG. 4.

Figure 11:
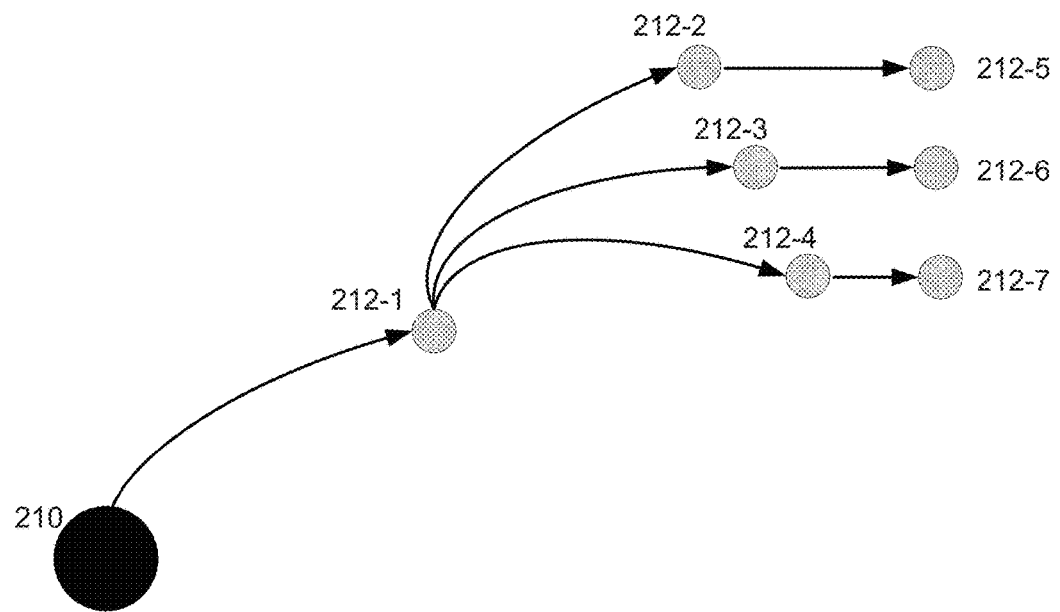
FIG. 11 illustrates a hierarchical tree in which the primary communication channel 210 is a root node and the plurality of sub-channels are child nodes, in which the hierarchical tree has a depth of four.

Referring to block 516, in some embodiments a depth of the hierarchical tree associated with a primary communication channel in the plurality of primary communication channels is N, where N is a positive integer greater than one (e.g., N is 2, 3, 4, or greater than 4). FIG. 10 illustrates a hierarchical tree with a depth of two, where the primary channel 210 is the root node and each of the sub-channels 212 are direct child nodes to the primary channel. However the present disclosure is not so limited. For instance, some sub-channels 212 may be child nodes to other child nodes 212 leading to hierarchical trees with depths of 3 or greater. FIG. 11 illustrates a hierarchical tree in which the primary communication channel 210 is a root node and the plurality of sub-channels 212 are child nodes, in which the hierarchical tree has a depth of four. Sub-channels 212-5, 212-6, and 212-7 are respective child nodes to sub-channels 212-2, 212-3, and 212-4 which, in turn, are respective child nodes to sub-channel 212-1 which, in turn, is a sub-node to primary channel 210. In the hierarchical tree illustrated in FIG. 11, secure bidirectional communication occurs between (i) a remote user device 104 associated with the first user and (ii) the enterprise data source 102 associated with the primary communication channel 210 of the corresponding hierarchical tree on one or more of the sub-channels 212.

Thus, in typical embodiments, the secure mobile communications platform 200 generates one or more sub-channels 212 from each of the established primary channels 210 associated with each user's unique identifier based on the received characteristic information for communicating with each of the users and for facilitating one or more transactions with each of the consumers within the generated sub-channels 212. The secure mobile communications platform 200 provides complete transaction support inside a sub-channel 212. Using the secure mobile communications platform 200, enterprise data sources 200 (e.g., business entities) can establish one or more primary communication channels 210 with their users (e.g., consumers), after which sub-channels 212 covering different subjects and topics and offering transaction services can be established once the users have opted in to particular sub-channels 212. Within each sub-channel, a user, participating in a private (secure) conversation with the enterprise data source can reply to a transaction message, for example, an electronic commerce (e-commerce) offer message by purchasing the ecommerce offer as disclosed in the examples below. The secure mobile communications platform 200 implements e-commerce using one or more payment infrastructures, for example, STRIPE® of Stripe, Inc., PAYPAL® of PayPal, Inc., etc.

Consider an example where an enterprise data source 102 (e.g., business entity) such as the STARWOOD® Hotel of Starwood Capital Group LLC, with a promotions team establishes a primary channel 210 with a consumer (e.g., user). The secure primary communications platform 200 retrieves characteristic information of the consumer (e.g., user profile 602 of the user) from one or more databases (e.g., user profile database 224) using the consumer's unique identifier 218, for example, the consumer's contact number. The consumer indicates, e.g., through user preferences/interests 610 in their user profile 602 of FIG. 6, an inclination to avail themselves of exclusive offers, for example, exclusive deals and exclusive packages, from the STARWOOD® Hotel via the established primary channel 210. The secure mobile communication platform 200 generates a sub-channel 210 for exclusive offers named, for example, "Special", and the promotions team of STARWOOD® Hotel sends the exclusive deals and the exclusive packages with discounts to the consumer via a conversation in the sub-channel 212. The secure mobile communication platform 200 allows the user (e.g. consumer) to perform a transaction, for example, buying of an exclusive package based on an exclusive deal within the generated sub-channel 212 using one or more payment infrastructures. Because other users cannot participate in the conversation, the transaction cannot be repudiated and privacy is ensured.

Using the secure primary communications platform 200 (e.g., channel based communication and transaction system) any enterprise data source 102 (e.g., business entity) can offer an electronic commerce channel or an electronic shopping channel. Through this electronic commerce channel or electronic shopping channel, the secure primary communications platform 200 allows the enterprise data source 102 to send deals and packages to a user (e.g., consumer) in real time, and allows the consumer to make purchases therewithin. Consider an example where an enterprise data source 102, for example, the W® Miami Hotel of Starwood Hotels & Resorts Worldwide, Inc., offers a three-night package for $500 to the first 500 consumers who opt in to purchase the package. The W® Miami Hotel establishes a primary channel 210 with each of the users (e.g., consumers) via the secure primary communications platform 200. If the consumers indicate an inclination to avail offers from the W® Miami Hotel via the established primary communication channel, the secure primary communications platform 200 generates a sub-channel 212, for example, an eShop sub-channel (by adding a conversation to the sub-channel for the user) and transmits a communication of the three-night package for $500 through this conversation hosted on the eShop sub-channel. Furthermore, the secure primary communications platform 200 facilitates a transaction service within the eShop sub-channel 212, when the consumer opts in to buy the three-night package, thereby facilitating a transaction or trading of the three-night package within the eShop sub-channel in real time. In an embodiment, the secure primary communications platform 200 identifies a new user (e.g., consumer) based on a location of the remote user device 104 associated with the new user, for example, via a positioning system and sends a hotel deal to the new user for a night stay using the sub-channel 212. In an embodiment, the secure primary communications platform 200 generates revenue from a percentage of a transaction amount associated with each transaction made within the sub-channel 212.

The secure mobile communication platform ("SMCB") 200 provides a spam free communication experience to users (e.g., consumers) as the SMCB 200 does not allow transactions to be performed in the primary channel 210 in typical embodiments. In an embodiment, the SMCB 200 provides a channel permissions mechanism that sets a semaphore flag for the sub-channel 212, for example, to true or false. By design, the SMCB 200 does not allow or display transactions in the primary communication channel. The SMCB 200 provides access control lists (ACLs) to enterprise data sources 102 for fine grained control of what can occur in the primary channel 210 or the sub-channels 212. For instance, in the example described above for the W® Miami Hotel, the SMCB 200 sends deals and packages through conversations hosted by the eShop sub-channel 212. If a user receives an offer in a non-eShop sub-channel, then that would be considered as spam, which is prevented by the SMCB 200. The SMCB 200 does not send messages or chats in the primary channel 210. The SMCB 200 sends general information related to the enterprise data source 102, for example, updated sub-channel news, names of new sub-channels, log or information tracking subscriptions to the sub-channels, disconnections from the sub-channels, etc., through the primary channel 210.

In another example, an enterprise data source 102 (e.g., business entity), for example, the EQUINOX® organization of Equinox Holdings, Inc., offers a discount on a package for spinning classes. The SMCB 200 establishes a primary channel 210 with a user (e.g., consumer) and transmits general information related to the enterprise data source 102 through the established primary channel 210. If the user indicates an inclination to avail themselves of offers from the EQUINOX® organization via the established primary channel 210, the SMCB 200 generates a sub-channel 212, for example, an eShop sub-channel (e.g. by adding a conversation to the eShop sub-channel between EQUINOX and the user), transmits a communication on the discounted package through the conversation in the eShop sub-channel, and provides a transaction service where the user can opt in to buy the discounted package via the eShop sub-channel 212. The SMCB 200 therefore generates and uses live, real time primary channels 210 and sub-channels 212 to deliver product and services to users (e.g., consumers) on a transaction basis.

In typical embodiments, an enterprise data source 102 uses the same sub-channel to communicate with multiple users. While the enterprise data source 102 can review messages sent by each of these users, each respective user cannot see messages sent by the enterprise data source 102 to other users nor can they see messages originated by other users. Accordingly, in some embodiments a first sub-channel 212 in the corresponding plurality of sub-channels associated with a respective primary communication channel 210 in the plurality of primary communication channels comprises (e.g. hosts) a first secure bidirectional conversation between (i) a first remote user device 104 associated with the first user and (ii) the enterprise data source 102 associated with the primary communication channel of the corresponding hierarchical tree, thereby facilitating secure exchange of the first plurality of messages. Moreover, the first sub-channel 212 comprises (e.g. hosts) a second secure bidirectional conversation between (i) a second remote user device associated with a second user and (ii) the enterprise data source associated with the primary communication channel of the corresponding hierarchical tree, thereby facilitating secure exchange of a second plurality of messages. The first user cannot see any of the messages in the second plurality of messages. The second user cannot see any of the messages in the first plurality of messages. The enterprise data source 102 can see all the messages in the first plurality of messages and the second plurality of messages.

In some embodiments, this above-described one-to-one aspect of the communication between a given enterprise data source 102 and respective users is imposed using application program interface ("API") keys and tokens, where the API key identifies a particular enterprise data source resource 102, such as a particular sub-channel 212 belonging to a particular enterprise data source resource 102 and the API token indicates the identity of source message or content. For instance, in such embodiments, when the enterprise data source 102 wishes to post content on a particular sub-channel 212, a content post request is made, which includes the message or content to be posted to the sub-channel 212. The post request further includes the API key thereby identifying the correct sub-channel 212 of the enterprise data source 102 and the API token, thereby identifying the originator of the content or message (here, the enterprise data source 102). In some such embodiments, the API token not only serves to identify the originator of the content, it also serves to designate what access privileges the originator of the content or message have over the sub-channel 212. In some embodiments, the post request will further include a chatroom identifier (e.g., conversation identifier) and/or chatroom consumer identifier (e.g., conversation user identifier). In typical embodiments, only one user will have access to such a chatroom (conversation), thereby establishing the one-to-one communication between an enterprise data source 102 and an end user.

In another illustrative embodiment, a first message in a first plurality of messages is posted by the enterprise data source 102, where the first message is (a) associated with an application programming interface key identifying the sub-channel of the enterprise data source and (b) a first application programming interface token identifying the first user. Further, a second message in the second plurality of messages is posted by the enterprise data source 102. The second message is associated with (a) the application programming interface key identifying the sub-channel of the enterprise data source and (b) a second application programming interface token identifying a second user associated with a second remote user device. In this example, the first application programming interface token and the application programming interface key are used to route the first message to the first remote user device within the sub-channel 212. The second application programming interface token and the application programming interface key are used to route the second message to the second remote user device within the sub-channel. Thus the first message is in a first conversation hosted by the sub-channel and the second message is in a second conversation hosted by the sub-channel.

FIG. 12 illustrates the format of an example post request in accordance with one aspect of the present disclosure. The post request includes a unique identifier representing a specific chatroom (conversation) 1202, the content of the message 1204, the content of the message if using controls 1206, the identifier of the author of the post 1208, the name of the author of the post 1210, a chatroom (conversation) identifier that identifies a chatroom (conversation) 1212 to which the message is to be posted, an identifier of the consumer (end user) of the message 1214, and optionally, an identifier of the administrator 1216 of the sub-channel 212 that is hosting the specific chatroom (conversation).

In some embodiments, messages posted on sub-channels are encrypted at the originating device (e.g., remote user device 104 or enterprise data source 102) using private information. For instance, if the message is posted by the end user, private information associated with the end user, or the end user's remote device, is used to encrypt the message. If the message is posted by the enterprise data source, private information associated with the enterprise data source is used to encrypt the message.

Figure 5B:
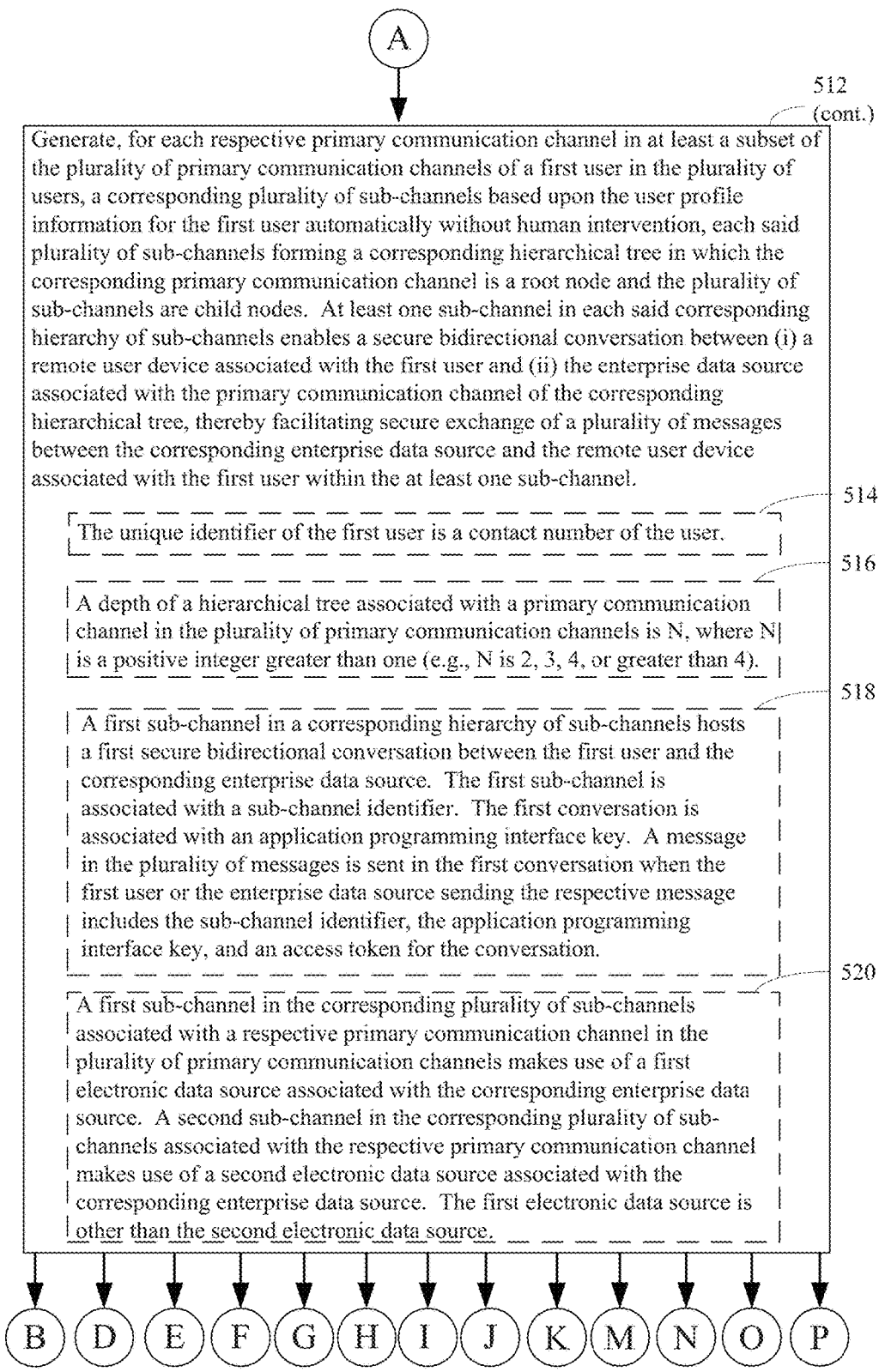

Referring to FIG. 5B, in some embodiments a sub-channel 212 in a hierarchy of sub-channels is associated with a sub-channel identifier, and an application programming interface key, and a message in the plurality of messages is sent in the sub-channel when the first user or the enterprise data source sending the respective message includes the sub-channel identifier, the application programming interface key, and an API key. The API key serves to specify the access rights of the message originator.

In some embodiments, each of the sub-channels 212 associated with a given enterprise data source 102 is used to perform a different customer service task. For instance, referring to FIG. 9, one sub-channel 212 may be used to offer a service such as "discovering best places," another sub-channel 212 may be used to offer the "latest buzz" while still another sub-channel 212 may be used to offer "new openings."

Each such sub-channel may host a number of conversations, each conversation between the enterprise data source and a different end user. The enterprise data source 102 is associated with (e.g., participates in) each of the conversations. Each conversation is with only a single user of a remote user device 104.

Referring to block 518 of FIG. 5B, in some embodiments, to ensure that each conversation in a plurality of conversations taking place on a single sub-channel 212 is secure, that is only the intended user can see messages in a conversation, the sub-channel 212 is associated with a sub-channel identifier and the conversation within the sub-channel is associated with an application programming interface key. A message is sent within (posted to) the conversation in the sub-channel when the user (associated with the remote user device 104) or the enterprise data source 102 (that is associated with the sub-channel) sending the respective message includes the sub-channel identifier, the application programming interface key, and an access token. The access token serves to identify the access rights of the message originator to the conversation.

Block 518 provides just one example of the use of API keys and tokens. In some embodiments of the present disclosure, API keys designate a number of operation available in the secure mobile communication platform 200, including but not limited to, defining an enterprise data source 102 within the secure mobile communication platform 200, defining each primary communication channel 210 associated with the enterprise data source 102, defining each sub-channel 212 associated with the enterprise data source, connecting a user to a primary communication channel 210, and so forth.

Each sub-channel 212 can be set up to access data in a manner that is independent of other sub-channels. Thus, referring to block 520, in an example embodiment, a first sub-channel 212 in the corresponding plurality of sub-channels associated with a respective primary communication channel 210 makes use of a first database (or other form of information such as an external system that accesses data) associated with the corresponding enterprise data source 102. For instance, this first database may be related to a payment system used by the enterprise data source 102 to obtain payment for goods and/or services provided to users. A second sub-channel 212 in the corresponding plurality of sub-channels associated with the respective primary communication channel 210 makes use of a second database (or other form of information such as an external system that accesses data) associated with the corresponding enterprise data source. The first database is other than the second database. For instance, the second database may be related to a system used for tracking customer complaints or the shipment information for customer orders.

Conditional Invocation of Human Support.

Sub-channels 212 support numerous chat rooms, with each such chat room consisting of a conversation between an enterprise data source 102 and a single user. That is, each such conversation in a sub-channel is between (i) the enterprise data source 102, or a proxy for the enterprise data source 102, and (ii) a single user associated with a remote user device 104. Messages placed in such conversations by the enterprise data source 102 are delivered to the remote user device 104 of the associated user, who is typically allowed to consume the message only once. Advantageously, in some embodiments, the messages in a conversation in a sub-channel are created by automated human interface modules associated with a sub-channel. Such automated human interface modules parse messages and other responses by a user in a conversation and use this input to determine suitable reply messages to send to the user. When the automated human interface module is not able to parse the messages adequately, the automated human interface module may refer the conversation to another automated human interface module or to the queue of a live operator of the sub-channel.

Block 522 of FIG. 5C illustrates how this is accomplished in accordance with one embodiment. A first sub-channel 212 in the corresponding plurality of sub-channels associated with a respective first primary communication 210 channel in a plurality of primary communication channels hosts a first conversation between the enterprise data source 102 corresponding to the first primary communication 210 and a first user. The first conversation has a first human intervention status. When the first human intervention status is deemed automated, messages in the first conversation from the remote user device 104 associated with the first user are processed by a first automated human interface module. When the first human intervention status is deemed non-automated, messages in the first conversation from the remote user device 104 associated with the first user are placed in a queue for processing by a human associated with the corresponding enterprise data source 102 of the first sub-channel 212.

In some embodiments, a user input specifically triggers the change from automated to non-automated. For example, the user might say "I want to talk with an operator", and that might result in reclassifying further messages in the conversation such that they are routed to a non-automated agent (human call center rep, e.g.). This routing could in principle change back and forth many times during a conversation, between an automated agent (the first human intervention status of the conversation is deemed automated) and a non-automated (human) agent (the first human intervention status of the conversation is deemed non-automated).

As noted above, several conversations may concurrently be held on a sub-channel, of which only one is with a particular end user. The status of each of these conversations may be different. For instance, consider the case where there are seven conversations concurrently being held on a given sub-channel. In this example, four of the conversations may be deemed automated and serviced by an automated human interface module whereas the remaining three may be deemed non-automated and serviced by a human operator.

In some embodiments, a trained classifier is used to monitor conversations on a sub-channel 212 for the purpose of changing the status of such conversations from automated to non-automated. For instance, such a trained classifier may parse the messages posted by users for certain keywords such as "operator" or other words or events that have been determined to be associated with a need for human intervention. For instance, the user may have looped through several different nodes of an automated human interface module and may be getting frustrated. Advantageously, in some embodiments, classifiers are trained based on the broad aggregate of user interactions from a plurality of users over time.

Referring to block 524 of FIG. 5C, in some embodiments, when the first human intervention status of a first conversation is deemed to be automated, the method further comprises applying messages on the first sub-channel from the remote user device associated with the first user to a trained classifier associated with the first sub-channel thereby obtaining a classifier result. When the classifier result falls into a predetermined category, the first human intervention status is changed from automated to non-automated until a predetermined event occurs. Referring to block 526, this predetermined event may be, for example, a break in communications in the first conversation, the elapsing of a predetermined amount of time, or a manual switch of the first human intervention status from non-automated to automated by a human operator associated with the corresponding enterprise data source. Referring to block 528, in some such embodiments, the classifier produces a binomial classification and the predetermined category is one of the two outputs of the classifier. Referring to block 530 of FIG. 5C, in some such embodiments, the classifier is a decision tree, a random forest, a Bayesian network, a support vector machine, a neural network or logistic regression. Referring to block 532, in some embodiments, the classifier is trained across the conversations of a plurality of sub-channels 212 using feedback data provided by the plurality of users regarding a plurality of their interactions with the server system using the sub-channels. Referring to block 534, examples of such interactions include electronic payment processing, customer sign-up, and customer service by the plurality of users using the sub-channels provided by the server system.

Figure 5D:
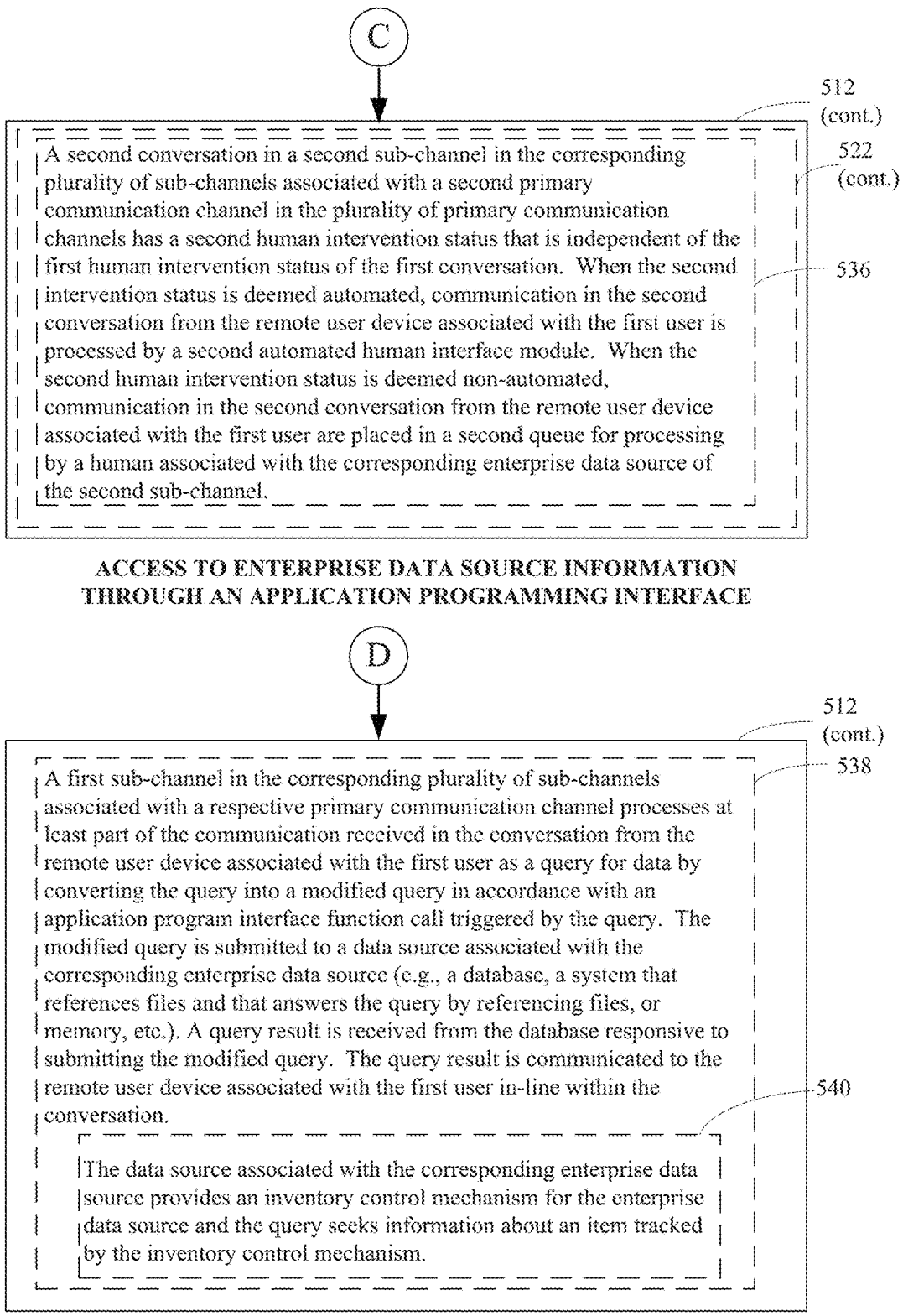

A first user may have one conversation in one sub-channel with a first enterprise data source 102 that is deemed automated while having another conversation in another sub-channel with a second enterprise data source 102 that is deemed non-automated, or vice versa. That is, the status of each conversation is independent. Block 536 of FIG. 5D illustrates. A second conversation in a second sub-channel 212 in the corresponding plurality of sub-channels associated with a second primary communication channel 210 in the plurality of primary communication channels has a second human intervention status that is independent of the first human intervention status of the first conversation. When the second intervention status is deemed automated, communication in the second conversation from the remote user device associated with the first user is processed by a second automated human interface module. When the second human intervention status is deemed non-automated, communication in the second conversation from the remote user device associated with the first user are placed in a second queue for processing by a human associated with the corresponding enterprise data source of the second sub-channel.

Access to Enterprise Data Source Information Through an Application Programming Interface.

Referring to block 538 of FIG. 5D, a first sub-channel 212 in the corresponding plurality of sub-channels associated with a respective primary communication channel 210 process a communication received from a remote user device associated with the first user in the conversation as a query for data by converting the query into a modified query in accordance with an application program interface function call triggered by the query received from the first user. In some embodiments, the modified query is submitted to a database associated with (electronically addressable by) the corresponding enterprise data source 102. However, the present disclosure is not so limited. In some embodiments, the modified query is submitted to any electronic data source or system that retrieves electronic data and that has been designated for such purpose by the enterprise data source 102. This can be, for instance, a system that references files or is capable of addressing any kind of non-transitory memory storage mechanism. This system may be owned or leased by the enterprise data source, or may be in the public domain, depending on the application. A query result is received from the data source responsive to submitting the modified query. In some embodiments this query request is reformatted. The reformatted query result is then communicated to the remote user device 104 associated with the first user directly in-line within the conversation between the enterprise data source 102 and the remote user device 104. In one use case, the client side communication module 204-C (FIG. 4) invokes a first API call within a conversation. In response to this API call, the communications module—enterprise source side 204-E (FIG. 3) receives the API call and makes another API call to a back-end system associated with the corresponding enterprise data source 102 and gets a result. The query result is processed into another format by the communications module—enterprise source side 204-E and this result is returned to the client side communication module 204-C (FIG. 4) for display in the conversation.

Referring to block 540 of FIG. 5D, in some embodiments, the data source associated with the corresponding enterprise data source 102 provides an inventory control mechanism for the enterprise data source and the query seeks information about an item tracked by the inventory control mechanism.

Automated Human Interface Modules 2202.

Figure 22:
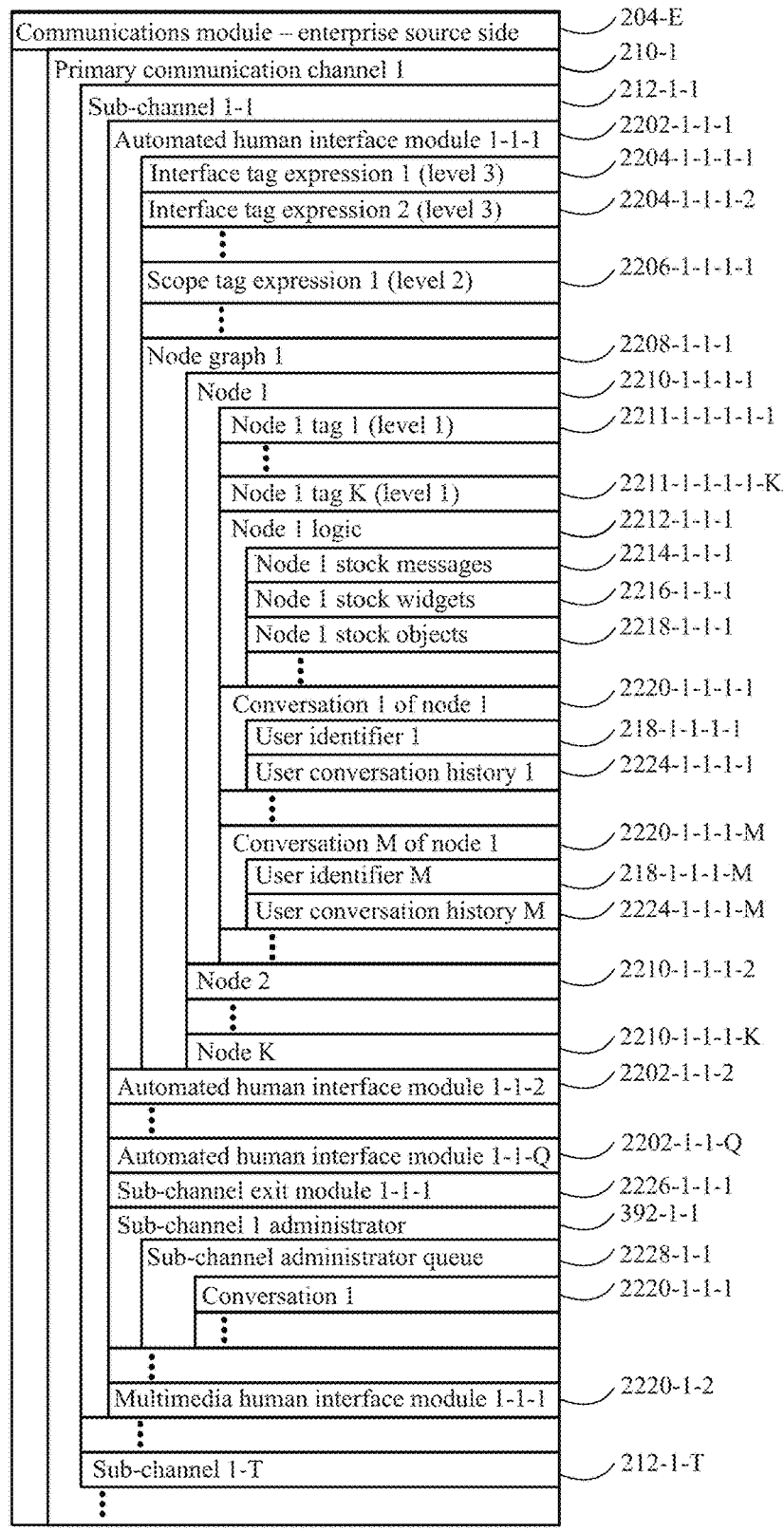
FIG. 22 illustrates a plurality of automated human interface modules ("automated messaging bots") in accordance with an embodiment of the present disclosure.

Referring to FIG. 22, the disclosed secure mobile communication platform 200 provides a plurality of automated human interface modules ("automated messaging bots")

2202 and a system for managing and deploying these automated messaging bots. Each automated messaging bots reflects a defined message and/or transaction capability. Automated messaging bots can contain a range of content and functionality, from a simple static response, to sophisticated knowledge systems that can power automated conversations leading to solutions and integrated transactions with external systems; e.g. payments, reservations, etc. The secure mobile communication platform 200 supports the generation of custom, native, intelligent automated messaging bots 2202, selection of automated messaging bots from third party platforms, and defining flexible integrations of these automated messaging bots into automated messaging response networks.

Automated Messaging Bots.

Each automated messaging bots 2202 provides a certain scope and capability for automatically engaging end users in a conversational flow. Functional transactions can also be integrated into conversational exchange. The goal is for each automated messaging bot 2202 to help end users typically either resolve a question/problem or to fulfill a specific transaction, all via the disclosed messaging communications framework. An end user's conversation 2220 with an automated messaging bots is initiated when the initial message from the end user associated with a remote user device 104 is assigned to the automated messaging bot 2202. The automated messaging bot 2202 will initiate a response to the initial message based on its available logic. The end user's selection of available predefined responses or a typed message response are the triggers the bot 2202 uses to navigate the end user through it's available content logic (node graph 2208). If an automated messaging bot's exit criteria/conditions are met, the conversation either ends or is moved out of the bot 2202 and is either reassessed by the system, moved to a live support message queue 2228, or reassigned to another automated messaging bot 2202 (e.g., one that has a different logic flow and thus will provide a complementary orthogonal end user experience).

Bot Creation and Management.

Some embodiments of the disclosed systems and methods provide the ability to create, manage and administer bots 2202 to make them available for use in creating, editing, or deleting bots 2202 via a primary communication channel user interface, by either using a user interface based automated message flow builder or by uploading VXML, or properly formatted JSON files.

Bot Designer.

Some embodiments of the disclosed systems and methods provide a user interface based bot 2202 designer to assist in the creation and editing of the automated message flows within bots 2202. Referring to FIG. 22, in some embodiments this automated message flow is manifested as a node graph 2208. The bot 2208 designer includes the ability to define the name of the automated message bot, create, edit, and delete individual nodes 2210 in the bot 2202, the ability to expand/collapse node 2210 branches, the ability to see and edit the message content for a node 2210 (e.g., stock messages 2214, stock widgets 2216, stock multimedia objects 228), and the ability to see node traversals (e.g., when one or more nodes 2210 connect to a different node).

In some embodiments, a node 2210 of a bot 2202 reflects a predetermined decision point within the bot. The bot tries to evaluate an incoming message from a remote user device 104 by parsing the incoming for recognized keywords and phrases. Based on detection of such keywords, the automated human interface module 2202 will progress the end user in a particular direction within the node graph 2208.

Thus, the use of nodes 2210 within a bot 2202 is similar to walking through a decision tree, with different nodes 2210 in the bot 2202, where the bot knows the position of an end user in the decision tree and can progress the end user in the node graph 2208. However, the analogy to the decision tree here is merely exemplary. More generally, nodes 2210 in the node graph 2208 embody a logic that can evaluate messages, and based on this evaluation, take some action such as send a message to the end user and/or send the conversation 2220 associated with the end user to another node in the node graph 2208 of the bot 2202, the node graph 2208 of another bot 2208, or to the queue 2228 of a live operator (e.g., the sub-channel 1 administrator 392) depending on the end user message, the choices made by the end user, the user conversation history 2224, etc.

In some embodiments, the automated human interface module 2202 designer further includes the ability to add, edit, and delete the end user's response options (e.g. option buttons provided in a widget 2216) per node 2210. Such response options, include, but are not limited to, an ability to define a specific destination node 2208 for each end user option, an ability to define a node option to close a chat session (e.g., by user selecting the session closing "problem is resolved" option, and in some embodiments with the system able to send a final response within the conversation such as "Happy to help, have a great day"), connecting to a different bot 2202, ability to move the end user to a different automated human interface module 2202 ability to select a specific destination node 2210 within the node graph 2208 of the bot 2202, ability to have the bot 2202 send multiple separate messages to the end user in the conversation 2220 in sequence, for instance one right after the other (near instantaneous), ability to add, change or delete an embedded third party widget 2216 (e.g. payment transaction) for a node 2210, ability to add, change or delete a predefined system widget 2216 (e.g.: list picker for a list of service or production options, date picker, etc., a visual indicator for whether a node 2210 has any node tags 2211 associated with it. A tag is a single keyword or phrase and can be assigned by the enterprise data source 102.

Tags reflect a single keyword or phrase and can be assigned to specific nodes 2210 within a node graph 2208 of an automated human interface module 2202 and for the overall scope of the automated human interface module 2202 when an end user's conversation 2220 has been entered into the automated human interface module's 2202 automated message flow (node graph 2208).

In some embodiments, the automated human interface module 2202 administrator interface based bot 2202 designer provides the ability to add, edit, and delete one or more node level tags 2210, the ability to add, edit, and delete one or more human interface module tags 2204 and scope tags 2206, and the ability to add a multimedia human interface module 2232 to one or more nodes 2210 in a node graph 2208 of an automated human interface module 2202. As illustrated in FIG. 22, each node tag 2211 is required to point to a specific node 2210 in the node graph 2208 of an automated human interface module 2202. However, as further illustrated in FIG. 22, node tags 2211 can be grouped, that is multiple node tags can all point to the same node in the node graph 2208 of an automated human interface module 2202.

Multimedia Library.

Primary communication channel administrators 380 can configure one or more multimedia libraries by uploading objects 2218 such as images, audio files, movie files, reference documents (e.g. PDF) files. Each object 2218 can optionally be tagged with one or more keywords or phrases. Each object 2218 can be assigned to a bot 2202 node 2210, as the bot's response to end user input. If the bot 2202 includes a reference to a multimedia human interface module 2232, discussed below, any node response option can be configured to check for automated content from the multimedia content provided by the multimedia human interface module 2232. There is provided the option to filter by media type and ability to specify specific tags, or pass through the tag history associated with the end user responses from the current conversation (e.g., the user conversation history 2224).

Multimedia Human Interface Module 2232.

In some embodiments a multimedia library is configured to behave like an automated reference system that is made available as a multimedia human interface module 2232 ("multimedia bot"). The multimedia bot can operate at the sub-channel level 212 level, as illustrated in FIG. 22, parallel to various other bots assigned to the sub-channel 212. For example, a given sub-channel 212 may have five bots 2202, each such bot handling a set of conversations, and further the given sub-channel 212 may have one or more multimedia bots 2232 that listen in on the conversations within the sub-channel and provide multimedia objects to these conversations when there is a match between the tags to objects accessible to the multimedia bot 2232 and content in the conversations (e.g., messages from the users associated with end user devices 104). In still other embodiments, a multimedia bot 2232 may operate a widget 2216 at a particular node 2216 within an automated human interface module 2202.

The multimedia human interface module 1-1-1 2232 can be configured to be active for only dedicated requests from a bot node 2202 (e.g., as specific nodes 2210 within the bot node) and/or custom message responses a user provides while interacting within a bot. In some embodiments, a maximum response time for the message mot 2232 to provide a multimedia object to a query is specified. In some embodiments, a default is provided. This is done to ensure that the multimedia object is provided within the right context in a conversation. For instance, consider the case where the multimedia bot 2232 has detected the tag "Los Angeles" which is associated within the bot 2232 with a picture of Los Angeles. Posting of the image into the conversation in which the tag "Los Angeles" was detected is only appropriate within a certain period of time after the message containing the tag was posted into the conversation. Thus accordingly, in some embodiments, if the multimedia human interface module 2232 seek request takes longer than allowed, the search will be abandoned. In some embodiments, there is an option for defining how many tags from a user's current tag history (found in the user conversation history 2224 for the user) to include per search sequence by the multimedia human interface module 2232.

Figure 23:
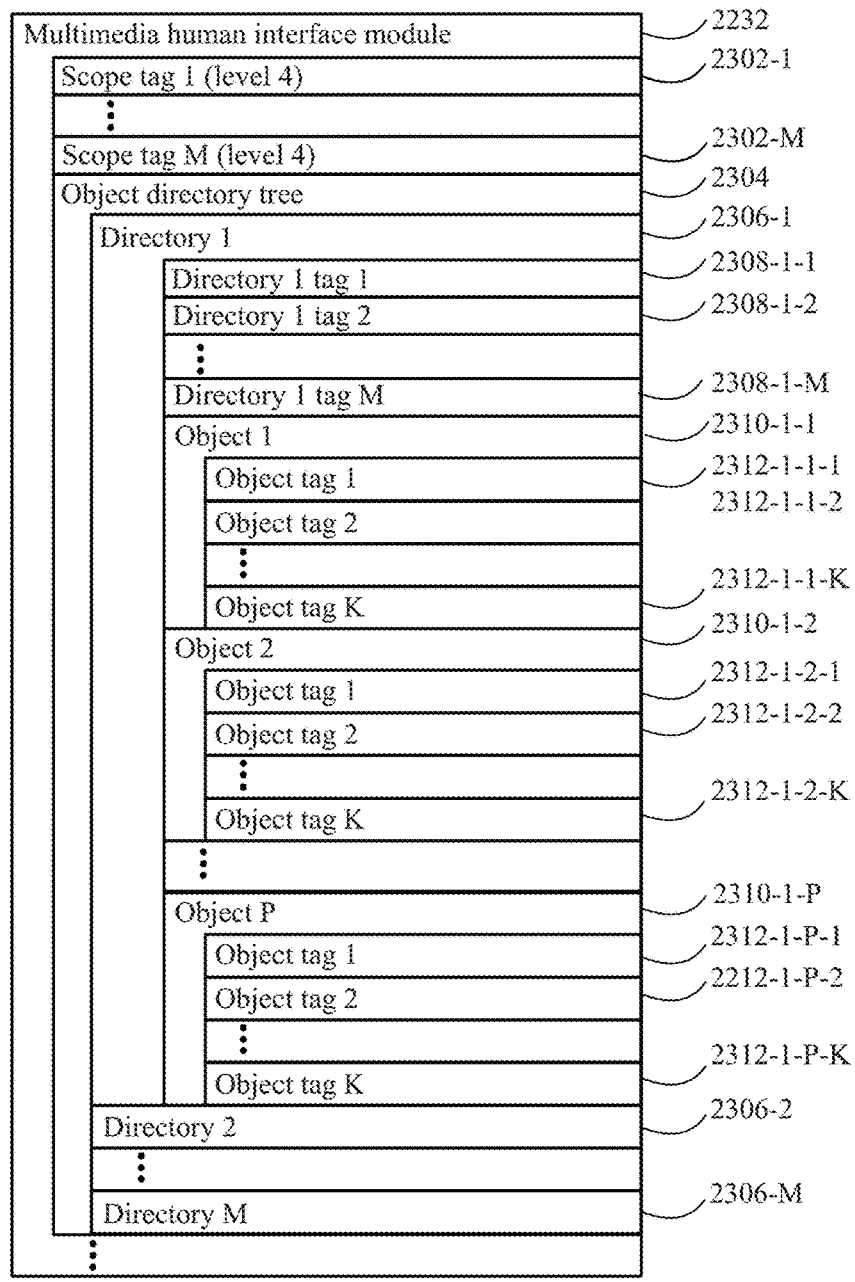
FIG. 23 illustrates a multimedia human interface module in accordance with an embodiment of the present disclosure.

Referring to FIG. 23, in some embodiments, the multimedia human interface module 2232 makes use of tags at two (or three) levels. Multimedia module 2232 scope tags 2302 provide one or more keywords or phrases that can be used as triggers, when detected in messages from users in conversations, for automated retrieval of multimedia content (or at least activation of the multimedia module 2232 to perform a search. Each object (e.g., media file) 2312 to be made available as part of the multimedia module 2232 is tagged with one or more object tags 2312. Further, as illustrated in FIG. 23, in some embodiments, objects 2310 are arranged into directories 2306. For instance, each directory can represent a different product offered by the enterprise data source 102. Although FIG. 23 illustrates a directory tree with one a single layer of sub-directories, in principle such directories can be nested to any desired level, so that a directory may have sub-directories, which in turn may have sub-directories, and so forth, which each level of sub-directories having their own independent directory tags 2308.

Parallel Content Channels.

In some embodiments, one or more of the following functionalities are included in the multimedia human interface module 2232: the ability to define specific content (objects 2310) to be added to the object directory tree 2304, the ability to assign the content to an organizational branch (directory 2306) in the object directory tree 2304 or a section of the branch and/or the ability to enable/disable parallel content channels by defining the inclusion of the multimedia human interface module 2232 into a node 2210 of an automated human interface module 2202.

Upsell Content.

In some embodiments, among the stock messages 2214, stock widgets 2216 and stock objects 2218 is content that represents an initial inquiry message that can be added to a conversation by the automated human interface module 2202. For example, "Would you be interested in upgrading to the product version X? Provides X better performance and you may qualify for a special offer? (Yes) (No). If the answer in the conversation from the user device 104 associated with the user in the conversation is "Yes", the automated human interface module 2202 takes any of the following predetermined options in accordance with the node logic 2212 for the node 2210 that imposed this question: a target node 2210 in the currently active automated human interface module 2202 and in the current conversation, a target node 2210 in another active automated human interface module 2202 and in the current conversation, or to a new conversation in another automated human interface module 2202.

Advertising Content.

In some embodiments, the enterprise data source can include advertising content among the stock messages 2214, stock widgets 2216 and stock objects 2218 of a node 2210 in an automated human interface module 2202. This includes defined messages and/or a media file (link to a multimedia object, a link to an external advertisement platform). Such a configuration can include getting the communications module—enterprise source side 204-E to send a list of tags or organized parameter mappings to such an external advertisement platform. In some such embodiments, the communications module—enterprise source side 204-E would then make an application programming interface call and receive an advertisement image in response and post this ad image into the conversation. Included in such embodiments is the ability to define placement of the advertisements (e.g., at what nodes in the node graph 2208 such advertisements are possible), when they are to be presented, what options are provided with such advertisements, what advertisement responses are solicited from the user (e.g., a menu of options like "tell me more," or "dismiss"), and the ability to designate a dedicated advertising area in the user interface application provided by communication module—client side 204-C of FIG. 4. In some embodiments, beyond the simple, available organizational structure for media libraries illustrated in FIG. 23, it is possible to create a specialized custom multimedia library reference bot containing a blend of conversational node logic as illustrated in FIG. 22 with direct links to various multimedia files at specific nodes 2210.

VXML Import.

Setting up node graphs 2208 to direct user conversations within sub-channel 392 can involve some work, particularly when more complex decision logic is desired. Advantageously, one embodiment of the present disclosure provides for importing call center logic, which is typically in VXML format. VXML is a digital document standard for specifying interactive media and voice dialogs between humans and computers. It is used for developing audio and voice response applications, such as banking systems and automated customer service portals. In some embodiments, an enterprise data source 102 (e.g., the enterprise data source super administrator 378, the primary communication channel administrator 382, the sub-channel administrator 392) can provide support flow data in VXML format and load that into the communications module—enterprise source side 204-E. In such embodiments, the enterprise data source 102 defines a name for the new imported automated human interface module 2202. Further the enterprise data source either uploads a VXML file directly, or copies and paste the VXML content into an entry field in the user interface provided by some embodiments the communications module—enterprise source side 204-E. Then the user clicks on a button (e.g. "Create" to initiate the process that converts the VXML into an automated human interface module 2202. In so doing the VXML file is parsed, and VXML data is validated to ensure proper formatting. If the validation fails an error message, identifying any validation issues, is displayed. In some embodiments, the data is converted into an automated human interface module 2202 specific JSON file format that represents the internal mapping, organization and overall data structure for the automated human interface module 2202, including the node graph 2208 which embodies message flows hosted by the automated human interface module 2202. The uploaded data can then be reviewed and edited in an automated message bot editor provided in some embodiments of the communications module—enterprise source side 204-E.

JSON Import.

In some embodiments, automated human interface modules 2202 are coded in a custom JSON structured data format that stores the bot's node graph 2208 (message flow network). In some embodiments, an enterprise data source 102 is able to directly create native JSON files that can be uploaded into the communications module—enterprise source side 204-E. The process includes automatic validation of the format, structure and specific parameter nomenclature. Validation issue notification alerts the enterprise data source 102 to the problems the communications module 204-E found.

Automated Human Interface Module Store.

The development time often required to generated logic that directs a conversation automatically and yet provides a user with a good customer experience can be extensive. Advantageously, in some embodiments of the present disclosure, the secure mobile communications platform 200 provides an array of predefined default automated human interface module 2202 templates. Each template provides a node graph that contains placeholder content for an enterprise data source 102 to customize for their purposes. In some embodiments, available templates are presented in a "Bot Store" and can include automated human interface module 2202 and/or multimedia human interface modules 2232 created by registered entities of the secure mobile communication platform 200 (e.g., registered enterprise data sources 102). Examples of such template automated human interface modules 2202 include, but are not limited to, different payment bots. For instance, one sample payment bot could comprise a node graph 2208 that encodes a linear flow that leads a user in a conversation through a product/service selection process, payment transaction, and ends with the receipt getting stored in the user's file storage. Another sample bot could comprise a node graph that simply provides basic store information such as location and office hours. The template customer would select a template from the list and then customize the necessary nodes 2210 in the node graph 2208 of the template with the business and specific content. In some embodiments, the enterprise data source 102 administrator has the option of following a step by step wizard to enter in the content for all the nodes 2210 in the node graph 2208 of the template module 2202 that require customized content or preferred widgets 2216 (e.g. payment widget). In some such embodiments, during this process, a "node graph network view" will visually indicate all nodes 2210 that still require customization. In this view, the enterprise data source 102 administrator clicks on a node to edit it. Further the enterprise data source 102 administrator can save an incompletely customized template. However, in some embodiments, template automated human interface modules 2202 and/or multimedia human interface modules 2232 can only be activated for a sub-channel 212 if all required customization nodes have been updated.

Automated Human Interface Module Template Designer.

In some embodiments, templates for automated human interface modules 2202 are created with a template design module. In some embodiments, a basic configuration option identifies the module 2202 as a template. The templates are defined by creating the underlying content and functional flow logic structure comprising the node graph 2208. Any node 2210 in the node graph 2208 can be defined as a customization node and it is intended for the enterprise data source 102 administrator to define the content for such nodes for their own use. For instance, in some embodiments, the enterprise data source 102 administrator specifies a title and description/help text for each customization node. This is to help the enterprise data source 102 administrator with defining appropriate content for the node 2210.

Automated Human Interface Module Template Distribution.

In some embodiments, templates for automated human interface modules 2202 have a configuration option relating to distribution. In such embodiments, this configuration option (default setting is "off") can be enabled to make the template available to all enterprise data sources 102 making use of the secure mobile communications platform 200. In some such embodiments where such bot templates can be distributed, the bot template will require input for the following metadata (i) title/name, (ii) description, purpose, scope, solution provided, (iii) category (e.g., select up to three from a predefined list), and (iv) price (can be defined as free).

Third Party Automated Human Interface Modules.

In some embodiments, the secure mobile communications platform 200 enables third party bots to be used in the platform 200. In some embodiments, two approaches are made available to select third party bots. First, the secure mobile communications platform 200 provides a 'web hook' integration infrastructure that enables secure mobile communications platform 200 customers to connect to third party bot platforms (via the secure mobile communications platform 200 developer interface). A specific third party bot is made available via such integration. Second, generic/customizable third party bots can be added as automated human interface modules 2202 to a store by a developer defining a third party 'web hook' integration as available for 'distribution"/'the Bot Store". In such embodiments, the following metadata is provided with such third party bots: (i) bot title/name, (ii) description, purpose, scope, solution provided, (iii) category (e.g., select up to three from a predefined list), and (iv) price (can be defined as free).

Primary Communication Channel 210 Manager Manual.

In some embodiments, any automated human interface module 2202 that has been created and enabled for a primary communication channel 210 becomes available in the primary communication channel 210 manager interface. Sub-channel 212 managers can select from any of the available modules 2202 (as well as selecting specific widgets 2216 (e.g. payment widgets), multimedia library content, etc. and deploy them as a response to a user's incoming message in a conversation 2220. An end user who is entered into an automated human interface module 2202 will then be engaged by the automated human interface module's 2202 automated messaging conversation 2220 (e.g., navigated though the node graph 2208 of the module 2202) until the automated human interface module 2202 exits the end user. An end user who is returned to the live person message queue (e.g., the sub-channel administrator queue 2228) will show up at the bottom of this queue.

Sub-Channel Based Automated Human Interface Module Auto Assignment.

In some embodiments, and as illustrated in FIG. 22, secure mobile communications platform 200 administrators can select one or more available automated human interface modules 2202 and third party automated flow bots and assign them to one or more sub-channels 212. In some such embodiments, if a single automated human interface module 2202 is selected, any end user messages sent through that sub-channel 212 is moved into the automated flow (node graph 2208) of that module 2202. If multiple automated human interface modules 2202 are assigned to a sub-channel 212, then an automatic automated human interface module 2202 assignment protocol is activated and all incoming messages are processed to send the end user to the most thematically appropriate automated human interface module 2202.

In some embodiments, there is provided the ability to enable/disable automated human interface module 2202 assignments for a primary communication channel 210 (across all sub-channels 212).

In some embodiments, there is provided the ability to refine/override primary communication channel 210 based schedule at the sub-channel 212 level. In such embodiments, for example, sub-channel A of a given primary communication channel may have different automated human interface modules 2202 activated than sub-channel B of the given primary communication channel.

In some embodiments, the enterprise data source 102 administrator is given clear user interface indications as to whether automated human interface modules 2202 are active or inactive at a sub-channel 212 level.

In some embodiments, there is provided an ability for secure mobile communications platform 200 administrators (e.g., enterprise data source super administrator 378, primary communication channel administrator 380) to define an automated human interface module 2202 activity schedule that can be edited at any time. In some embodiments, sub-channel 212 administrators 392 may review the schedule but cannot edit the schedule. In some embodiments, sub-channel 212 administrators 392 may review the schedule and edit the schedule.

Third Party Automated Human Interface Module 2202 Integration.

In some embodiments, the secure mobile communications platform 200 provides the flexibility for integrating third party automatic message bots, and mixing and matching the third party bots with secure mobile communications platform's 200 native automated human interface modules 2202 into a sub-channel 212 by:

assigning a single or multiple automated human interface modules 2202 (with sub-channel 212 level automated human interface module 2202 auto assignment) to a single sub-channel, assigning a single third party bot to the single sub-channel 212, assigning a combination of native automated human interface modules 2202 and third party bots (with sub-channel 212 level automated human interface module auto assignment) to the single sub-channel, or assigning single or multiple automated human interface modules 2202 (with auto assign) and connection to third party bots from within an automated human interface modules 2202; e.g. a given node 2210 with an automated human interface modules 2202 can transfer a conversation to a third party bot or to another (native) automated human interface module 2202.

Automatic Human Interface Module 2202 Assignment Protocol.

In some embodiments, when two or more automated human interface modules 2202 are assigned to the same sub-channel 212, then the enterprise data source 102 administrator is prompted to specify unique interface tag expressions 2204 (e.g., exclusive keywords or phrases for each selected automated human interface module 2202) to each automated human interface module as illustrated in FIG. 22. Both native automated human interface modules 2202 and third party automated human interface modules 2202 are assigned interface tag expressions 2204. Then, when a new unassigned conversation 2220 is initiated on the sub-channel by way of an incoming message from an end user, the content of the end user's message is scanned for matches between this content and the interface tag expressions 2204. In some embodiments, when a match is found between an interface tag expressions 2204 of a particular automated human interface module 2202 in the sub-channel, the conversation is routed to that particular automated human interface module 2202. In some embodiments, the enterprise data source 102 administrator has the ability to add, edit, delete these interface tag expressions 2204. Thus, when an end user submits a message to the sub-channel 212, the system looks for any [tag] matches between the message content and the interface tag expressions 2204 defined for any of the automated human interface modules 2202 assigned to the sub-channel. The conversation is moved into the best matching automated human interface module 2202.

In some embodiments a "default response mode" is enabled for a sub-channel 212. In such instances, one of the automated human interface modules 2202 is designated as a default 'bot' for the sub-channel and represents the default bot to be selected in case no interface tag expression 2204 matches are found for any of the primary assigned automated human interface modules 2202.

In some embodiments, a sub-channel exit module 2226 is provided. A primary purpose of this exit module is to reengage the automatic human interface module 2202 assignment anytime a user responds to a flow based message with a custom/typed response that moves the user out of the automated human interface module 2202 they were inserted into and conversing with. In some such embodiments, there is an associated configuration option to not allow the user to be reentered into the same automated human interface module 2202 they were just moved out of By default this option is enabled, e.g., allowing the sub-channel 212 to reenter the user into the same automated human interface module 2202 they just exited. In some embodiments, there is an added option to define an appropriate message for reinserting the user into the same automated human interface module 2202, for example, "Let's try rebooting your modem again."

Unattended Mode.

Some embodiments of the present disclosure provide a full automatic mode by which the sub-channel 212 operates. In such embodiments, if the unattended mode is "on", all conversations 2220 that exited an automated human interface module 2202, will automatically be reassessed at the sub-channel 212 level using, for instance the automatic human interface module 2202 assignment protocol described above in which the user conversation history is searched from matches to the interface tag expressions 2204 of participating automated human interface modules 2202. If the conversation 2220 can't be matched to any assigned automated human interface modules 2202 in this manner, the conversation 2220 is routed to the default automated human interface module 2202, which is intended to provide a prepared close to the conversation.

Session Reassessment Mode.

In some embodiments, in scenarios where a user's incoming message fails all tag matches, the system will assign the message either into the live chat support (e.g., sub-channel administrator queue 2228 of FIG. 22) or the default automated human interface module (in "unattended mode") by default. When "session reassessment mode" is enabled, the system will instead automatically present the user with a message that asks the user to select from a list of options, which are based on a (to be selected) list of interface tag expressions 2204 from any available automated human interface modules 2202 attached to the sub-channel 212. For example, assume there are two available automated human interface modules 2202 in the sub-channel 212:

module 2202-1 expression tags 2204: tomatoes, squash
    module 2202-1 expression tags 2204: broccoli, green beans, swiss chard The direct session assessment mode is configured to present the following options:

Tomatoes (module 2202-1)
    Squash (module 2202-1)
    Broccoli (module 2202-2)
    Green Beans (module 2202-1)
    [Other] (fallback option; sends user to live chat or 'default module 2202)

Tag Assessment Logic.

Tag assessment and matching is a central function leveraged by processes managing automated conversation flows. Tag matching involves matching words or phrases from messages from end users and a defined list of tags associated with nodes 2210 (node tags 2210) or an automated human interface modules 2202 (interface tag expressions 2204). In some embodiments, the following considerations are imposed when defining such tags: interface tag expressions 2204 are not duplicated across multiple automated human interface modules 2202 assigned to the same sub-channel 212. Further, within an automated human interface module 2202, the scope tag expressions 2206 should be unique. Node tags 2211 within an automated human interface module 2202 can be duplicated across nodes 2210. This is because node tags 2211 are assessed when a user replies to an automated set of options from a specific node 2210 with a custom message. So, for example, the tag "Apple" assigned as a node tag 2211 to two different nodes 2210 in the same node graph 2208 may only get evaluated for a given conversation when the conversation is at that node 2210.

Tag Matching Process.

One tag matching process in accordance with the present disclosure is as follows. When there is a singular tag match within an asset (e.g., the interface tag expressions 2204 of only one human interface module 2204 match a message in a conversation) automatic selection occurs. When multiple tag matches within an asset (e.g. an interface tag expression or node tags 2211), tags are evaluated in order of priority they are listed. Assume a message contains the following keywords "apples oranges lemons". If the active node 2210 has the following 2211 tags (and destination nodes) associated with it:

node tag 2211-1:: "oranges apples"→(node A200)
    node tag 2211-2:: "apples oranges"→(node A220)
    node tag 2211-3:: "apples"→(node B210)
    node tag 2211-4:: "oranges"→(node B220)
    node tag 2211-5:: "kiwi"→(node B230) then the match is for the node tag 2211-2 "apples oranges" and the conversation is moved to destination node A220.

If at the sub-channel 212 level there are multiple equal tag matches across automated human interface modules 2202 the following heuristics are imposed in some embodiments. If an incoming message has multiple interface tag expression 2204 matches with several different automated human interface modules 2202 within the sub-channel, it may not be suitable to select an automated human interface module 2202 on this basis. In some embodiments, the system 200 will automatically respond back and challenge the end user to select a conversational topic by reflecting back individual choices reflecting each tag match. For example, Assume a message from an end user contains the following keywords "apples oranges lemons" and three automated human interface modules 2202 that each have separate interface tag expressions 2204 associated with them (they can't have the same tags assigned):

automated human interface module 2202-1 has the tag 2204-1 "oranges"
    automated human interface module 2202-2 has the tag 2204-2 "apples"
    automated human interface module 2202-3 has the tag 2204-3 "kiwis"

In this example, the sub-channel 212 would respond to the user "Which topic would you prefer to discuss first?" (oranges) (apples). Note, in the case of multiple, but unequal matches the request back to the end user would be, for example "Which topic would you prefer to discuss first?" (oranges and pineapples) (apples) (kiwis).

Chat Session Maintenance.

In some embodiments, system 200 manages conversations to help track and identify the progress and process of each conversation and to be able to differentiate different conversations originating from a specific end user. In such embodiments, the system tracks a conversation by (i) the active conversation identifier, (ii) the process module identifier (e.g., automated human interface module 2202, live chat with sub-channel administrator, etc.), (iii) node identifier 2210, and/or (iv) support representative (e.g., sub-channel administrator) identifier (live chat).

Session Tracking—Conversation Initiation.

In some embodiments, an initial incoming message from an end user (ID) does not contain a conversation identifier and is therefore automatically assigned a unique conversation identifier. In some embodiments, the conversation identifier is specific to a user/and sub-channel 212 combination.

Session Tracking—Conversation Close.

In some embodiments, the conversation identifier is closed when, for instance, the system identifies that the conversation has ended. That can be accomplished by a designated conversation closing node 2210 such that once conversation reaches this designed node, the conversation ends. In some embodiments, the designated conversation closing node may send a final message to the end user. In some embodiments, the conversation closing node option specific ends a final conversation close question to the user. At least one node option, if selected by the user would indicate that the conversation has ended, e.g. "Issue resolved/Not resolved," with the "resolved" option clearing the conversation. In some embodiments, the conversation closing node is configured to send a final response to the end user (e.g., "Thank you/Have a nice day") before clearing the conversation identifier.

Manual Flow Management.

In some embodiments automated human interface module administrators could close a conversation by either (i) selecting and sending a predefined, custom or system, conversation close module, which includes a defined closing message, (ii) clicking on the "close conversation" button which ends the conversation (e.g., after providing a customized response back to the end user providing a message such as "Greg, glad to be of assistance; have fun at the SF Giants game on Saturday!"

Additional Considerations—Session Close Question.

If the system sends a "final response" and the end user answers with a custom message (e.g. not selecting either issue is: "resolved" "unresolved" options in a menu), then the conversation identifier is retained.

Additional Considerations—Multiple Topic Conversations.

A conversation may cover multiple topics, e.g. with the conversation moving from one module 2202 to another module 2202. In such embodiments, the conversation will retain the same conversation identifier.

Additional Considerations—Automated Human Interface Module 2202/Node Identifiers 2210.

When an automated human interface module 2202 can't resolve a conversation and needs to bounce a conversation (out), e.g. back up to the sub-channel level, the automated human interface module 2202 and node identifiers are cleared from the conversation, but the conversation identifier is retained. For instance when the sub-channel reassigns the conversation to another automated human interface module 2202 or to live chat, the appropriate automated human interface module 2202 identifier or live chat identifier is added into the conversation.

Additional Considerations—Elapsed Time Configuration Settings.

Some embodiments of the present disclosure provide configuration options, enabling enterprise data source 102 administrators to define time based conversation closing rules (e.g., if 'X' hours/days pass and/or user closes application without the user sending a response, the conversation is closed; if conversation close type response was sent to the end user, but the end user does not respond and either closes the application, and/or 'X' hours pass, the conversation is closed).

Automated Human Interface Modules 2202 Automated Conversation Logic Process.

Automated Conversation Flow.

The default conversational flow in an automated human interface module 2202 moves a conversation 2220 through the node graph 2208 of nodes 2210. Each node 2210 can contain multiple options for the end user to select. Each node option can move the conversation to a specific destination node 2210 in the automated human interface module's node graph 2208. Multiple nodes 2210 can point to the same specific destination node 2210. The node graph 2208 can therefore be comprised of complex branches of connected nodes. In some embodiments, a node graph is a cyclic or acyclic graph with branches. Resulting conversation flows can jump from a node in one node branch to a different node branch in such graphs. It is also possible to move the conversation 2220 from a first node 2210 in a first module 2202 to a second node 2210 in a second module 2202.

Dynamic Message Assessment.

Some embodiments of the present disclosure provide dynamic message assessment that can reroute user conversations 2220 within the automated human interface module 2202. The native automated human interface modules 2202 can be configured to listen for keywords/phrases of an entered message. In some embodiments, the message is evaluated at up to four levels two which are within an automated human interface module 2202.

Level 1.

Referring to FIG. 22, node tags 2211 provide one or more keywords/phrases that are added to a source node 2210. Each of these tags 2211 is also assigned a destination node 2210 that the end user is moved to if the node tag is fired. For example: assume that node 'A112' has three defined node tags 2211, e.g. node tag 2211-1 "Apples", node tag 2211-2 "Oranges", and node tag 2211-3 "Kiwis". Each node tag would further be associated with a destination node; e.g. node tag 2211-1 "Apples" connects to node 'B234'. When an end user initiates a custom response within a conversation 2220 after having arrived at node 'A112', then if his message contains "Apples," the conversation would continue at node 'B234'. The automated human interface module 2202 checks for node tag matches at the current node 2210 first. If there are no matches with the node tags 2211 of the current node, the automated human interface module 2202 goes to the level 2 assessment described below.

Level 2: Human Interface Module Tags.

Referring to FIG. 22, one or more keywords/phrases can be assigned at the automated human interface module 2202 scope as scope tag expressions 2204. When the node tags 2211 at the current active node 2210 fails to match the end user message, the end user message is compared to each of the scope tag expressions 2206 of the automated human interface module 2202 that is currently hosting the conversation. Each scope tag expression 2206 at the automated human interface module 2202 is assigned to a destination node 2210 in the node graph 2208. Thus, if a match is found with a particular scope tag expression 2204 and the end user message, the conversation is progressed to the node 2210 referenced by the scope tag expression 2206.

Level 3: Reinsertion into Sub-Channel.

When the level 1 and level 2 tags fail to find a match (e.g., the automated human interface module 2202 presently hosting the conversation within a sub-channel 212, the user is excited out of the current automated human interface module 2202 and moved back to the 1.1 automatic assignment protocol, which then reassesses the message at the sub-channel's 212 assigned bot level. Thus, the message is compared to the interface tag expressions (level 3) of each of the automated human interface modules in the sub-channel 212. In some embodiments, this system behavior is automatically enabled whenever the sub-channel 212/primary communication channel's "1.1. Unattended Mode" is "on". In some embodiments, there is a configuration option to disable sub-channel 212 level auto flow bot reassignment when the unattended Mode is "off". When disabled, conversations are automatically moved to the live support conversations (e.g., the sub-channel administrator queue 2228 of the sub-channel) after they exit an automated human interface module 2202.

Level 4—Multimedia Human Interface Module 2220.

While it is possible to define a specific multimedia content lookup as part of the message content for an automated human interface module 2202, the inclusion of a multimedia human interface module 2232 in an automated human interface modules 2202 adds automated media file retrieval. When enabled, the multimedia human interface module 2232 will attempt to follow the conversation from the automated human interface module 2202. Referring to FIG. 23, as the conversation proceeds to drill down into a specific topic, the multimedia human interface module 2232 will define its scope for evaluating tag matches within the corresponding directory 2306 in its own organizational structure, as long as there is a directory 2306 to drill into. If the conversation moves the user from one node 2210 to another, the destination node will inherit the branch hierarchy in the form of a tag sequence that is passed to the destination node. This allows the multimedia human interface module 2220 to reset itself in its own organizational hierarchy. The inherited branch hierarchy represents a list of tags that in the view of the multimedia human interface module 2232 takes precedence over the actual conversation tag history. The multimedia human interface module 2232 will only evaluate tag matches for objects 2310 if it contains any files in its current conversation (following) in the new directory 2306 location.

The multimedia human interface module 2232 process can be invoked in two ways, depending on configuration. In one approach, it is invoked by defining any node response option to pass through multimedia human interface module 2232. The multimedia human interface module 2232 will review the associated keywords from the node option and follow the automated human interface module's 2202 automated node response with an appropriate media file that will also be sent to the end user. In another approach, by assessing the user's last custom message against the multimedia human interface module 2232 tags. The automated human interface module 2202 passes to the multimedia human interface module 2232 the user response, any node tags, and the tag history from the current the automated human interface module 2202 session in that order. The order of the tags reflects a matching preference with the first listed keywords receiving more weight. In some embodiments, the multimedia human interface module 2232 looks for media file tag matches in the following order. First it checks user response and node tags against the tags 2308 and appropriate tags 2312. If there are no matches to tags from the user node option, custom message, or node tags, the multimedia human interface module 2232 will include a fixed number (configurable) of tag history tags for evaluation. If there is an inherited tag hierarchy it will take priority over the full conversation hierarchy. If there are no 'hits', multimedia human interface module 2232 will pause. If multiple objects 2310 result in hits, the object 210 with the highest hit score (total 'weight' score of matching tags) and is posted to the conversation or is passed to the automated human interface module 2202 for posting into the conversation.

Parallel Content Channels.

In some embodiments there is layered within the multimedia library organizational hierarchy options to leverage upsell or advertisement content. These options can be enabled/disabled on a per automated human interface module 2202 basis.

Elapsed Time Limit.

In some embodiments, based on a primary communication channel 210 configuration setting, a maximum amount of time is allotted for the system to respond from within an automated human interface module 2202. When that time is exceeded, the user will be moved out of the automated human interface module 2202. In some embodiments, a reference search via the multimedia human interface module 2232 has its own time out limit. If a multimedia human interface module 2232 search times out, the user is retained in the automated human interface module 2202 and it's conversation continues.

Conversation Tag History.

As a conversation or message interaction unfolds, the system will aggregate a tag history (e.g., referring to FIG. 23, user conversation history) for the user's conversations in a sub-channel 212. In some embodiments, the tag history structure will include (i) primary communication channel 210 name and identifiers, sub-channel 212 name and identifier, end user identifier, conversational method (e.g., live interaction, automated human interface module 2202 name and identifier), sequence of messages the user provided (user conversation history 2224), matching (level 1, 2, 3, 4) tags associated with any end user response, and an active: Y/N flag (reflecting whether the user is actively interacting).

Automated Flow Human Interface Module 2202 Usage Pattern Analysis.

Some embodiments of the present disclosure provide reports that provide overview data about user sessions and provide summary data and statistics for various aggregation application scopes such as, for the primary communication channel 210, breakdown of data across sub-channels 212 and for sub-channels 212, breakdown of data across messaging channels, e.g., automated human interface modules 2202 and live messaging with the sub-channel administrator 392. For sub-channels, such reports provide a breakdown of data across nodes 2210 of each automated human interface module 2202 and the type of widget 2216, and live sessions (also lists automated human interface modules 2202, and objects 2310 delivered by the multimedia human interface module 2232. These reports provides for the ability to drill into the more detailed scope reports from the highest level; e.g. the primary channel 210 scope. For visual clarity, in some embodiments these reports will present numbers in/beside graphical indicators (e.g. circles, whose size and color depth reflects the size of the number to be displayed in comparison to all other numbers in the report). This allows the enterprise data source 102 administrator to quickly look at the report and identify where the most end users are.

Active User Sessions.

Some embodiments of the present disclosure provide a real time dashboard indicating distribution of user data across the various scopes (listed above), such as number of live users (with active message interactions), number of inactive users with completed conversations in the past (selectable date range and default periods), total number of incoming messages, average response time to messages initiated by end users, average conversation/interaction time, average number of message exchanges before resolution or exit, number and percent of positive resolutions by live messaging, number and percent of positive resolutions by automated human interface modules 2202, and/or number and percent of unresolved inquiries by automated human interface modules 2202.

Automated Human Interface Module 2202 Reports.

Some embodiments of the present disclosure provide a summary overview of how end users moved through the automated human interface module 2202 conversations. For example, some embodiments present where and volume of end users entered the automated human interface module 2202. Some embodiments of the present disclosure provide a resolved path and exit report presentation of where with what volume end users exited the automated human interface module 2202 with the conversation 'unresolved'. Some embodiments of the present disclosure provide an unresolved hot spot exit report presentation of where with what volume end users exited the automated human interface module 2202 with the conversation 'unresolved'. This secure mobile communications platform 200 'hot spot' report provides a clear indication of the automated human interface module's 2202 user exit performance. Some embodiments of the present disclosure feature clear indicators of any "hot spots"; e.g. nodes in the automated human interface module 2202 where there is concentration of unresolved conversations that then exited the automated human interface module 2202. Some embodiments of the present disclosure provide a tag summary report for each node through which any end users exited the automated human interface module 2202. The report provides a breakdown of the specific tags that resulted in the user's exit from the automated human interface module 2202. For instance, the tag report for a specific node may provide a volume based breakdown of the conversation tags associated with the exit messages this display may include volume word clouds and a table sorted by volume of tags or phrases. Some embodiments of the present disclosure provide an automated report the system can automatically send a daily or weekly email update on sub-channel 212 and automated human interface module 2202 performance, including a summary on automated human interface module 2202 exit performance and top 'hot spot' nodes along with top tags. Some embodiments of the present disclosure provided differential reports showing changes in automated human interface module 2202 performance based on customizable time periods and also between saved automated human interface module 2202 updates.

Automated Human Interface Module 2202 Training.

In some embodiments, automated human interface modules 2202 can be evolved in a number of ways to expand their capability and the range of topics they can cover via automated message interactions. One of the primary ways that enterprise data source administrators 101 use this to improve the effectiveness of their automated human interface modules 2202 is to periodically check the "primary channel reports" which identify the 'hot spots' in the automated human interface module 2202 messaging logic network and that reflect a primary opportunity to evaluate modifying/expanding the automated human interface module 2202 in those specific nodes/areas to expand the automated human interface module's 2202 ability to increase the success rate of completing conversations. Further, the node tag report will provide very specific data about what end users are focused on with their response selections and custom messages at time of exit. By expanding the automated human interface module's 2202 capacity to automatically extend and resolve more conversations the efficiency of the automated messaging platform is increased.

Enterprise Data Source can Customize Appearance of Content in Sub-Channels Through an Application Programming Interface.

Advantageously, in the disclosed systems and methods, an enterprise data source 104 can customize the content that appears in sub-channels 212. At any given time, each such sub-channel is hosting a number of conversations 2220, each such conversation with a different remote user device 104 associated with a respective end user. As such, messages are sent to the end user in such conversations and messages are received from the end user. As discussed in greater detail with respect to FIGS. 22 and 23 below, the content of messages received from an end user may trigger certain events such as the activation of a stock message 2214, stock widget 2216 (e.g., also interchangeably referred to herein as a "control" or an "applet"), stock object 2218 (e.g., image, sound file, PDF, etc.) in the conversation. Thus, when a triggering event arises, a message sent to the remote user device in a conversation may be highly customized. This very same conversation may have normal text messages. Thus, it is possible for conversations to have any number of regular text messages and customized messages.

Figure 5E:
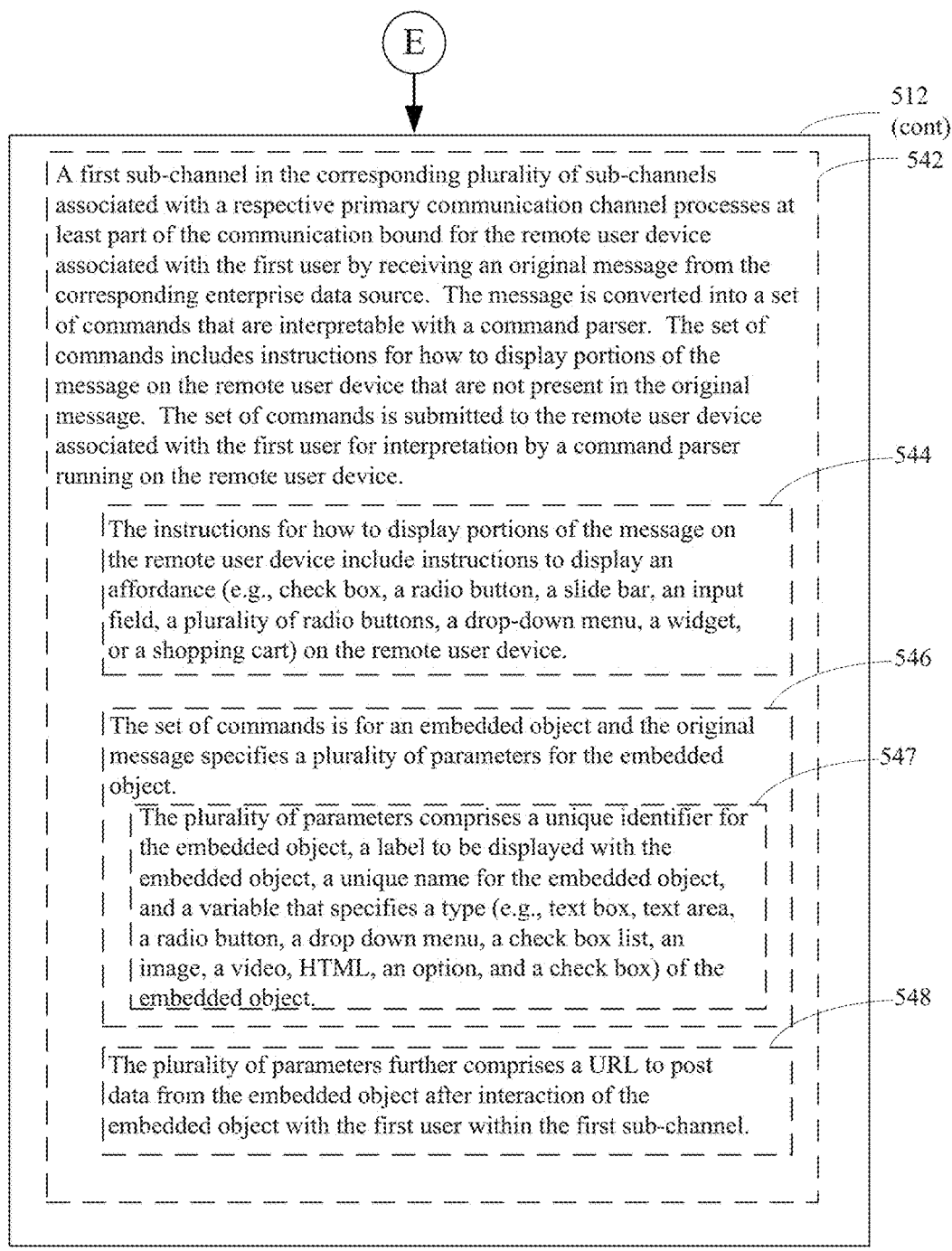

Referring to block 542 of FIG. 5E for illustration, a first sub-channel 212 in the corresponding plurality of sub-channels associated with a respective primary communication channel 380 processes at least part of the communication bound for the remote user device 104 associated with the first user (e.g., in a conversation) by receiving an original message from the corresponding enterprise data source 104. The message is converted into a set of commands that are interpretable with a command parser (e.g., a stock widget 2216 within the conversation that is running on the remote user device 104). The set of commands includes instructions for how to display portions of the message on the remote user device 104 that are not present in the original message. The set of commands is submitted to the remote user device 104 associated with the first user for interpretation by a command parser (e.g., the widget) running on the remote user device 104. The command parser may then display on the remote user device 104 within the conversation the one or more affordances in accordance with the original message from the enterprise data source 102.

Referring to block 544 of FIG. 5E, in some embodiments, the instructions for how to display portions of the message on the remote user device 104 include instructions to display one or more affordances (e.g., one or more check boxes, one or more radio buttons, one or more slide bars, one or more input fields, one or more radio buttons, one or more drop-down menus, or one or more shopping carts) on the remote user device 104.

Referring to block 546 of FIG. 5E, in some embodiments, the set of commands is for an embedded object and the original message specifies a plurality of parameters for the embedded object. For instance, in some embodiments, the embedded object is a preformatted menu of options and the plurality of parameters are the menu options. Referring to block 547 of FIG. 5E, in some such embodiments the plurality of parameters comprises a unique identifier for the embedded object, a label to be displayed with the embedded object, a unique name for the embedded object, and a variable that specifies a type (e.g., text box, text area, a radio button, a drop down menu, a check box list, an image, a video, HTML, an option, and a check box) of the embedded object. In some embodiments, the set of commands is for a plurality of such embedded objects. Referring to block 548 of FIG. 5E, in one example, the plurality of parameters further comprises one or more URL to post data from the embedded object after interaction of the embedded object with the first user within the first sub-channel 212.

File Cabinet Associated with Channels that is Automatically Populated with Channel Attachments.

In an embodiment, the secure mobile communication platform 200 provides an automated electronic file cabinet 226 to each of the users 320 for storing attachments to messages in the respective sub-channels 212 based on predetermined criteria. In some embodiments the electronic file cabinet 226 is stored on server 200 as illustrated in FIG. 2. In some embodiments the electronic file cabinet 226 is cloud based system and is accessible from any remote user device 104, for example, a personal computer, a tablet computing device, a mobile phone, a smart phone, a laptop, a personal digital assistant, etc.

To support the disclosed electronic file cabinet 226, in some embodiments an enterprise data source 102 organizes its attachments with the following considerations. There is one primary channel 210 per enterprise data source 102, multiple sub-channels 212 per primary channel 210, and multiple chatrooms per sub-channel 212. Typically, the enterprise data source 102 sets up a root folder for high level content at the primary channel 210 level. In some embodiments this high level content is accessible to all primary channel administrators 380 for distribution to users. In some embodiments, this high level content is accessible to some sub-channel administrators 392. Below the root folder, the enterprise data source 102 sets up a folder for each sub-channel 212. In some embodiments, the content in the folder the enterprise data source 102 maintains for a sub-channel 212 can be viewed by all sub-channel administrators 392. In some embodiments, the content in the folder the enterprise data source 102 maintains for a sub-channel can be edited by some sub-channel administrators 392. For each sub-channel folder, the enterprise data source 102 maintains a folder for each chatroom in the sub-channel 212. In some embodiments, the files in the chatrooms can be viewed by all sub-channel administrators 392 that have access to the chatrooms. The files in the chatrooms are the files sent by the end users, they are not created by the enterprise data source 102. The enterprise data source 102 manages content to be sent to end user at the primary channel 210 and sub-channel 212 levels. In some embodiments, to facilitate such a file system architecture, the enterprise data source super-administrator 378 and/or primary channel administrator 380 connects communications module 204-E with an administrative account on Box/Dropbox/etc. Communications module 204-E then creates a folder owned by the enterprise data source super-administrator 378 and/or primary channel administrator 380. Communication module 204-E, then creates subfolders for each sub-channel 212. Within each sub-channel, communications module 204-E creates subfolders for each chatroom. Then, the enterprise data source super-administrator 378 and/or primary channel administrator 380 has full access to the content of these folders. The sub-channel administrators 392 have to the content in the sub-channel 212 folders. The end user does not have direct access to this file system set up for the enterprise data source. Rather, the end user makes use of the electronic file cabinet 226 described below, with reference to FIG. 16.

Figure 16:
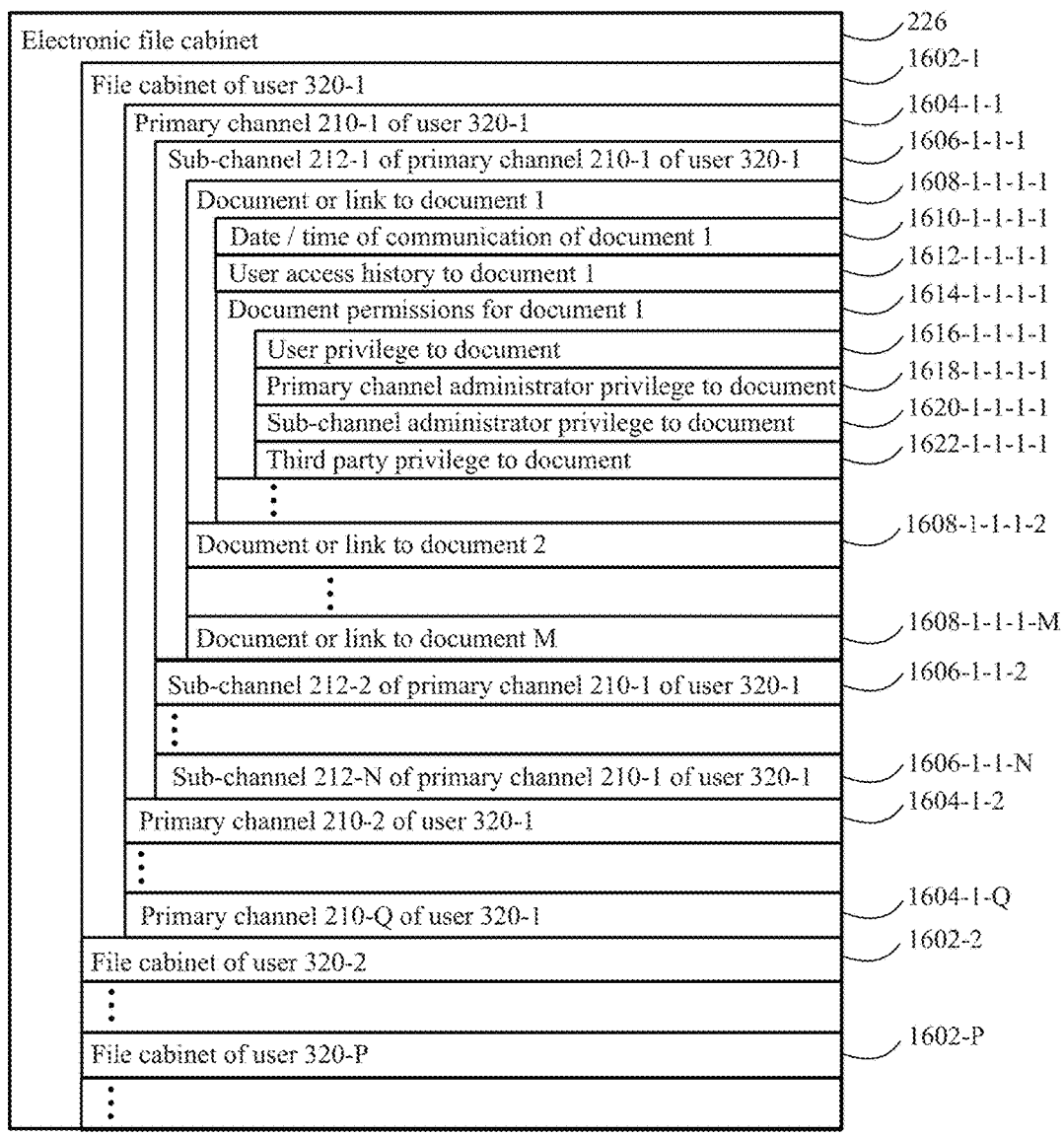
FIG. 16 illustrates an electronic file cabinet that is automatically populated with message attachments associated with users in sub-channels in accordance with an embodiment of the present disclosure.

In some embodiments, electronic file cabinet 226 of a user, such as that illustrated in FIG. 16, contains links to the appropriate files stored by enterprise data sources 102. For instance, for a given sub-channel of primary channel 210 supported by the user's electronic file cabinet 226, there are links to the documents for that sub-channel to the file system of the enterprise data source 102 described above. For instance, when a file is sent in a sub-channel 212 from an enterprise data source 102, a link to the file is stored in the electronic file cabinet 226 of the user and this link is to an actual copy of the file stored in the file system of the enterprise data source 102 described above. In other embodiments, electronic file cabinet 226 of a user, such as that illustrated in FIG. 16, contains copies of the appropriate files sent by enterprise data sources 102. For instance, when a file is sent in a sub-channel 212 from an enterprise data source 102, a copy of this file is stored in the electronic file cabinet 226 of the user, indexed to the appropriate sub-channel.

As illustrated in FIG. 16, from the end user perspective, in some embodiments, the electronic file cabinet is indexed by user 320, with each such user 320 having a file cabinet. The user file cabinet 1602 is indexed, in turn, by primary channels 210 of the user (1604), and for each such respective primary channel, a repository for each of the sub-channels 212 (1606) of the respective primary channel. In some embodiments, respective sub-channels 212 are further indexed by chatrooms within the sub-channels, and the user is only granted access to the files in those chatrooms that the user participates in.

In some embodiments, files sent from a single enterprise data source 102 to a user are viewed by the remote user at remote user device 104 collectively, together. For instance, consider the case in which the enterprise data source 102 has established a primary channel 210, containing two sub-channels 212, with a remote user at remote user device 104. Files have been sent to the user in both sub-channels and these files have been stored in the electronic file cabinet 226 in the respective sub-channel folders. Subsequently, when the remote user requests access to files from the enterprise data source 102, the electronic file cabinet 226 provides a listing of all the files in both sub-channel folders collectively. Such embodiments operate with the assumption that a user does not need to see files at the sub-channel level. However, in some embodiments, the user is able to segment their query and view just the files in a sub-channel 212 of a given enterprise data source. Users may send files to an enterprise data source 102 within chatrooms. In some embodiments, such files only appear in the enterprise data source's folder structure and not in the users file system.

FIG. 16 illustrates just one way in which files may be indexed in an electronic file cabinet 226. In general primary channels, sub-channels, and chatrooms act as independent keys by which files associated with a user are stored and retrieved by the user.

In some embodiments, the electronic file cabinet 226 stores the messages to or from the user in a sub-channel in the corresponding sub-channel repository 1606.

In some embodiments, the electronic file cabinet 226 only stores the attachments to messages to or from the user in a sub-channel in the corresponding sub-channel repository 1606.

In some embodiments, the electronic file cabinet 226 only stores the attachments to messages to the user in a sub-channel in the corresponding sub-channel repository 1606. In such embodiments, the electronic file cabinet 226 does not store messages to the user and does not store message from the user or attachments from the user.

The electronic file cabinet 226 is useful for a number of use cases. A sub-channel administrator 392 may want to share files with consumers, using files relevant to a specific sub-channel (e.g., images for coupons, PDFs for instructions). Thus, the sub-channel administrator 392 may stream these files to the user and the electronic file cabinet 226 conveniently stores these files. In another example, a sub-channel administrator may want to accept files from consumers, such as signed documents, or screenshots. Further, an end user may want to share files with an enterprise data source, by streaming the sub-channel administrator 392 in a chat room in a sub-channel 212 for the sub-channel administrator 392 to review. In still another user case, the end user may want to see content shared with the user by an enterprise data source.

In some embodiments, users 302 can use and search the electronic file cabinet 226 of the secure mobile communication platform 200 to search for messages and/or attachments. For example, a user can search the secure cloud based filing system based on respective enterprise data source 102 (e.g., all messages or message attachments sent from the enterprise data source 102 to the user or from the user to the enterprise data source 102), a relevant month (e.g., all messages or message attachments associated with the user in the relevant month), etc. In some embodiments, only message attachments, and not messages are stored in the electronic file cabinet 226.

In some embodiments, the automated filing system is a combination of file storage and related metadata storage in a database, for example, a file system implementation using the MySQL® database of MySQL AB Company with the ELASTICSEARCH® search engine of Elasticsearch BV. In some embodiments, the established primary channels 210, the generated sub-channels 212, the stored messages (in those optional embodiments where messages are stored in the electronic file cabinet 226), the stored content (e.g., file attachments), etc., are searchable through the secure mobile communication platform for providing information on demand in real time.

Referring to block 550 of FIG. 5F as well as FIG. 16, a first sub-channel 212 in a plurality of sub-channels associated with a respective primary communication channel 210 processes at least part of the communication from the corresponding enterprise data source 102 associated with the sub-channel that is bound for the remote user device 104 associated with a first user 320 by first receiving an original message from the corresponding enterprise data source 102. The original message is associated with an attachment 1608 (e.g., a document or a video). An electronic copy of the attachment is made and the electronic copy of the attachment in is stored in the electronic file cabinet 1602 associated with the user 320. The stored electronic copy 1608 is indexed to the first sub-channel 1606. The original message and the associated attachment is then communicated within the first sub-channel to the remote user device associated with the first user.

Referring to block 552 of FIG. 5F, in some embodiments, the electronic file cabinet 226 is stored in a remote device (e.g., remote server, virtual machine) independent of the corresponding enterprise data source 200. In such embodiments, the remote device is addressable by the server system 200 across a network 106.

Referring to FIG. 16, in some embodiments the disclosed systems and methods offer the feature of automatically storing attachments to messages communicated in a sub-channel 212 in an electronic file cabinet 226. In some embodiments, the attachments are indexed by sub-channel, primary channel, and by user. In some embodiments the messages and the attachments are stored in the electronic file cabinet 226. In some embodiments, only the attachments are stored in the electronic file cabinet 226. An example of an attachment that is stored in the electronic file cabinet 226 are billing statements. Advantageously, the disclosed systems and methods provide considerable control to system designers on how to set up privileges to the documents stored in the electronic file cabinet 226. For instance, in some embodiments, user privileges to documents are set up on a user basis 1616, a primary channel administrator basis 1618, a sub-channel administrator basis 1620, and/or a third party basis 1620.

User privileges 1616 are the privileges the user associated with a given sub-channel 212 has with respect to a given document 1608. In some embodiments, these privileges are read privileges, write privileges, edit privileges, deletion privileges, and/or copy privileges to the document 1608.

Primary channel administrator privileges 1618 are the privileges the primary channel administrator 380 of the primary channel 210 of the sub-channel 212 that communicated the document has with respect to a given document 1608. In some embodiments, these privileges are read privileges, write privileges, edit privileges, deletion privileges, and/or copy privileges to the document 1608.

Sub-channel administrator privileges 1618 are the privileges the sub-channel administrator of the sub-channel 212 that communicated the document has with respect to a given document 1608. In some embodiments, these privileges are read privileges, write privileges, edit privileges, deletion privileges, and/or copy privileges to the document 1608.

Third party privileges 1620 are the privileges that a third party (other than the enterprise data source 102 and the user) has with respect to a given document 1608. In some embodiments, these privileges are read privileges, write privileges, edit privileges, deletion privileges, and/or copy privileges to the document 1608.

Accordingly, referring to block 554 of FIG. 5F, in some embodiments, an entity associated with the enterprise data source 102 (e.g., primary channel administrator privileges 1618, sub-channel administrator privileges 1620) has a first access privilege to the electronic copy of the attachment 1614 in the electronic file cabinet 1602 associated with the first user. The first user has a second access privilege 1616 to the electronic copy of the attachment 1614 in the electronic file cabinet associated with the user. In some embodiments, the first access privilege is different than (e.g., independent of) the second access privilege. For example, the first access privilege may comprise an edit privilege, a read privilege, and a deletion privilege to the electronic copy of the attachment 1608 in the electronic file cabinet associated with the user 1602. The second access privilege consists of a read privilege to the electronic copy of the attachment 1608 in the electronic file cabinet associated with the first user 1602. Referring to block 558 of FIG. 5F, as another non-limiting example, the first access privilege and the second access privilege are each independently one or more of edit privileges, read privileges, and deletion privileges to the electronic copy of the attachment 1608 in the electronic file cabinet associated with the first user 1602.

Figure 5G:
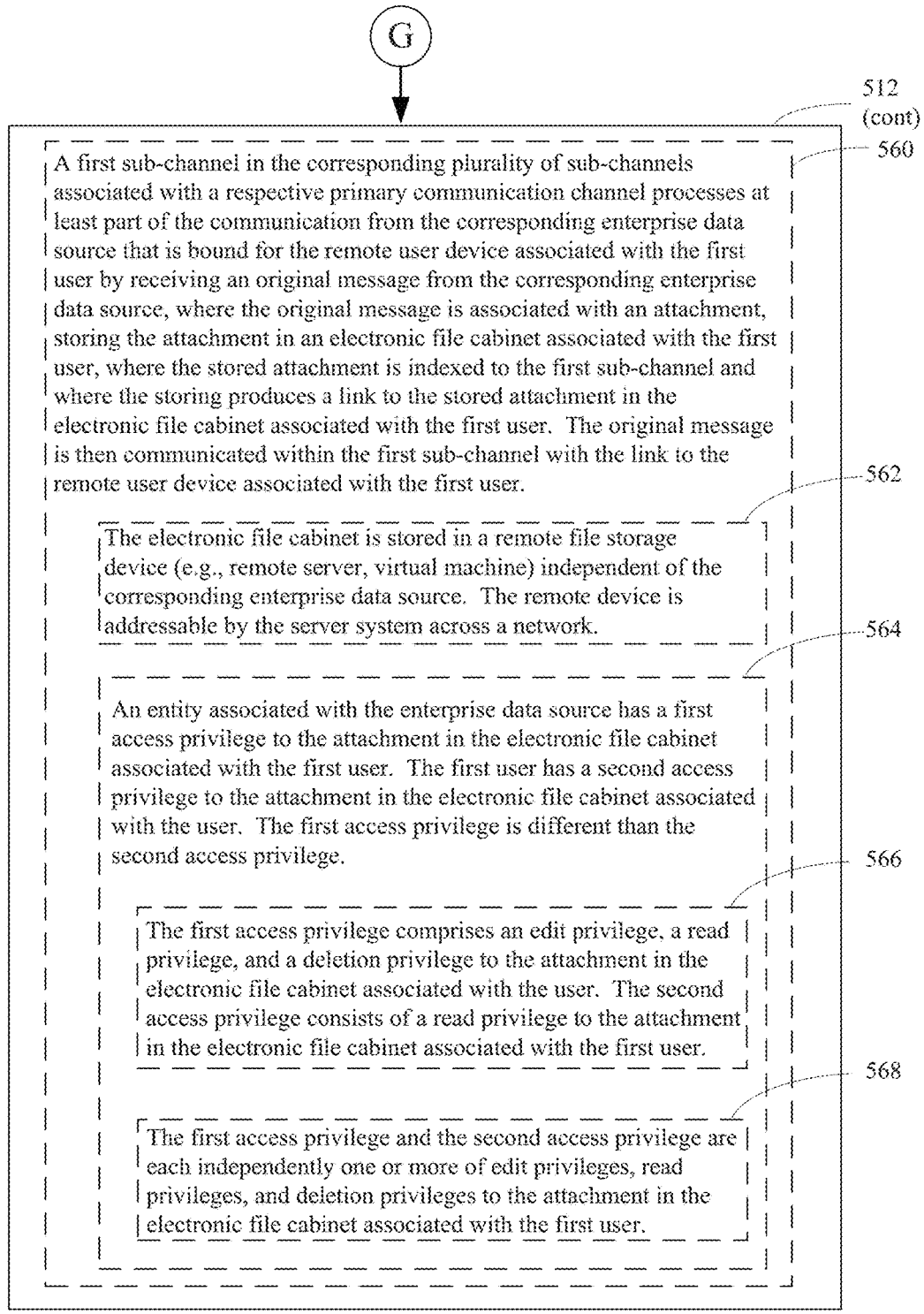

In some embodiments, a link to an attachment is generated when the attachment is stored in the electronic file cabinet 226. Then, rather than sending the full electronic version of the attachment to a user from the enterprise data source 102, a link to the attachment, now stored in the file cabinet of the user 1602 is sent. Block 560 of FIG. 5G illustrates such an embodiment: a first sub-channel 212 in the corresponding plurality of sub-channels associated with a respective primary communication channel 210 processes at least part of the communication from the corresponding enterprise data source 102 that is bound for a remote user device 104 associated with a first user by receiving an original message from the corresponding enterprise data source 102. The original message is associated with an attachment. The processing of the message causes the attachment to be stored in an electronic file cabinet associated with the first user 1602. The stored attachment 1608 is indexed to the first sub-channel and the storing produces a link to the stored attachment in the electronic file cabinet associated with the first user 1602. The original message is then communicated within the first sub-channel 212 with the link to the stored attachment to the remote user device 104 associated with the first user. If the user wishes to see the attachment, the link to the attachment in the file cabinet of the user 1602 is used to retrieve the attachment from the file cabinet of the user 1602. Referring to block 562 of FIG. 5G, in some such embodiments, the electronic file cabinet 226 is stored in a remote file storage device (e.g., remote server, virtual machine) independent of the corresponding enterprise data source 102. In such embodiments, the remote file storage device is addressable by the server system 200 across network 106. Referring to block 564 of FIG. 5G, in some such embodiments, an entity associated with the enterprise data source 102 (e.g., primary channel administrator privileges 1618, sub-channel administrator privileges 1620) has a first access privilege to the attachment 1614 in the electronic file cabinet associated with the first user 1602. The first user has a second access privilege 1616 to the attachment in the electronic file cabinet associated with the user 1602. In some embodiments, the first access privilege is different than (e.g., independent of) the second access privilege. Referring to block 566 of FIG. 5G, for example, the first access privilege may comprise an edit privilege, a read privilege, and a deletion privilege to the attachment 1608 in the electronic file cabinet associated with the user 1602. The second access privilege may consist of a read privilege to the attachment 1608 in the electronic file cabinet associated with the user 1602. Referring to block 568 of FIG. 5G, in some embodiments, the first access privilege and the second access privilege are each independently one or more of edit privileges, read privileges, and deletion privileges to the attachment 1608 in the electronic file cabinet associated with the first user 1602.

In some embodiments, the original message from an enterprise data source 102 does not include an electronic copy of an attachment but rather has a link to the attachment, where the link is an address of the attachment in a database associated with the enterprise data source. In some such embodiments, the platform 200 retrieves the attachment using the link, stores a copy of the attachment in the file cabinet of the user 1602, produces a second link to the stored attachment in the electronic file cabinet associated with the first and sends the message to the user with the second link. Block 570 of FIG. 5H illustrates such an embodiment: a first sub-channel 212 in the corresponding plurality of sub-channels associated with a respective primary communication channel 210 processes at least part of the communication from the corresponding enterprise data source 102 that is bound for the remote user device 104 associated with a first user by receiving an original message from the corresponding enterprise data source 102. The original message is associated with a first link to an attachment. The attachment is stored in a database associated with the corresponding enterprise data source 102 and the first link provides access to the stored attachment. An electronic copy of the attachment is made using the first link. The electronic copy of the attachment is stored in an electronic file cabinet associated with the first user 1602. The stored electronic copy of the attachment 1608 is indexed to the first sub-channel and the storing produces a second link to the stored attachment in the electronic file cabinet associated with the first user 1602. The original message and the second link are communicated within the first sub-channel 212 to the remote user device 104 associated with the first user. If the user wishes to see the attachment, the second link to the attachment in the file cabinet of the user is used to retrieve the attachment from the file cabinet of the user 1602. Referring to block 572 of FIG. 5H, in some embodiments, the electronic file cabinet 226 is stored in a remote file storage device (e.g., remote server, virtual machine) independent of the corresponding enterprise data source 102. In such embodiments, the remote file storage device is addressable by the server system across a network. Referring to block 574 of FIG. 5H, in some embodiments, an entity associated with the enterprise data source 102 102 (e.g., primary channel administrator privileges 1618, sub-channel administrator privileges 1620) has a first access privilege to the electronic copy of the attachment 1614 in the electronic file cabinet associated with the first user 1602. The first user has a second access privilege 1616 to the electronic copy of the attachment in the electronic file cabinet associated with the user 1620. In some embodiments, the first access privilege is different than (e.g., independent of) the second access privilege. Referring to block 576 of FIG. 5H, for example, the first access privilege may comprise an edit privilege, a read privilege, and a deletion privilege to the electronic copy of the attachment 1608 in the electronic file cabinet associated with the user 1602. The second access privilege may consist of a read privilege to the electronic copy of the attachment 1608 in the electronic file cabinet associated with the user 1602. Referring to block 578 of FIG. 5G, in some embodiments, the first access privilege and the second access privilege are each independently one or more of edit privileges, read privileges, and deletion privileges to the attachment copy in the electronic file cabinet associated with the user 1602.

Application Programming Interface Components.

Figure 21:
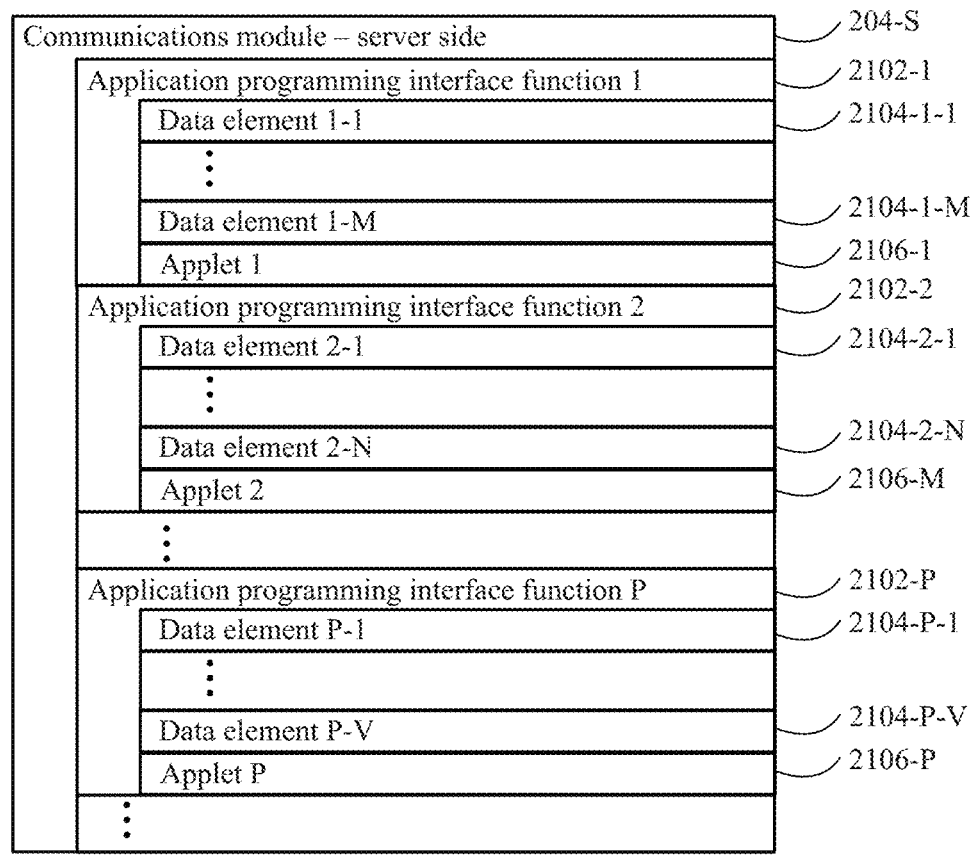
FIG. 21 illustrates several different application programming interface functions provided by an instance of a communications module running on a secure mobile communication platform where each such respective function has a number of data elements that serve as input to the function in accordance with an embodiment of the present disclosure.

Advantageously, the disclosed systems and methods provide a number of application programming interface components that may be incorporated into conversations in sub-channels 212. These application programming interface components are designed to assist the enterprise data source 102 in rapidly setting up functions, such as bill payment, menus boxes, the display of information, and other tasks that may facilitate transactions with users. Referring to FIG. 21, in some embodiments, the communications module 204, such as the instance of the communications module 204-C running on the secure mobile communication platform 200, provides several different application programming interface functions 2102. Each such function has a number of data elements 2104 that serve as input to the function 2102. Moreover, each such function 2102 is associated with an applet 2106 that is invoked when the corresponding function 2102 is called. Non-limiting examples of such applets are bill payment applets, menus box applets, and applets designed to display retrieved information. In some embodiments, an applet 2106 of FIG. 21 is a form of control 1206 of FIG. 12.

Block 542 of FIG. 5E illustrates the use of an application programming interface function 2102 in accordance with an embodiment of the present disclosure. A sub-channel 212 in a plurality of sub-channels associated with a primary communication channel processes at least part of the communication from the corresponding enterprise data source 102 that is bound for a remote user device 104 associated with a first user, for instance in a one to one conversation between the enterprise data source 102 and the remote user device 104, by receiving an original message from the corresponding enterprise data source. The original message includes a set of data elements 2104 and an application programming interface function call 2102 associated with the set of data elements. For example, consider the case where the application programming interface function call 2102 is a menu box. Here, the set of data elements 2104 would be the menu options for the menu box. Responsive to receiving the original message, the communications module 204 automatically and without human intervention, invokes the application programming interface function 2102. This invoking passes the set of data elements in the message to the application programming interface function 2102 and generates the corresponding applet 2106 that is communicated within the first sub-channel 212 to the remote user device 104 associated with the first user. For instance, continuing with the menu box example, an applet 2106 is presented within the conversation in the sub-channel 212 to the first user with a set of menu options, where each of the menu options is one of the data elements in the original message from the enterprise data source 102. Thus, in this way, the enterprise data source is able to take advantage of a mature applet by simply providing the data necessary to customize the applet.

Referring to block 582, in some embodiments the applet 2106 is an automated agent that is responsive to user input at the remote user device 104 associated with the first user. For instance, in some embodiments, the applet is an automated human interface module.

Referring to block 584, in some embodiments an applet 2106 is able to receive a query from within a first sub-channel (e.g., within a conversation in the first sub-channel). For instance, the applet 2106 may provide an inventory search panel within the conversation that accepts user queries. Responsive to such a query, a search of a database associated with the corresponding enterprise data source 102 is made outside of the first sub-channel. This database is electronically addressable by the enterprise data source 102. Then, matches to the query in the database are communicated to the applet 2106 within the first sub-channel 212

Referring to block 586, in some embodiments, the applet 2106 is a bill payment applet and the method further comprises receiving a payment communication from the applet 2106 within a first sub-channel 212 (e.g., from within a conversation in the first sub-channel) from the first user (e.g., the remote user device 104 associated with the first user) for goods or a service provided by the enterprise data source 104. The payment is verified against a credit source associated with the first user (e.g., Paypal, etc.). When verified by the credit source, a database (e.g., an accounting database) associated with the enterprise data source 102 is updated to reflect the payment. Further, there is a communication to the applet 2106 within the first sub-channel 212 (e.g. a one-to-one conversation in the first sub-channel between the enterprise data source 102 and the first user) that the payment has been made. When the credit source is unable to verify payment, the method further comprises communicating to the applet 2106 within the first sub-channel that the payment has not been made.

Figure 5I:
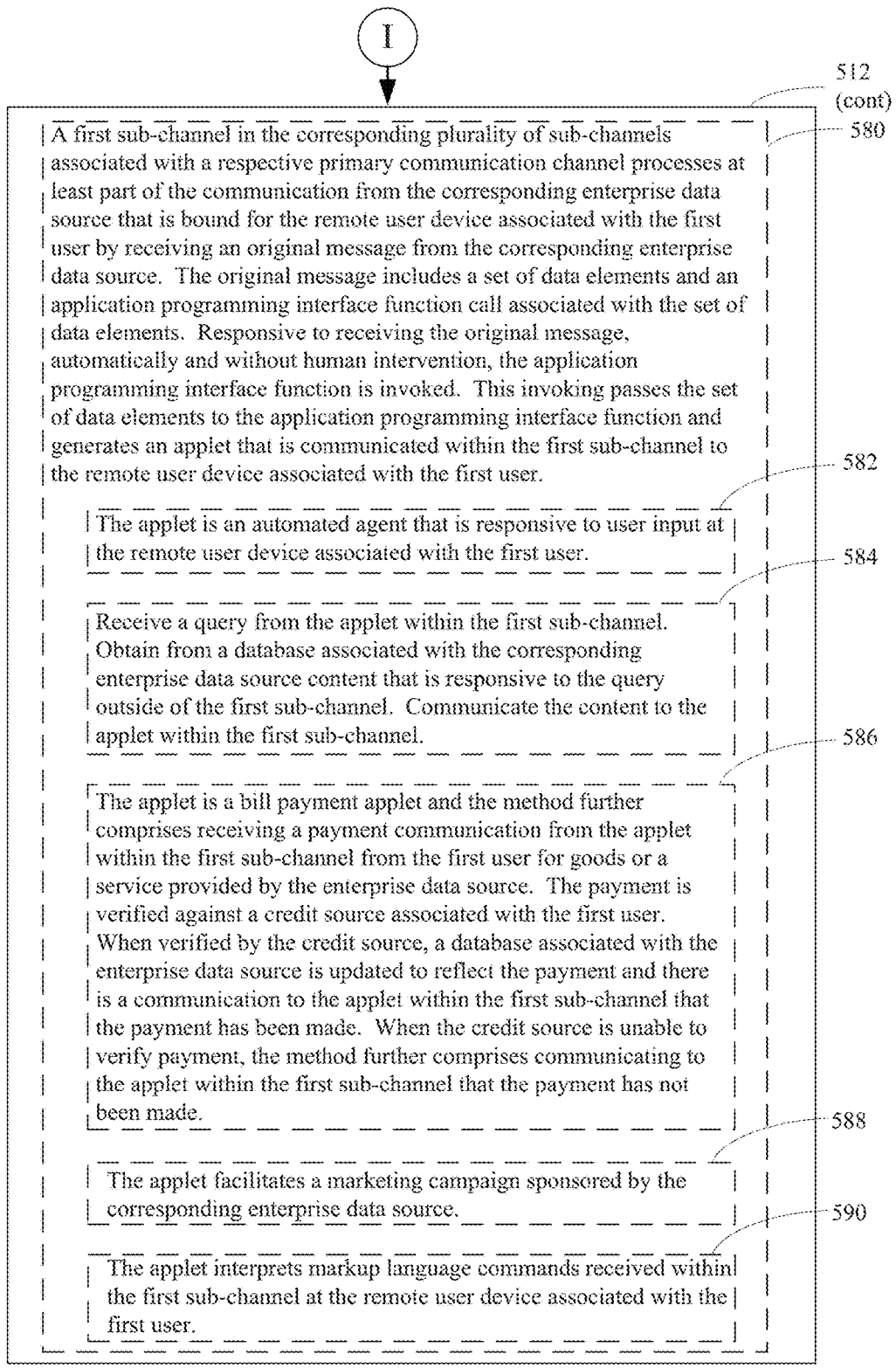

Referring to block 588 of FIG. 5I, in some embodiments, the applet 2106 facilitates a marketing campaign sponsored by the corresponding enterprise data source. IN such marketing campaigns, individualized messages offering a product, service, or incentive are sent to users in one-to-one conversations between the enterprise data source 102 and users associated with remote user devices 102. Advantageously, applets 2106 can display these messages on remote user devices 102 and track in real time the disposition of the messages, e.g., whether they were read, etc. and communicate such information back to the enterprise data source 102. The enterprise data source 102 may use such information from a single remote user device 104, or aggregated information from several remote user devices 104 to target new messages to one or more users as well as dynamically determine which variables (e.g., demographic variables, temporal variable, etc.) affect the success of the campaign. Consider a scenario in which the target is to maximize the percentage of time the sent messages are viewed by users. Does the age of the users affect this target? Does the appearance of the message in the applet 2106 affect this target? Is there some interdependence between age and the appearance of the message in the applet 2106 affects this target? The disclosed system advantageously addresses these questions in real time. In fact, the information acquired from conversations in real time can be used to dynamically segment the user population and optimize what is sent to each portion of the user population.

Referring to block 590 of FIG. 5I, in some embodiments, the applet 2106 interprets markup language commands received within the first sub-channel at the remote user device associated with the first user. For example, in some embodiments, an applet 2106 is a sophisticated HTML parser that allows for the implementation of sophisticated HTML graphics and other HTML functions within conversations.

Marketing Application Programming Interface.

The disclosed systems and methods, in which enterprises data sources 104 form conversations with individual end users allows for a unique opportunity to effectuate marketing campaigns. In such marketing campaigns, individualized messages offering a product, service, or incentive are sent to end users in one-to-one conversations between the enterprise data source 102 and users associated with remote user devices 102. Advantageously, these messages are displayed on remote user devices 102 and the real time disposition of such messages, e.g., whether they were read, etc. is track and such information is communicated back to the enterprise data source 102. The enterprise data source 102 may use such information from a single remote user device 104, or aggregated information from several remote user devices 104 to target new messages to one or more users as well as dynamically determine which variables (e.g., demographic variables, temporal variable, etc.) affect the success of the campaign. Thus, referring to block 592 of 5J, a first sub-channel 212 in the plurality of sub-channels associated with a respective primary communication channel 210 processes at least part of the communication from the corresponding enterprise data source 102 that is bound for the remote user device 104 associated with the first user (in a conversation) by receiving an original message from the corresponding enterprise data source in accordance with a message campaign sponsored by the enterprise data source 102 responsive to receiving the original message. Then, automatically and without human intervention, an application programming interface function is invoked for the message campaign. This passes information in the original message to the application programming interface function and generates an applet (e.g., widget 2216, control, etc.) that is communicated within the conversation in the first sub-channel 212 to the remote user device 104 associated with the first user. Then monitoring is set up to monitor, through communications received from the remotely installed applet within conversation in the first sub-channel, responses to the messaging campaign. Referring to block 594, in some embodiments, the invoked application programming interface function makes use of a value of a demographic characteristic (e.g., age, a location, a level of participation a customer rewards program, a length of time enrolled in a customer rewards program, a number of purchases the user has made with the enterprise data source, a total of amount of purchases the first user has made with the enterprise data source during a predetermined time frame, the last time the first user has made with the enterprise data source, a type of item the first user has purchased from the enterprise data source, or a sex of the first user) in the user profile corresponding to the first user to determine which information in the message to pass to the application programming interface function.

Security, Non-Repudiation.

Advantageously, the unique architecture disclosed herein in which conversations that are traceable to a specific end user of the system provides for a unique opportunity to ensure the security of such conversations and thus the non-repudiation of such conversations. For instance, due to the traceability of conversations and their security (e.g., with all messages in the conversation encrypted in some embodiments), when an end user makes a purchase (or other form of transaction) within a conversation in a sub-channel 212, neither the end user nor the enterprise data source 102 can repudiate the purchase (claim the transaction did not take place). Accordingly, referring to block 596 of FIG. 5J, a conversation in a first sub-channel 212 in the corresponding plurality of sub-channels is associated with a respective primary communication channel is associated with the unique identifier corresponding to first user. The unique identifier is used as a basis for non-repudiation of the conversation. In some embodiments, the conversation in the first sub-channel 212 is used to conduct a purchase (or other form of transaction) by the first user from the corresponding enterprise data source 102 associated with the conversation.

Applications Running in Cloud and Using Disclosed Systems to Communicate with End User.

In some embodiments, widgets 2216 (e.g., controls, applets) within conversations are hosted on one or more virtual machines. In other embodiments, such widgets 2216 are hosted elsewhere, such as downloaded onto end user devices 104.

Figure 5K:
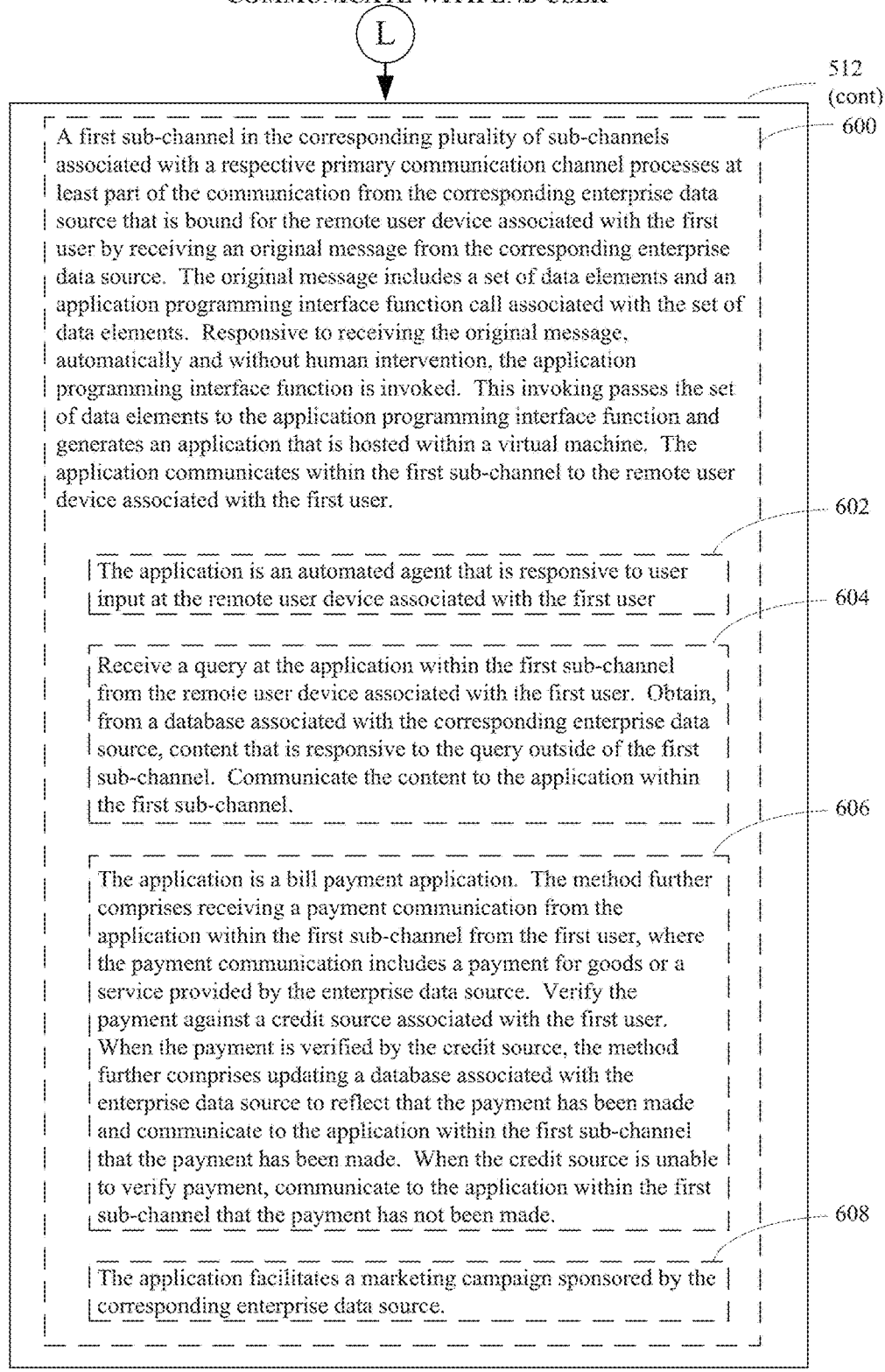
Figure 5L:
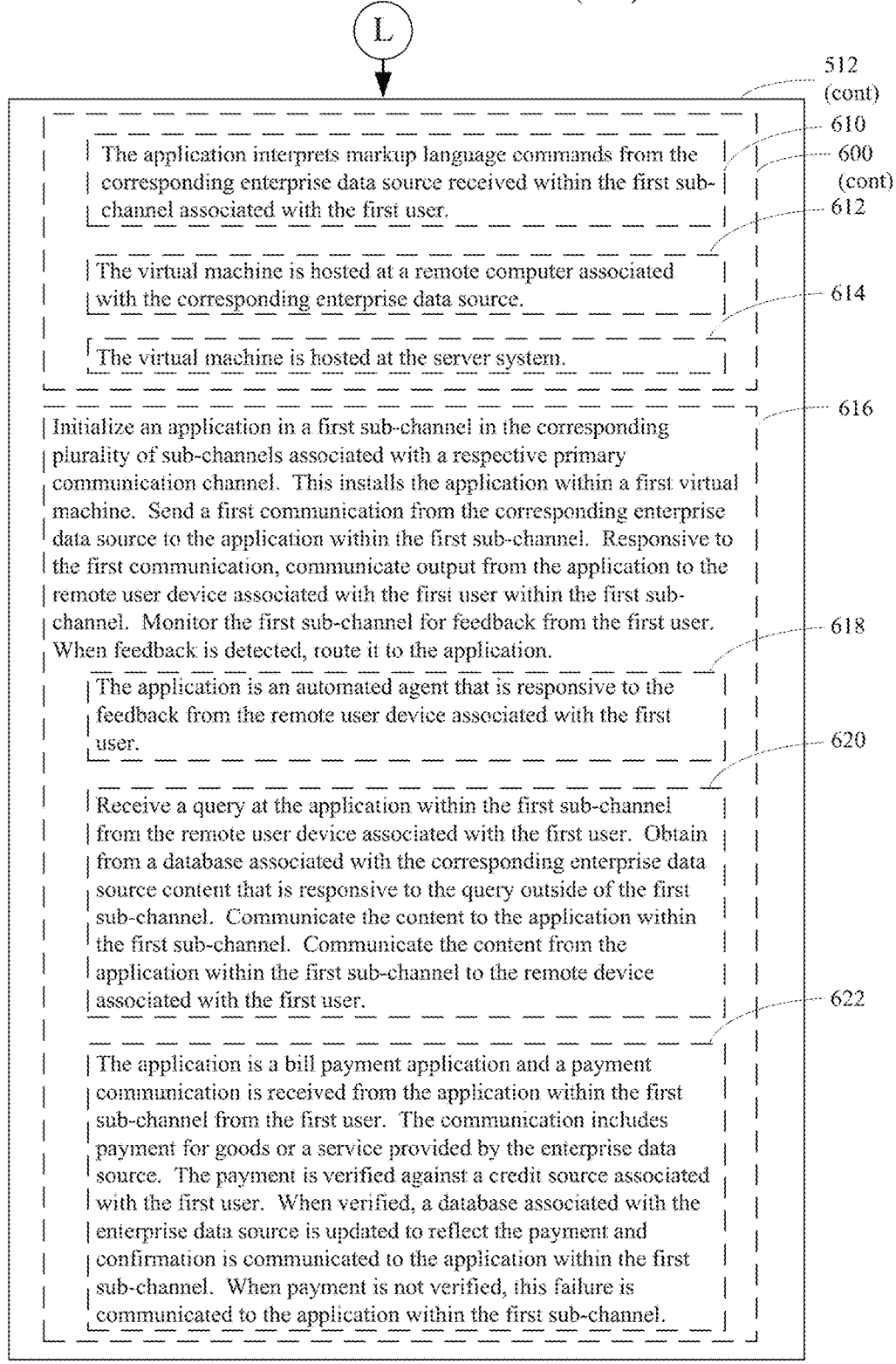

Referring to block 600 of FIG. 5K, in some embodiments a conversation in a first sub-channel 212 in the corresponding plurality of sub-channels associated with a respective primary communication channel 210 processes at least part of the communication from the corresponding enterprise data source 102 that is bound for a remote user device 104 that is associated with a first user by receiving an original message from the corresponding enterprise data source 102. The original message includes a set of data elements and an application programming interface function call associated with the set of data elements. Responsive to receiving the original message, automatically and without human intervention, the application programming interface function is invoked. This invoking passes the set of data elements to the application programming interface function.

In some embodiments this, in turn, generates an application (e.g., widget 22216, control applet) that is hosted within a virtual machine.

In other embodiments, the application is already running or is enabled on the virtual machine and the application programming interface function is passed to the application. In some embodiments, the virtual machine is run on a server that is independent from the secure mobile communications platform 200, but is addressable by the platform.

In still other embodiments, the application is already running or is enabled on the enterprise data source 102 and the application programming interface function is passed to the application.

Regardless of its location, the application communicates within (or operates on) the first sub-channel with the remote user device 104 associated with the first user.

Referring to block 602, in some embodiments the application is an automated agent that is responsive to user input at the remote user device 104 associated with the first user.

Referring to block 604, in some embodiments, a query is received at the application within the conversation in the first sub-channel from the remote user device 104 associated with the first user. In some embodiments, responsive to this, there is obtained, from a database associated with the corresponding enterprise data source 104, content that is responsive to the query outside of the conversation in the first sub-channel 212. This content is communicated to the application within the conversation in the first sub-channel.

Referring to block 606, in some embodiments, the application is a bill payment application and the method further comprises receiving a payment communication from the application within the conversation in the first sub-channel from the first user, where the payment communication includes a payment for goods or a service provided by the enterprise data source 104. This payment is verified against a credit source associated with the first user. When the payment is verified by the credit source, the method further comprises updating a database associated with the enterprise data source 104 to reflect that the payment has been made and communicating to the application within the conversation in the first sub-channel that the payment has been made. When the credit source is unable to verify payment, the method further comprises communicating to the application within the first sub-channel that the payment has not been made.

Referring to block 608, in some embodiments, the application facilitates a marketing campaign sponsored by the corresponding enterprise data source.

Referring to block 610, in some embodiments, the application interprets markup language commands from the corresponding enterprise data source 102 received within the first sub-channel associated with the first user.

Referring to block 612, in some optional embodiments, as discussed above, the application is hosted on a virtual machine, and in some instances this virtual machine is hosted at a remote computer associated with the corresponding enterprise data source. Referring to block 614, in some embodiments, the virtual machine is hosted at the enterprise data source 102 server system.

Referring to block 616, in some embodiments, the application is initialized in a conversation in a first sub-channel 212 in the corresponding plurality of sub-channels associated with a respective primary communication channel 210. This installs the application within a first virtual machine. A first communication is sent from the corresponding enterprise data source to the application within the first sub-channel. Responsive to the first communication, output from the application is communicated to the remote user device 104 associated with the first user within the first sub-channel. The first sub-channel is then monitored for feedback from the first user. When feedback is detected, the feedback is routed to the application.

Referring to block 618, in some embodiments, the application is an automated agent that is responsive to the feedback from the remote user device associated with the first user.

Referring to block 620, in some embodiments, a query is received at the application within the first sub-channel from the remote user device associated with the first user. Responsive to this, there is obtained from a database (or any other form of computer readable media that is capable of storing information) associated with the corresponding enterprise data source 102 content that is responsive to the query. In some embodiments, the query is outside of the first sub-channel. The retrieve content is then communicated to the application within the first sub-channel. Further the content from the application is communicated within the first sub-channel to the remote device associated with the first user.

Referring to block 622, in some embodiments, the application is a bill payment application and a payment communication is received from the application within the first sub-channel from the first user. The communication includes payment for goods or a service provided by the enterprise data source. The payment is verified against a credit source associated with the first user. When verified, a database associated with the enterprise data source is updated to reflect the payment and confirmation is communicated to the application within the first sub-channel. When payment is not verified, this failure is communicated to the application within the first sub-channel.

Referring to block 624, in some embodiments, the application facilitates a marketing campaign sponsored by the corresponding enterprise data source.

Referring to block 626, in some embodiments, the application interprets markup language commands from the corresponding enterprise data source received within the first sub-channel associated with the first user.

As discussed above, in some embodiments the application is running on a virtual machine. Referring to block 628, in some embodiments, the virtual machine is hosted at a remote computer associated with the corresponding enterprise data source. Referring to block 630, in some embodiments, the virtual machine is hosted at the server system.

Secure Enrollment of Enterprise Data Sources.

In some embodiments, the disclosed systems and methods challenges enterprise data sources 102 in unique way prior to onboarding them into the secure mobile communications platform 200. In some embodiments, this challenge is by way of human approval. For instance, in some embodiments, prior to onboarding a potential new enterprise data source 102 into system 200, a human representative of the potential new enterprise data source 102 is interviewed by a human representative of the secure mobile communications platform 200. In some embodiments a characteristic of this interview is the disclosure by the potential new enterprise data source 102 of private information that the human representative of the secure mobile communications platform 200 can verify. This is an improvement over conventional social media platforms that do not provide adequate controls to prevent spoofing of well known enterprises data sources (e.g., well known department stores). Such activity is prevented by the disclosed secure mobile communications platform 200 because of the verification process that enterprise data sources must undergo in order to be enrolled by the platform 200. In some embodiments, this onboarding of enterprise data sources 102 is performed on an automated basis using a specialized automated human interface module 2202 described below in conjunction with FIG. 22, where the module 2202 has a specialized node graph 2208 that steers a potential enterprise data source 102 through a series of nodes 2208 depending on information provided by the potential enterprise data source 102. In such instances, the conversation is between the potential enterprise data source 102 and the secure mobile communications platform 200. In some embodiments, artificial intelligence or machine based learning is imposed in one or more nodes of the node graph to assist in on-boarding the potential enterprise data source. In some embodiments, nodes in the graph will challenge the potential enterprise data source for information and verify this information (e.g., check if the potential enterprise data source's IP address is in a specified geographic domain, check a web address associated with the potential enterprise data source, ask for a scanned or electronic copy of a business card, etc.). In some embodiments a node of the automated human interface module 2202 will ask for certain documents and will provide a widget 2216 in the conversation to assist the potential enterprise data source 102 in uploading these documents. Thus, some embodiments of the secure mobile communications platform 200 provides different ways to verify potential enterprise data sources 102

Block 632 of FIG. 5M illustrates an example embodiment for such verification. An enrollment process for a potential enterprise data source is initiated when the enterprise data source makes an enrollment request. Responsive to the enrollment request, the potential enterprise data source is electronically challenged. A response to the electronic challenge is received from the potential enterprise data source. In this way the potential enterprise data source is required to establish a basis to a claim of identity as part of enrollment in the secure mobile communications platform 200. Referring to block 634 of FIG. 5M, in some embodiments the response to the electronic challenge is parsed using a trained classifier, where the trained classifier (e.g., a support vector machine, neural network, etc.) to determine whether the response establishes the identity for the enterprise data source.

Advantages of Sub-Channels 212 as a Replacement to Conventional User Installed Applications.

Figure 17:
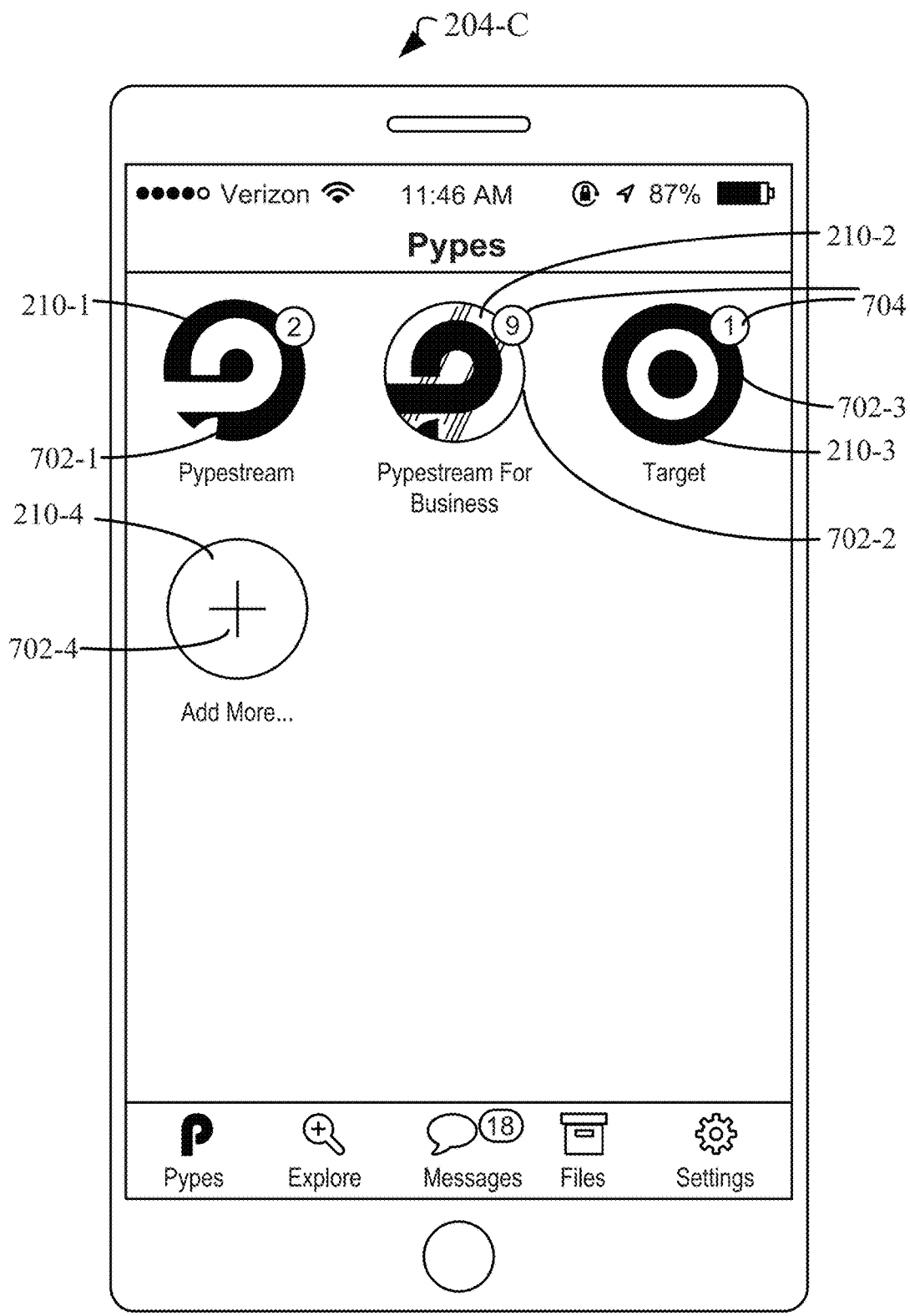
FIG. 17 provides an illustration of a graphical user interface running on a remote user device in accordance with some embodiments of the present disclosure.

Referring to FIG. 17, the disclosed user interface of the communications module—client side 204-C provides with a single affordance (e.g., affordance 702-3 for TARGET), the ability to connect with an enterprise data source 102 and obtain all the functionality that enterprise data source 102 could possibly want to provide in single selection of an affordance (e.g., a single tap of the affordance). For instance, by tapping on affordance 702-3 of FIG. 17, the user interface of module 204-C on the remote user device 104 is updated to the display illustrated in FIG. 19. In FIG. 19, all the functionality that TARGET desires to provide to end users is offered as one or more secure sub-channels 212. If desired, any of these sub-channels 212 can host a secure bi-directional conversation between the exemplary enterprise data source 102 (TARGET) and the end user associated with the remote user device 104. Further, there is no requirement that each of the sub-channels 212 host a bidirectional conversation. In some embodiments, some of the sub-channels 212 may be used to push data, such as advertisements, media, or other forms of information. Moreover, as disclosed herein, in instances where sub-channels 210 host conversations, the enterprise data source 102 can build into the conversations widgets 2216 (e.g., applets) that provide any desired functionality to support transactions and end user experience.

In conventional systems, an enterprise data source 102 must publish one or more applications to provide a comparable service to the end user. For instance as of the date of the filing of the present disclosure, AMAZON publishes one application "Amazon Music with Prime Music" for listening to music on remote devices, a second application "Amazon Video" for watching videos on remote devices, a third application "Amazon Prime Now" for shopping on the Amazon network, a fourth application "Amazon Photos" for cloud and drive storage and backup, and a fifth application "Kindle" for reading digital books. Thus, it is necessary to download from an application store and install on the remote user device 104 each of these applications in order to obtain all of AMAZON's remote device functionally. Moreover, AMAZON updates these applications, the end user is forced to download and reinstall each of these updated applications on their remote user device 104. For end users that are interested in interacting with multiple enterprise data sources 102, this leads to an untenable situation where much of their network bandwidth is devoted to the download of numerous updated applications. Using the disclosed secure mobile communications platform 200, it is possible to encapsulate all of this functionality in a single affordance (e.g., 702-3 in the case of TARGET) that expands out into a plurality of sub-channels 212. Thus, with reference to AMAZON, a first sub-channel 212 would replace AMAZON's first application "Amazon Music with Prime Music", a second sub-channel 212 would replace AMAZON's second application "Amazon Video" for watching videos on remote devices, a third sub-channel 212 would replace AMAZON's third application "Amazon Prime Now" for shopping on the Amazon network, a fourth sub-channel 212 would replace AMAZON's fourth application "Amazon Photos" for cloud and drive storage and backup, and a fifth sub-channel would replace AMAZON's fifth application "Kindle" for reading digital books. Thus, rather than downloading and installing five applications, the user would click a single button and have all the desired functionality. Moreover, as illustrated in FIG. 9 with affordances 902, if the user did not wish to have certain of the sub-channels 212, they could simply turn such sub-channels off Thus, the disclosed systems and methods provide a novel environment in which a user connects to a primary channel 210 associated with an enterprise data source 102 and then switches on and off sub-channels 212 rather than downloading, over and over again, applications from application stores. Thus, once again referring to FIG. 17, the simple act of hitting the affordance 702-3 (for TARGET) or the plus affordance 702-4 for enterprise data source 102 is equivalent to the conventional act of going to an on-line application store, find the application, download the application, providing the application with your user name and password each time. In fact, in some embodiments of the present disclosure, the user profile stores the credentials of the user so that when the user selects a new enterprise data source 102, the credentials are passed on to the new enterprise data source 102, making the addition of a new primary channel 210 to the user interface of module 204-C a one step process.

Figure 5N:
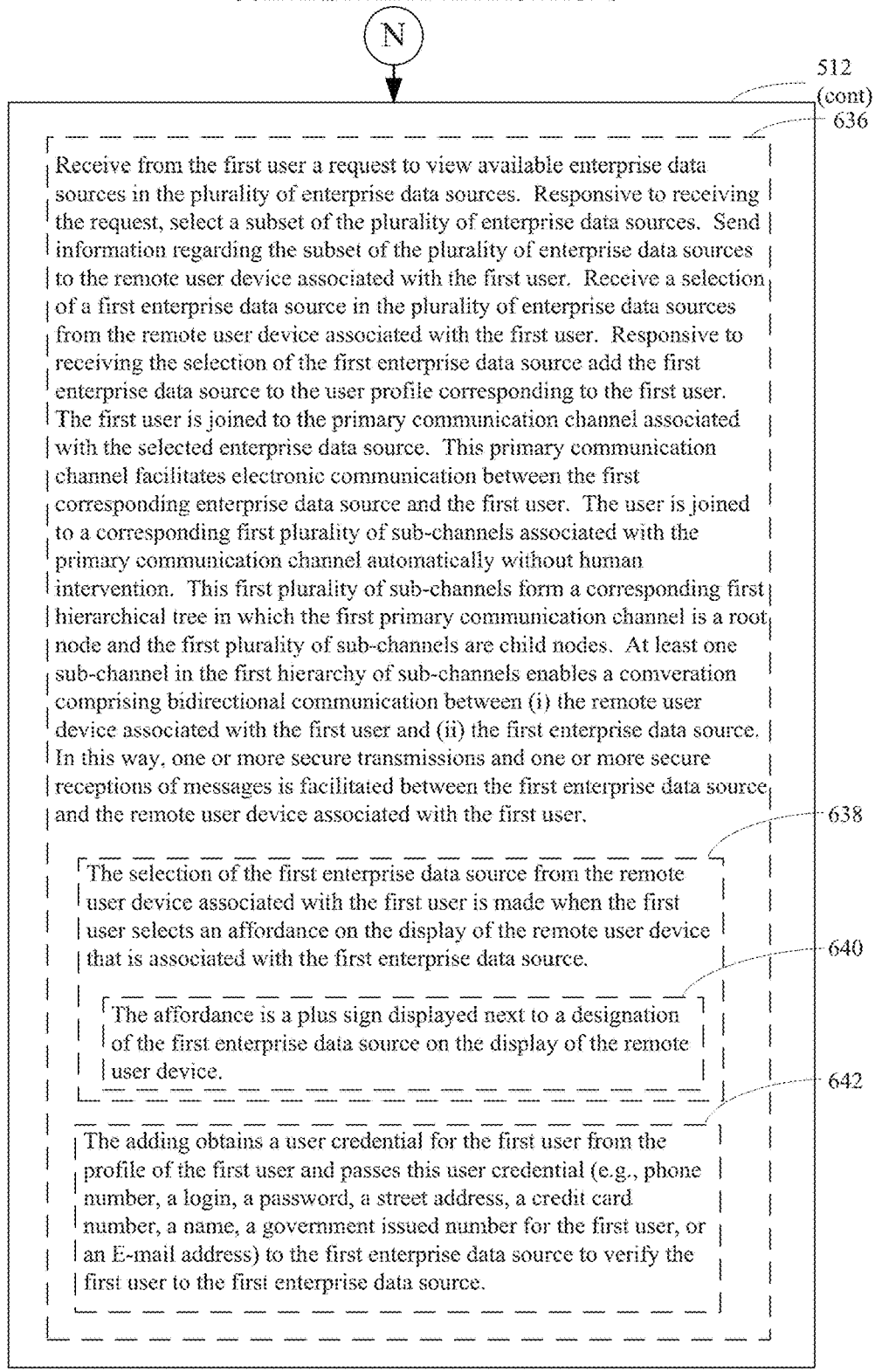
Figure 50:
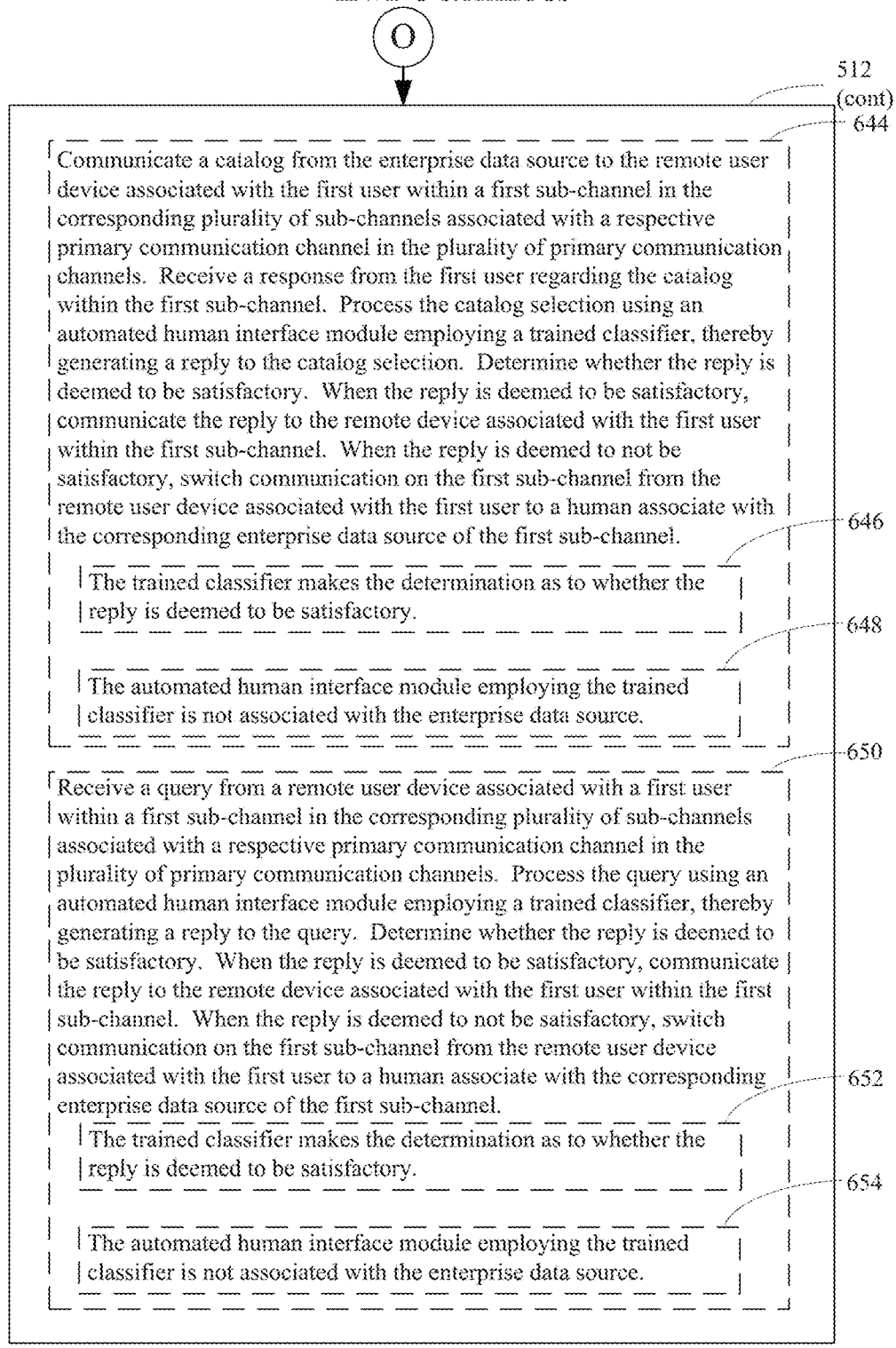

Block 636 of FIG. 5N illustrates this process in accordance with one embodiment of the present disclosure. There is received from a first user a request to view available enterprise data sources 102 in the plurality of enterprise data sources (e.g., by selection of affordance 702-4 in FIG. 17). Responsive to receiving the request, a subset of available enterprises data sources 102 in the plurality of enterprise data sources is selected. Information regarding the subset of the plurality of enterprise data sources is sent to the remote user device associated with the first user, for instance as illustrated in FIGS. 13, 14, and 15. A selection of a first enterprise data source 102 in the plurality of enterprise data sources is received from the remote user device 104 associated with the first user. Responsive to receiving the selection of the first enterprise data source, the first enterprise data source is added to the user profile 602 corresponding to the first user. The first user is joined to a primary communication channel associated with the enterprise data source 102. This primary communication channel facilitates electronic communication between the first corresponding enterprise data source and the first user. The user is further joined to a first plurality of sub-channels associated with the primary communication channel automatically without human intervention. This first plurality of sub-channels form a corresponding first hierarchical tree in which the first primary communication channel is a root node and the first plurality of sub-channels are child nodes. At least one sub-channel in the first hierarchy of sub-channels enables a conversation comprising bidirectional communication between (i) the remote user device associated with the first user and (ii) the first enterprise data source. The conversation is limited to only this first user, no other first user may participate in the conversation although the enterprise data source 102 may use the sub-channel 212 to host similar private conversations with other end users. In this way, one or more secure transmissions and one or more secure receptions of messages is facilitated between the first enterprise data source and the remote user device associated with the first user.

Referring to block 638 of FIG. 5N, the selection of the first enterprise data source from the remote user device associated with the first user is made when the first user selects an affordance on the display of the remote user device that is associated with the first enterprise data source.

Referring to block 640 of FIG. 5N, in some embodiments, the affordance is a plus sign displayed next to a designation of the first enterprise data source on the display of the remote user device.

Referring to block 642, in some embodiments, the adding obtains a user credential for the first user from the profile of the first user and passes this user credential (e.g., phone number, a login, a password, a street address, a credit card number, a name, a government issued number for the first user, or an E-mail address) to the first enterprise data source to verify the first user to the first enterprise data source.

Natural Language Processing of Customer Queries while Viewing Catalogs.

Referring to block 644 of FIG. 5O, a catalog or other information is communicated from the enterprise data source 102 to the remote user device 104 associated with a first user within a conversation hosted by a first sub-channel 212 in the corresponding plurality of sub-channels associated with a respective primary communication channel in the plurality of primary communication channels. A response from the first user regarding the catalog (or other information provided by the enterprise data source) is received within the conversation in the first sub-channel. The catalog selection (or other forms of user selection such as menu choice selection, etc.) is processed using an automated human interface module (e.g., automated human interface module 2202) employing a trained classifier, thereby generating a reply to the catalog selection (or other form of end user selection). A determination is made as to whether the reply is deemed to be satisfactory. For instance, consider a situation where a user made a request for "paint thinner." All responses to this user query are run through a classifier to determine whether the responses to the request are satisfactory. For instance, if the replies pertain to paint thinner (because the phrase "paint thinner") appears in the text of the responsive documents, the classifier will deem the documents satisfactory. When the reply is deemed to be satisfactory, the reply is communicated to the remote device 104 associated with the first user within the conversation in the first sub-channel. When the reply is deemed to not be satisfactory, communication on the first sub-channel (e.g., the conversation between the remote user device associated with the first user and the enterprise data source) is switched to a human associate with the corresponding enterprise data source of the first sub-channel (e.g., the conversation is routed to the sub-channel administrator queue 2228 of FIG. 22). Referring to block 646, in some embodiments, the trained classifier makes the determination as to whether the reply is deemed to be satisfactory. Referring to block 648, in some embodiments the automated human interface module employing the trained classifier is not associated with the enterprise data source 102.

Referring to block 680, in some embodiments a query is received from a remote user device associated with a first user within a conversation hosted in a first sub-channel in the corresponding plurality of sub-channels associated with a respective primary communication channel in the plurality of primary communication channels. The query is processed using an automated human interface module employing a trained classifier, thereby generating a reply to the query. A determination is made as whether the reply is deemed to be satisfactory. When the reply is deemed to be satisfactory, the reply is communicated to the remote device associated with the first user within the first sub-channel. When the reply is deemed to not be satisfactory, the conversation is switched to a human associate with the corresponding enterprise data source of the first sub-channel (e.g., the conversation is routed to the sub-channel administrator queue 2228 of FIG. 22). Referring to block 652, in some embodiments, the trained classifier makes the determination as to whether the reply is deemed to be satisfactory. Referring to block 654, in some embodiments the automated human interface module employing the trained classifier is not associated with the enterprise data source.

Referring to block 656, in some embodiments a query is received from a remote user device 104 associated with a first user within a conversation hosted by a first sub-channel in the corresponding plurality of sub-channels associated with a respective primary communication channel in the plurality of primary communication channels. The query is processed using an automated human interface module employing a trained classifier, thereby generating a reply to the query. The reply is communicated to the remote device associated with the first user within the first sub-channel. A determination is made as to whether the reply is deemed to be satisfactory. When the reply is deemed to not be satisfactory, the conversation is switched to a human associate with the corresponding enterprise data source of the first sub-channel (e.g., the conversation is routed to the sub-channel administrator queue 2228 of FIG. 22). Referring to block 658, in some embodiments the determination as to whether the reply is deemed to be satisfactory is based, at least in part, on further communication received from the first user within the conversation. Referring to block 660, in some embodiments, the automated human interface module employing the trained classifier is not associated with the enterprise data source.

Geographically Dependent Messaging.

Advantageously, the secure mobile communication platform 200 support permits geographic dependent messages. For instance, referring to block 662 of FIG. 5P, a location of a remote user device 104 associated with a first user within a first sub-channel 212 in the corresponding plurality of sub-channels associated with a respective primary communication channel 210 in the plurality of primary communication channels is received. A determination is made as to whether the location is within a geographical zone (e.g., country, region/state, city, town, county, metro code/zip code) in a plurality of geographical zones. When the location is within a geographical zone in the geographical plurality of zones, information from the enterprise data source 102 is communicated to the remote user device 104 associated with the first user within the first sub-channel 212 based, at least in part, on the location. When the location is not within a geographical zone in the geographical plurality of zones, no information from the enterprise data source 102 is communicated to the remote user device 104 associated with the first user within the first sub-channel 212.

To illustrate, an enterprise data source 102 (e.g., business entity), for example, MORANDI® restaurant of Morandi LLC., offers a special offer, for example, a temporal offer from Mar. 2, 2015 through Mar. 5, 2015, to users subscribing to the "ZAGATS.NYC.bestItalian.*" sub-channel 212. In an embodiment, the SMCB 200 implements a periodic geolocation mechanism to transmit location sensitive messages to users through the sub-channels 212. As used herein, "periodic geolocation mechanism" refers to a method of determining a geolocation of a user (e.g., consumer) and delivering different content to the user based on the user's location parameters comprising, for example, country, region/state, city, metro code/zip code, organization, internet protocol (IP) address, an internet service provider (ISP), etc. The SMCB 200 triggers a push notification if the user, due to the periodic geolocation obtained from the remote user device 104 associated with the user, heartbeats with a SMCB 200 presence service when proximal to the MORANDI® restaurant. For example, if the user is within a two mile radius of the MORANDI® restaurant, then the SMCB 200 sends the user a message about a 25% discount on a billing transaction for a dinner for two, provided the billing transaction is greater than $150, through the sub-channel 212. In an embodiment, a consumer agent on a server or a cloud computer handles the push notification, for example, by performing a k-cluster nearest neighbor calculation to determine a match with a standard deviation of 1 mile. As used herein, "k-cluster nearest neighbor calculation" refers to a pattern recognition calculation performed for statistical classification and regression analysis. The geolocation heartbeat can be expressed on a GOOGLE® Map of Google, Inc., to show pulse rate and movement of the user in a particular location. In an embodiment, the SMCB 200 supports the delivery of a message based on time scheduling with users being deemed active or relevant, if they meet demographic criteria and are in a particular geographical location defined, for example, by a longitudinal and latitudinal address, and therefore sends a message and/or an offer to those users in real time through their respective sub-channels 212.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIG. 1, 2, 3, or 4. These program modules can be stored on a CD-ROM, DVD, magnetic disk storage product, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method, comprising:
at a server system comprising one or more processors and memory:
using a unique identifier received from a first user to obtain characteristic information from a user profile corresponding to the first user that is stored in one or more data stores;
joining the first user to a plurality of pre-existing primary communication channels based upon the user profile information for the first user, wherein
each primary communication channel in the plurality of primary communication channels facilitates electronic communication between a corresponding enterprise data source and a first remote user device associated with the first user,
each primary communication channel in the plurality of communication channels hosts a different plurality of users,
a first primary communication channel in the plurality of primary communication channels is associated with the first user and comprises:
a first secure bidirectional conversation between (i) the first remote user device associated with the first user and (ii) a first enterprise data source associated with the first primary communication channel, thereby facilitating secure exchange of a first plurality of messages, and
a second secure bidirectional conversation between (i) a second remote user device associated with a second user and (ii) the first enterprise data source, thereby facilitating secure exchange of a second plurality of messages, and wherein
a first message in the first plurality of messages is posted by the first enterprise data source,
the first message is associated with a first application programming interface token identifying the first user,
a second message in the second plurality of messages is posted by the first enterprise data source, and
the second message is associated with a second application programming interface token identifying the second user associated with the second remote user device, the method further comprising:
using the first application programming interface token to route the first message to the first remote user device within the first primary communication channel; and
using the second application programming interface token to route the second message to the second remote user device within the first primary communication channel.

2. The method of claim 1, wherein the unique identifier of the first user is a contact number of the user.

3. The method of claim 1, wherein
the first enterprise data source designates access permission to the first primary communication channel to one or more primary communication channel administrators.

4. The method of claim 1, wherein the first primary communication channel hosts five or more conversations, each conversation between the first enterprise data source and a different user in the plurality of users associated with the first primary communication channel.

5. The method of claim 1, wherein the first primary communication channel hosts 100 or more conversations, each conversation between the first enterprise data source and a different user in the plurality of users associated with the first primary communication channel.

6. The method of claim 1, the method further comprising, rendering a graphical communication interface on the first remote user device associated with the first user thereby enabling the first user to select between each primary communication channel in the plurality of primary communication channels in real time.

7. The method of claim 6, wherein the first primary communication channel facilitates electronic payment processing, customer sign-up, marketing messages or campaigns, or customer service.

8. The method of claim 1, wherein the first enterprise data source is a store, a chain of stores, a government institution or service, a company, a corporation, an enterprise, an advertising firm, a restaurant, a healthcare organization, an organization, or a social organization.

9. The method of claim 1, wherein
the first message comprises a first file attachment,
the second message comprises a second file attachment, and wherein the method further comprises:
filing, automatically without human intervention, the first file attachment in a first file cabinet uniquely associated with the first user, and
filing, automatically without human intervention, the second file attachment in a second file cabinet uniquely associated with the second user.

10. The method of claim 1, the method further comprising:
using an automated human interface module to parse a reply from the first user to the first message, wherein
when the automated human interface module is unable to find a matching response to the reply from the first user, the automated human interface module refers the first user to a human operator associated with the first primary communication channel, and
when the automated human interface module is able to find a matching response to the reply from the first user, the automated human interface module provides the matching response to the first user by providing the matching response along with the first application programming interface token identifying the first user.

11. The method of claim 1, the method further comprising:
receiving a location of a third remote user device associated with a third user within the first primary communication channel;

determining whether the location is within a geographical zone in a plurality of geographical zones, wherein
when the location is within a geographical zone in the geographical plurality of zones, the method further comprises:
communicating information from the first enterprise data source to the remote user device associated with the third user within the first primary communication channel based, at least in part, on the location; and
when the location is not within a geographical zone in the geographical plurality of zones, the method further comprises:
communicating no information from the first enterprise data source to the remote user device associated with the third user within the first primary communication channel.

12. The method of claim 1, the method further comprising:
receiving from the first user a request to view available enterprise data sources in a plurality of enterprise data sources;
responsive to receiving the request, selecting a subset of the plurality of enterprise data sources;
sending information regarding the subset of the plurality of enterprise data sources to the first remote user device associated with the first user;
receiving a selection of a second enterprise data source in the plurality of enterprise data sources from the remote user device associated with the first user;
responsive to receiving the selection of the second enterprise data source, performing the method of:
adding the second enterprise data source to the user profile corresponding to the first user,
generating a second primary communication channel for the first user, wherein the second primary communication channel is limited to communication with the second enterprise data source and the first user in the plurality of users and facilitates electronic communication between the second corresponding enterprise data source and the first user.

13. The method of claim 12, wherein the selection of the second enterprise data source from the remote user device associated with the first user is generated when the first user selects an affordance on the display of the first remote user device that is associated with the first user.

14. The method of claim 13, wherein the affordance is a plus sign displayed next to a designation of the first enterprise data source on the display of the first remote user device.

15. The method of claim 13, wherein the adding obtains a user credential for the first user from the profile of the first user and passes this user credential to the second enterprise data source to verify the first user to the second enterprise data source.

16. The method of claim 15, wherein the user credential is a phone number, a login, a password, a street address, a credit card number, a name, a government issued number for the first user, or an E-mail address.

17. The method of claim 1, the method further comprising:
communicating a catalog from the first enterprise data source to the first remote user device associated with the first user within the first primary communication channel;
receiving a response from the first user regarding the catalog within the first primary communication channel;
processing the catalog selection using an automated human interface module employing a trained classifier, thereby generating a reply to the catalog selection,
determining whether the reply is satisfactory, wherein
when the reply is deemed to be satisfactory, communicating the reply to the first remote device associated with the first user within the first primary communication channel, and
when the reply is deemed to not be satisfactory, switching communication on the first primary communication channel from the remote user device associated with the first user to a human associate with the first enterprise data source.

18. The method of claim 17, wherein the trained classifier makes the determination as to whether the reply is deemed to be satisfactory.

19. The method of claim 1, wherein the first primary communication channel further comprises a plurality of sub-channels and wherein a first sub-channel in the plurality of sub-channels comprises the first secure bidirectional conversation and the second secure bidirectional conversation.

20. The method of claim 19, wherein the first message and the second message are each further associated with a key identifying the first sub-channel.

21. A non-transitory computer readable storage medium, wherein the non-transitory computer readable storage medium stores instructions, which when executed by a computer system, cause the computer system to perform a method of:
using a unique identifier received from a first user to obtain characteristic information from a user profile corresponding to the first user that is stored in one or more data stores;
joining the first user to a plurality of pre-existing primary communication channels based upon the user profile information for the first user, wherein
each primary communication channel in the plurality of primary communication channels facilitates electronic communication between a corresponding enterprise data source and a first remote user device associated with the first user,
each primary communication channel in the plurality of communication channels hosts a different plurality of users,
a first primary communication channel in the plurality of primary communication channels is associated with the first user and comprises:
a first secure bidirectional conversation between (i) the first remote user device associated with the first user and (ii) a first enterprise data source associated with the first primary communication channel, thereby facilitating secure exchange of a first plurality of messages, and
a second secure bidirectional conversation between (i) a second remote user device associated with a second user and (ii) the first enterprise data source, thereby facilitating secure exchange of a second plurality of messages, and wherein
a first message in the first plurality of messages is posted by the first enterprise data source,
the first message is associated with a first application programming interface token identifying the first user, and a second message in the second plurality of messages is posted by the first enterprise data source, the second message is associated with a second application programming interface token identifying the second user associated with the second remote user device, the method further comprising:

using the first application programming interface token to route the first message to the first remote user device within the first primary communication channel; and using the second application programming interface token to route the second message to the second remote user device within the first primary communication channel.

22. A server system, comprising:

one or more processors;

memory; and one or more programs, wherein the one or more programs are stored in the memory and are configured to be executed by the one or more processors, the one or more programs including instructions for:

using a unique identifier received from a first user to obtain characteristic information from a user profile corresponding to the first user that is stored in one or more data stores;

joining the first user to a plurality of pre-existing primary communication channels based upon the user profile information for the first user, wherein each primary communication channel in the plurality of primary communication channels facilitates electronic communication between a corresponding enterprise data source and a first remote user device associated with the first user, and wherein each primary communication channel in the plurality of communication channels hosts a different plurality of users;

a first primary communication channel in the plurality of primary communication channels is associated with the first user and comprises:

a first secure bidirectional conversation between (i) the first remote user device associated with the first user and (ii) a first enterprise data source associated with the first primary communication channel, thereby facilitating secure exchange of a first plurality of messages, and a second secure bidirectional conversation between (i) a second remote user device associated with a second user and (ii) the first enterprise data source, thereby facilitating secure exchange of a second plurality of messages, and wherein a first message in the first plurality of messages is posted by the first enterprise data source, the first message is associated with a first application programming interface token identifying the first user, a second message in the second plurality of messages is posted by the first enterprise data source, and the second message is associated with a second application programming interface token identifying the second user associated with the second remote user device;

using the first application programming interface token to route the first message to the first remote user device within the first primary communication channel; and using the second application programming interface token to route the second message to the second remote user device within the first primary communication channel.

* * * * *